United States Patent
Fujita et al.

(10) Patent No.: US 12,482,951 B2
(45) Date of Patent: Nov. 25, 2025

(54) DIELECTRIC WAVEGUIDE, TERAHERTZ CIRCUIT AND TERAHERTZ INTEGRATED CIRCUIT

(71) Applicant: OSAKA UNIVERSITY, Suita (JP)

(72) Inventors: Masayuki Fujita, Osaka (JP); Daniel Jonathan Headland, Osaka (JP); Withawat Withayachumnankul, Osaka (JP); Tadao Nagatsuma, Osaka (JP)

(73) Assignee: Osaka University, Osaka (JP)

( * ) Notice: Subject to any disclaimer, the term of this patent is extended or adjusted under 35 U.S.C. 154(b) by 324 days.

(21) Appl. No.: 18/160,064

(22) Filed: Jan. 26, 2023

(65) Prior Publication Data
US 2023/0178898 A1    Jun. 8, 2023

Related U.S. Application Data

(63) Continuation of application No. PCT/JP2021/027975, filed on Jul. 28, 2021.

(30) Foreign Application Priority Data

Jul. 29, 2020  (JP) ................................. 2020-128220

(51) Int. Cl.
    *H01Q 13/28*   (2006.01)
(52) U.S. Cl.
    CPC .................................. *H01Q 13/28* (2013.01)
(58) Field of Classification Search
    CPC .......... H01Q 13/24; H01Q 13/28; G02B 6/02; G02B 6/02038; G02B 6/0208
    See application file for complete search history.

(56) References Cited

U.S. PATENT DOCUMENTS

| 7,329,938 B2 | 2/2008 | Kinoshita |
| 2003/0169958 A1* | 9/2003 | Ridgway ............... G02F 1/3136 385/129 |

(Continued)

FOREIGN PATENT DOCUMENTS

| CN | 107703583 A | 2/2018 |
| JP | 3612313 B2 | 1/2005 |

(Continued)

OTHER PUBLICATIONS

Nallappan. K. et al., "Increasing Reliability of Terahertz Communication Links Using on board Fiber Connectivity," 2020 10th Annual Computing and Communication Workshop and Conference. Mar. 12, 2020. pp. 1065-1070.

(Continued)

*Primary Examiner* — Jimmy T Vu
(74) *Attorney, Agent, or Firm* — HSML P.C.

(57) ABSTRACT

An UC dielectric waveguide of the embodiments includes: a dielectric substance wiring propagating a terahertz wave; and a medium disposed around the dielectric substance wiring and having a large refractive index difference with respect to the dielectric substance wiring. A THz circuit of the embodiments includes a dielectric substance THz circuit connected between a first and second UC dielectric waveguides. The dielectric substance THZ circuit includes a circuit including a linear-shaped UC dielectric waveguide, a bent-shaped UC dielectric waveguide, and a Y-coupled branch circuit. There are included a first holding unit holding the first UC dielectric waveguide and a second holding unit holding the second UC dielectric waveguide. The THZ circuit of the embodiments may include a 2×2 evanescent coupler. Provided is a THz circuit having mechanical strength obtained by applying the UC dielectric waveguide (Continued)

having high confinement and transmission efficiencies of THz waves with a simple structure.

18 Claims, 28 Drawing Sheets

(56) References Cited

U.S. PATENT DOCUMENTS

| | | | |
|---|---|---|---|
| 2004/0031995 | A1 | 2/2004 | Maeno et al. |
| 2006/0045427 | A1* | 3/2006 | Sano ............... G02B 6/2804 385/14 |
| 2008/0025680 | A1* | 1/2008 | Sun ................... H01P 3/16 385/125 |
| 2011/0049575 | A1 | 3/2011 | Tanaka |
| 2014/0248020 | A1* | 9/2014 | Fujita ............... G02B 6/1225 385/28 |
| 2015/0241630 | A1 | 8/2015 | Fujita et al. |
| 2018/0075182 | A1 | 3/2018 | Zhuang et al. |
| 2019/0355749 | A1 | 11/2019 | Do et al. |
| 2021/0208429 | A1* | 7/2021 | Freude ............... G02B 6/12 |
| 2021/0249401 | A1 | 8/2021 | Shiraki |

FOREIGN PATENT DOCUMENTS

| | | |
|---|---|---|
| JP | 2005-203447 A | 7/2005 |
| JP | 2005-215603 A | 8/2005 |
| JP | 2013-105341 A | 5/2013 |
| JP | 5552775 B2 | 7/2014 |
| JP | 2014-197837 A | 10/2014 |
| JP | 5776802 B2 | 9/2015 |
| JP | 6070731 B2 | 2/2017 |
| JP | 6146437 B2 | 6/2017 |
| JP | 6281867 B2 | 2/2018 |
| JP | 6281869 B2 | 2/2018 |
| JP | 6524493 B2 | 6/2019 |
| JP | 6747544 B2 | 8/2020 |
| WO | 2020/095765 A1 | 5/2020 |

OTHER PUBLICATIONS

Chen. Hungwen et al.,"Subwavelength Dielectric-Fiber-Based THz Coupler," Journal of Lightwave Technology. May 13, 2009. vol. 27. No. 11. pp. 1489-1495.

Weijie Gao et al., "Effective-medium-cladded dielectric waveguides for terahertz waves," vol. 27, No. 26, Dec. 23, 2019, Opt. Express, 38721-38734 (14 pages).

Masahiro Yata et al., "Photonic-crystal diplexers for terahertz-wave applications", vol. 24, No. 7, Apr. 4, 2016, Opt. Express 7835 (15 pages).

International Search Report of PCT/JP2021/027975, Oct. 26, 2021, 8 pages including English translation.

* cited by examiner

40ps

40ps

DIELECTRIC WAVEGUIDE, TERAHERTZ CIRCUIT AND TERAHERTZ INTEGRATED CIRCUIT

CROSS REFERENCE TO RELATED APPLICATIONS

This is a continuation application (CA) of PCT Application No. PCT/JP2021/027975, filed on Jul. 28, 2021, which claims priority to Japan Patent Application No, P2020-128220 filed on Jul. 29, 2020 and is based upon and claims the benefit of priority from prior Japanese Patent Application No. P2020-128220 filed on Jul. 29, 2020 and PCT Application No. PCT/JP2021/027975, filed on Jul. 28, 2021, the entire contents of each of which are incorporated herein by reference.

FIELD

The embodiments described herein relate a dielectric waveguide, a terahertz (THz) circuit, and a terahertz (THz) integrated circuit.

BACKGROUND

Electromagnetic waves in the THE band, which are intermediate frequency bands between radio waves and light, have been expected to be a mainstay of Beyond 5G or 6G communications by realizing uncompressed, latency-free, ultra high-speed wireless data transmission. Moreover, such electromagnetic waves in the terahertz band have also been expected to have revolutionary applicabilities, such as THz communications, nondestructive imaging having proper resolution and transmittance, spectrometric analysis using fingerprint spectrum peaks unique to molecular vibration, radar having higher resolution than that of millimeter waves, and the like.

The THz band is in an operating extreme region of electronic devices. Many present application systems are obtained by combining large-sized and three-dimensional shaped discrete components. It is expected that circuit technology that is flat and can be integrated will be developed for practical use. As such technology, metallic wiring used for ordinary integrated circuits has a large loss, Studies are underway to research and develop Photonic Crystal (PC) metal-free dielectric materials and waveguides using effective-medium-cladded dielectric waveguides in which holes with a diameter sufficiently smaller than the wavelength are formed in a dielectric substrate.

As devices for oscillating high frequency electromagnetic waves of a THz frequency band, there have been known devices having a structure in which a Resonant Tunneling Diode (RTD) and a minute slot antenna is integrated. Moreover, there have been disclosed devices having a Metal Insulator Metal (MIM) structure in which metals and an insulator are layered and the insulator is inserted between the electrode metals in order to short-circuit in terms of high frequencies, at both ends of a slot antenna.

SUMMARY

The embodiments provide a dielectric waveguide having high confinement and transmission efficiencies of THz waves with a simple structure.

The embodiments provide a THZ circuit having high confinement and transmission efficiencies of THz waves, while maintaining mechanical strength, with a simple structure.

The embodiments provide a THz integrated circuit that can be easily designed and fabricated and that being capable of wide-band operation, by applying such a THz circuit.

According to one aspect of the embodiments, there is provided a dielectric waveguide comprising: a dielectric substance wiring configured to propagate a terahertz wave; and a medium disposed around the dielectric substance wiring, the medium having a large refractive index difference with respect to the dielectric substance wiring, wherein the terahertz wave can be confined within the dielectric substance wiring.

According to another aspect of the embodiments, there is provided a terahertz circuits comprising: a first unclad dielectric waveguide; a second unclad dielectric waveguide; and a dielectric substance terahertz circuit connected between the first unclad dielectric waveguide and the second unclad dielectric waveguide.

According to still another aspect of the embodiments, there is provided a terahertz circuit comprising: a first unclad dielectric waveguide having two 45-degree circular bend structures; and a second unclad dielectric waveguide having two 45-degree circular bend structures capable of evanescent coupling to the first unclad dielectric waveguide.

According to yet another aspect of the embodiments, there is provided a terahertz integrated circuit comprising: a first unclad dielectric waveguide; a second unclad dielectric waveguide capable of evanescent coupling to the first unclad dielectric waveguide; a holding unit configured to hold the first unclad dielectric waveguide and the second unclad dielectric waveguide; and a terahertz active device disposed on the second unclad dielectric waveguide coupled to the holding unit.

According to the embodiments, there can be provided the dielectric waveguide high confinement and transmission efficiencies of THz waves with the simple structure.

According to the embodiments, there can be provided the THZ circuit having high confinement and transmission efficiencies of THz waves, while maintaining mechanical strength, with the simple structure.

According to the embodiments, there can be provided the integrated circuit that can be easily designed and THZ fabricated and that being capable of wide-band operation, by applying such a THz circuit.

DESCRIPTION OF EMBODIMENTS

Figure 1:
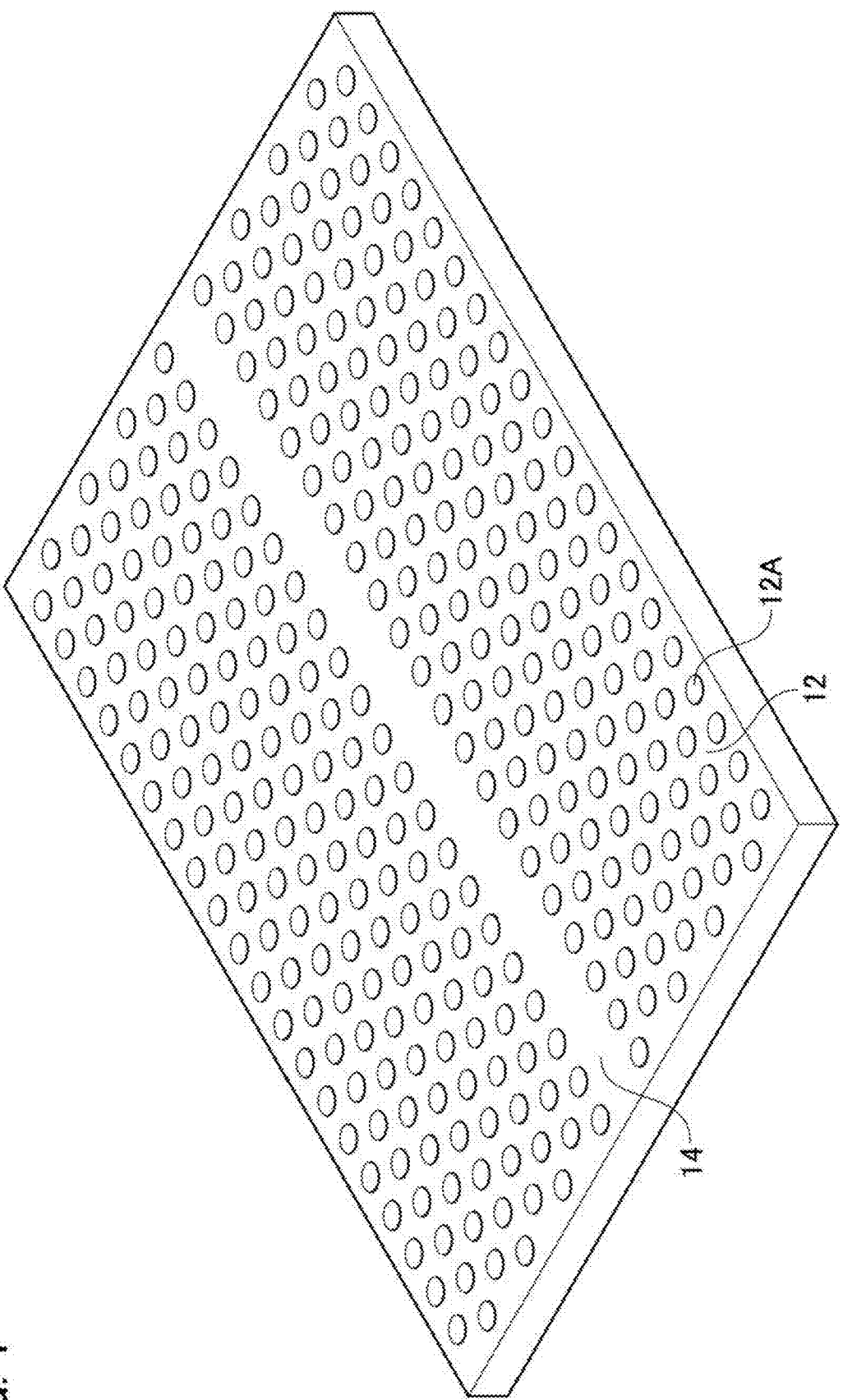
FIG. 1 is a schematic bird's-eye view illustrating a two dimensional photonic crystal (2D PC) waveguide according to a basic technology.

Next, certain embodiments will now be described with reference to drawings. In the following drawings, same blocks or elements are designated by same reference characters to eliminate redundancy and for simplicity. However, it should be known about that the drawings are schematic and are differ from an actual thing. Of course, the part from which the relation and ratio of a mutual size differ also in mutually drawings is included.

Moreover, the embodiments shown hereinafter exemplify the apparatus and method for materializing the technical idea; and the embodiments does not specify the arrangement, etc. of each component part as the following. The embodiments may be changed without departing from the spirit or scope of claims,
(Basic Technology)

FIG. 1 is a schematic bird's-eye view illustrating a two dimensional photonic crystal (2D-PC) waveguide according to a basic technology.

The 2D-PC waveguide 14 according to the basic technology includes a structure in which lattice points 12A having a periodic structure of the same degree as a wavelength of THz wave are: formed, with respect to a silicon slab 12, as illustrated in FIG. 1. In an example of FIG. 1, the lattice points 12A having the periodic structure have a triangular lattice. The lattice point 12A having the periodic structure of the same degree as the wavelength of THz wave makes it possible to confine the THz wave by a 2D-PC bandgap, in an in-plane direction of the 2D-PC waveguide 14. Moreover, in the 2D-PC waveguide 14, since upper and lower sides of the silicon slab 12 are air, the THz waves can be confined by total reflection.

The 2D-PC waveguide 14 according to the basic technology enters a THz input wave from an edge face, and sends a THz output wave. The 2D-PC waveguide 14 theoretically has no radiation loss, and can constitute a very low-loss microcircuit,
(Effective-Medium-Cladded (EMC) Dielectric Waveguide)

If forming a 2D-PC waveguide structure that is sufficiently smaller than a wavelength (smaller than ½ wavelength in consideration of wavelength shortening due to a refractive index),
it will act as a medium having an average dielectric constant (effective refractive index) rather than the structure (the period of the lattice points 12A and the shape of the holes), with respect to the electromagnetic waves. As a result, it acts as a refractive index confinement type waveguide (similar to an optical fiber or an ordinary optical waveguide) using a raw dielectric portion as a core and an effective refractive index microstructure portion of the effective medium as a low-refractive index cladding layer 15.

Figure 2A:
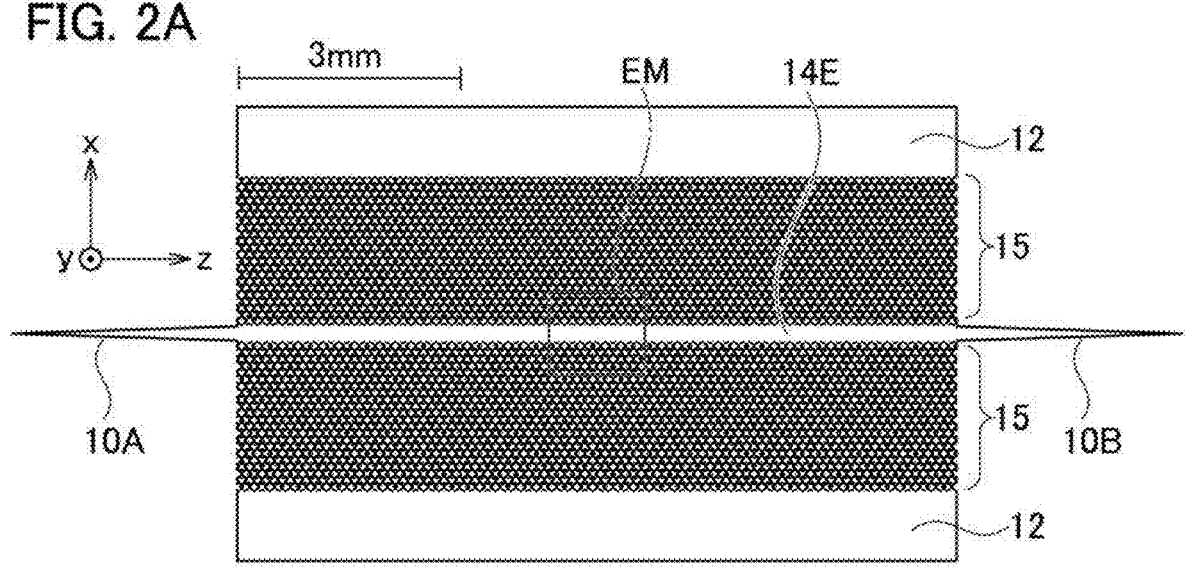
FIG. 2A is a top view diagram illustrating an Effective-Medium-Cladded (EMC) dielectric waveguide.
Figure 2B:
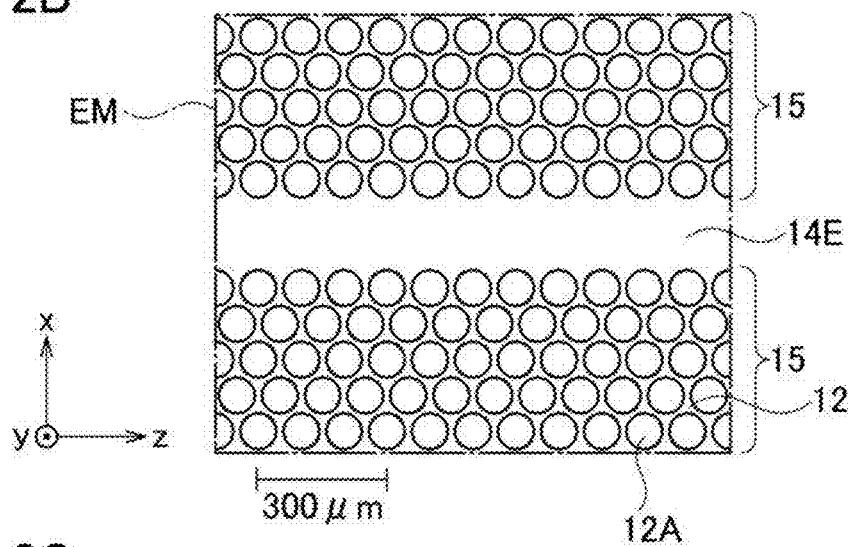
FIG. 2B is an enlarged view illustrating the Effective Medium (EM) portion of FIG. 2A.
Figure 2C:
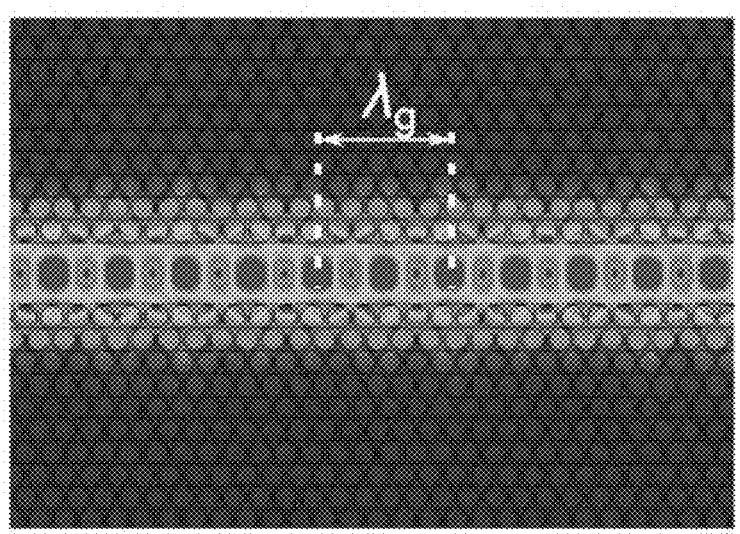
FIG. 2C illustrates an electromagnetic field simulation result.

FIG. 2A is a top view diagram illustrating an Effective-Medium-cladded (EMC) dielectric waveguide 14E. FIG. 2B is an enlarged view illustrating the EM portion of FIG. 2A. FIG. 2C illustrates an electromagnetic field simulation result near the EMC dielectric waveguide 14E. The EMC dielectric waveguide 14E is an effective refractive index confined waveguide.

The EMC dielectric waveguide 14E includes a dielectric waveguide sandwiched between the low-refractive index cladding layers 15, as illustrated in FIG. 2A. In the example of FIG. 2A, the length of the waveguide in the z direction of the EMC dielectric waveguide 14E is 10 mm and the width of the waveguide in the x direction thereof is 160 µm. An input and output unit thereof is provided with adiabatic mode conversion structural units 10A and 10B.

The thickness of the silicon slab 12 is, for example, 200 µm. The value of non-dielectric constant $\varepsilon_{si}$ of the silicon is 11.68 and the value of equivalent refractive index $n_{si}$ is 3.418. The resistibility of the silicon slab 12 is 20 kΩ-cm. In the example illustrated in FIGS. 2A and 2B, the lattice points 12A having the periodic structure have a triangular lattice. As illustrated in FIG. 2B, the low-refractive index cladding layer 15 has the lattice constant of a=100 µm as a period of arrangement of the lattice points 12A, and the diameter of the cylindrical lattice points 12A is 90 µm.

The EMC dielectric waveguide 14E can confine THz waves to dielectric substance wiring used as a core layer by a total reflection phenomenon similar to the optical fiber since the low-refractive index cladding layer 15 is formed with the effective refractive index minute structure sufficiently smaller than the wavelength. Therefore, for example, an extremely wide operational band of approximately 40% of operational frequency can be realized, As illustrated in FIG. 2C, the wavelength λg is approximately 5a from an electromagnetic field simulation result near the EMC dielectric waveguide 14E.

In the EMC dielectric waveguide 14E, for example, results of an operational frequency of 0.260 THz to 0,400 THZ, a bandwidth of 42.4% of, and a loss of 0.05 (dB/cm) have been obtained.

Hereinafter, as embodiments of the present application, an unclad (UC) dielectric waveguide will be described and then a THz circuit to which the UC dielectric waveguide is applied will be described.
(UC Dielectric Waveguide)

Figure 3A:
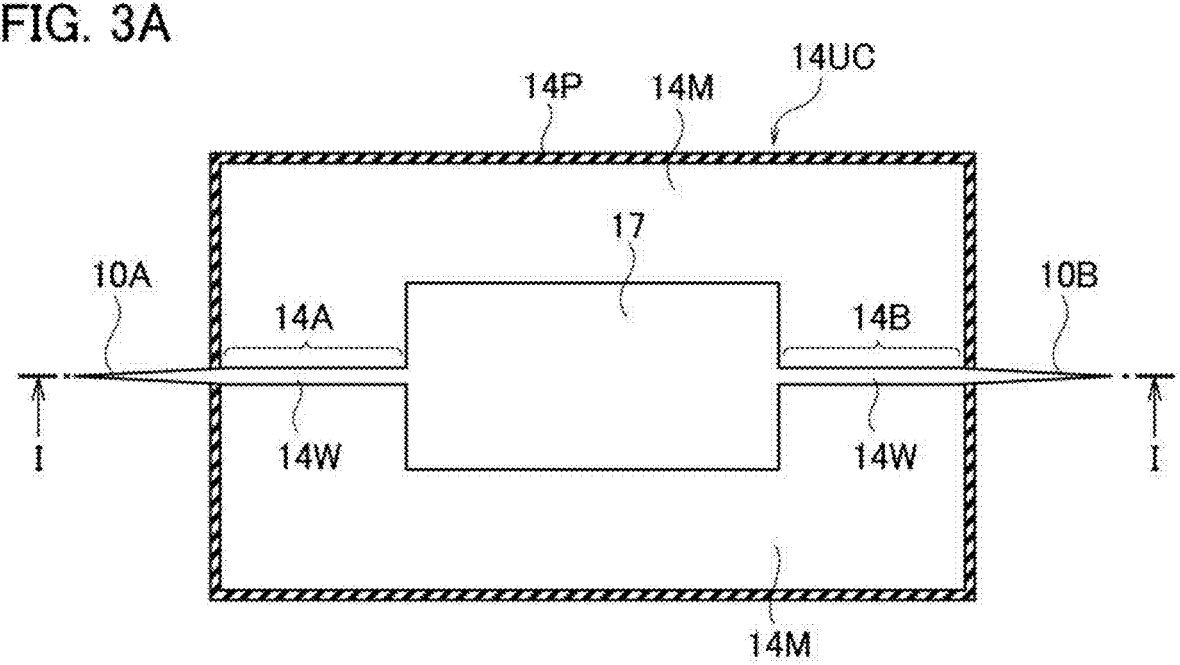
FIG. 3A is a schematic plain diagram illustrating an UnClad (UC) dielectric waveguide according to embodiments.
Figure 3B:
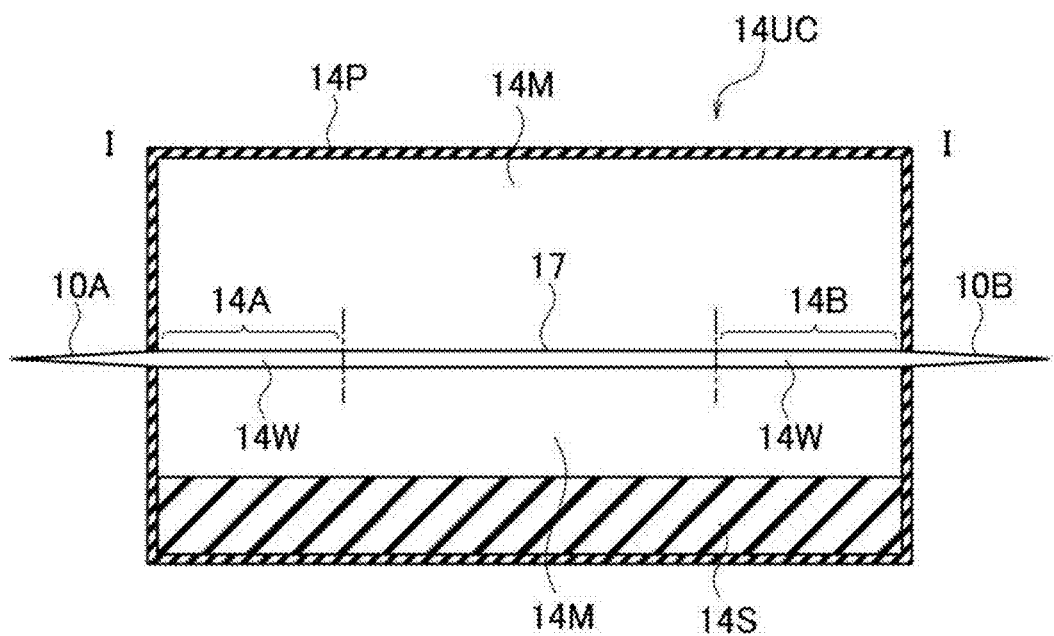
FIG. 3B is a cross-sectional diagram taken in the line I-I of FIG. 3A.

FIG. 3A is a schematic plain diagram illustrating an UC dielectric waveguide 14UC according to embodiments. FIG. 3B is a cross-sectional diagram taken in the line I-I of FIG. 3A.

The UC dielectric waveguide 14UC is a dielectric waveguide having a dielectric substance wiring 14 W as a core and having a medium 14M around the dielectric substance wiring 14 W as a cladding. The medium 14M around the dielectric substance wiring 14 W can be formed, for example, of air, or inert gas such as nitrogen, xenon, or helium. The unclad (UC) structure used herein is a structure that does not have the EMC structure or PC-cladded (PCC) structure for confining THz waves. The medium 14M having a large refractive index difference with dielectric materials, such as an air, is provided around the dielectric substance wiring 14 W instead of the EMC structure or PCC structure. The dielectric substance wiring 14 W is not provided with a structure where a semiconductor is formed on an insulating layer such as a Silicon On Insulator (SOI) structure. More specifically, even no insulating substrate is disposed under the dielectric substance wiring 14 W.

The UC dielectric waveguide 14UC according to the embodiments includes the dielectric substance wiring 14 W and the medium 14M around the dielectric substance wiring 14 W. An adiabatic mode conversion structural unit 10A may be provided on one edge portion of the UC dielectric waveguide 14UC, and an adiabatic mode conversion structural unit 10B may be provided on the other edge portion thereof. The adiabatic mode conversion structural units 10A and 10B can reduce a coupling loss of THz wave in the input and output unit of the dielectric substance wiring 14 W.

Moreover, the UC dielectric waveguide 14UC according to the embodiments may include a first UC dielectric waveguide 14A disposed at one end portion and a second UC dielectric waveguide 14B disposed at the other end portion, as the dielectric substance wiring 14 W. Arbitrary dielectric substance terahertz (THz) circuits 17 can be disposed between the first UC dielectric waveguide 14A and the second UC dielectric waveguide 14B.

The dielectric substance THz circuit 17 is a circuit that does not use a metal as wiring and is composed of a dielectric substance, and includes, for example, a circuit composed of the UC dielectric waveguide having the dielectric substance as a core and having air as a cladding.

Alternatively, the dielectric substance THz circuit may be a circuit obtained by combining a circuit composed of the UC dielectric waveguide and a circuit composed of the EMC dielectric waveguide, Alternatively, the dielectric substance THz circuit may be a circuit obtained by combining a circuit composed of the UC dielectric waveguide and a circuit composed of the PC waveguide. Alternatively, the dielectric substance THz circuit may be a circuit obtained by combining a circuit composed of the UC dielectric waveguide, a circuit which composed of the EMC dielectric waveguide, and a circuit composed of the PC waveguide, The UC dielectric waveguide 14UC is sealed in a package 14P except for the adiabatic mode conversion structural units 10A and 10B, as illustrated in FIGS. 3A and 3B. The UC dielectric waveguide 14UC includes the dielectric substance wiring 14 W and the medium 14M around the dielectric substance wiring 14 W, and the dielectric substance wiring 14 W is disposed on the package substrate 14S via the medium 14M in the package 14P. Ceramics, glass, metal, epoxy resin, or the like can be used as a material of the package 14P, Ceramics, glass, metal, epoxy resin, or the like can be used as a material of the package substrate 14S.

(THz Circuit)

The THz circuit according to the embodiments is provided with dielectric THz wiring without a cladding layer. The present structure is a simple structure requiring no cladding layer formed by a minute structure. Such a simple mechanism for confinement allows for easy design and fabrication and wide-band operation. Moreover, the THz wave can also be strongly confined in the dielectric due to a large refractive index difference between the dielectric and the air, thereby realizing a compact circuit.

The embodiments introduce a frame structure by using a holding unit, thereby realizing a thin line structure with strong THz wave confinement while maintaining mechanical strength. In this case, a leakage of the THz wave at the frame portion can be avoided by introducing a local effective medium. Confinement and transmission of the THz wave to the dielectric thin wiring is realized by a total reflection phenomenon at the interface between the dielectric and the air.

Figure 3C:
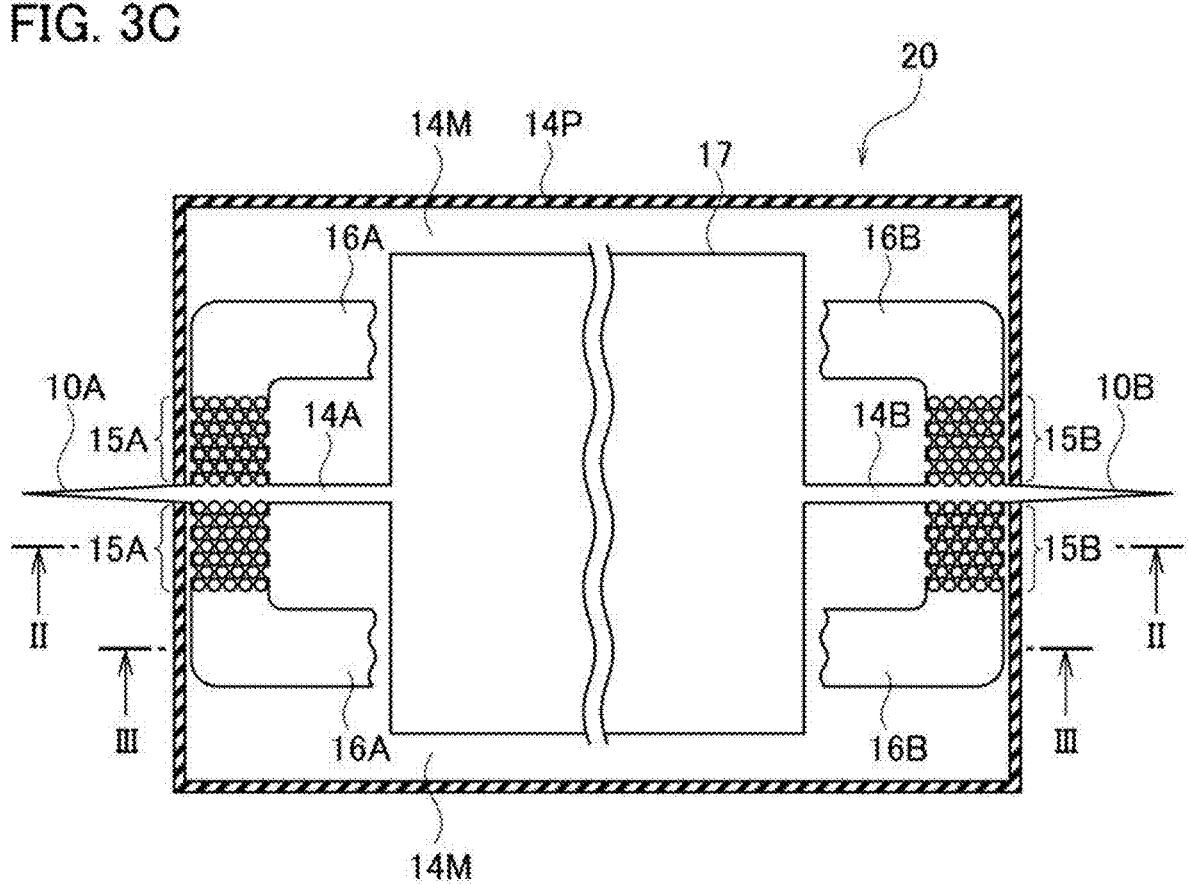
FIG. 3C is a schematic plain diagram illustrating a THz circuit according to the embodiments.
Figure 3D:
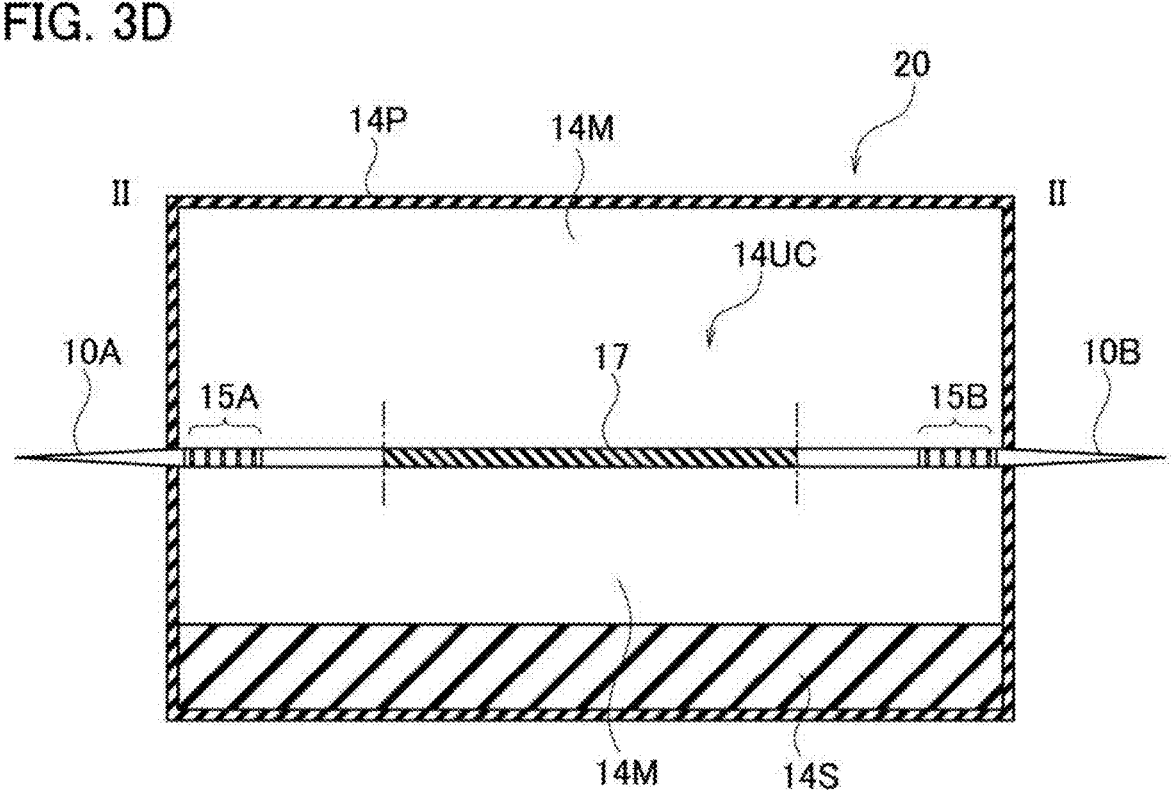
FIG. 3D is a cross-sectional diagram taken in the line II-II of FIG. 3C.
Figure 3E:
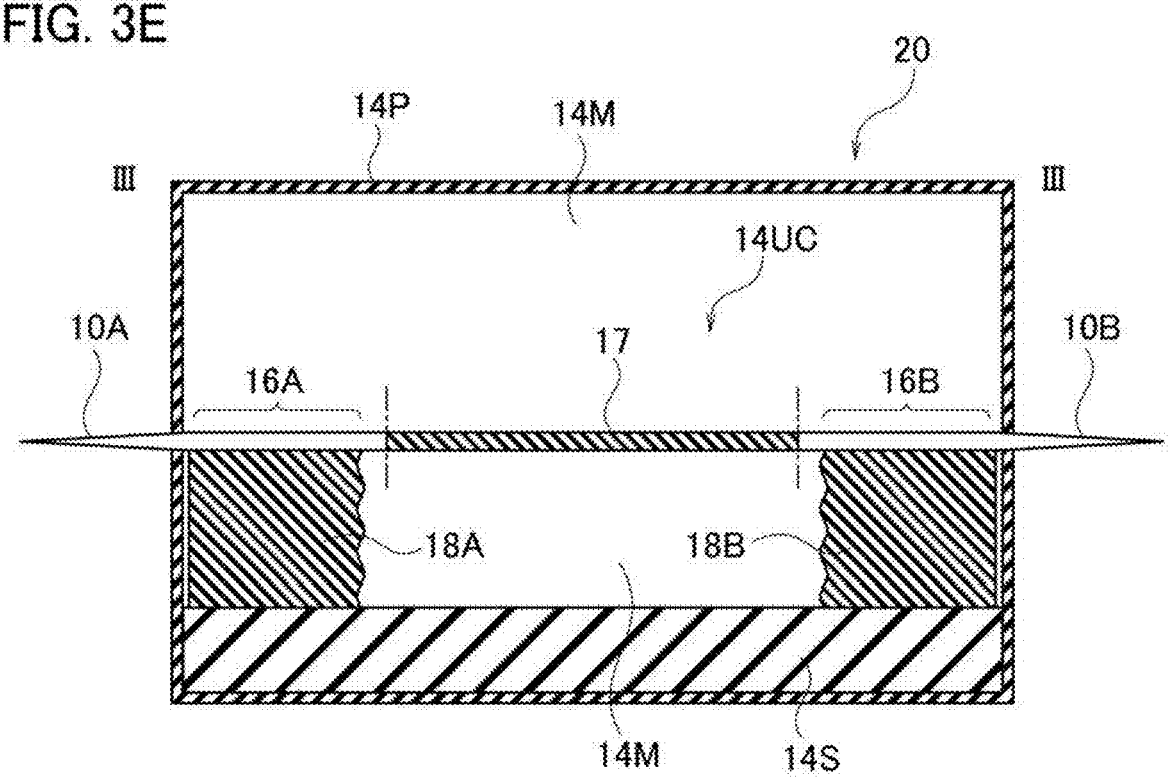
FIG. 3E is a cross-sectional diagram taken in the line III-III of FIG. 3C.

FIG. 3C is a schematic plain diagram illustrating a THz circuit 20 according to the embodiments constituted using a UC dielectric waveguide. FIG. 3D is a cross-sectional diagram taken in the line II-II of FIG. 3C. FIG. 3E is a cross-sectional diagram taken in the line III-III of FIG. 3C.

The THz circuit 20 according to the embodiments includes a first UC dielectric waveguide 14A, a second UC dielectric waveguide 14B, and a dielectric substance THz circuit 17 connected between the first UC dielectric waveguide 14A and the second UC dielectric waveguide 14B.

The dielectric substance THz circuit 17 is a circuit that does not use a metal as wiring and is composed of a dielectric substance, and includes, for example, a circuit composed of the UC dielectric waveguide having the dielectric substance as a core and having air as a cladding. Alternatively, the dielectric substance THz circuit may be a circuit obtained by combining a circuit composed of the UC dielectric waveguide and a circuit Composed of the EMC dielectric waveguide, Alternatively, the dielectric substance THz circuit may be a circuit obtained by combining a circuit composed of the UC dielectric waveguide and a circuit composed of the PC waveguide. Alternatively, the dielectric substance THz circuit may be a circuit obtained by combining a circuit composed of the UC dielectric waveguide, a circuit which composed of the EMC dielectric waveguide, and a circuit composed of the PC waveguide.

Moreover, the first UC dielectric waveguide 14A may be held by the first holding unit 16A. Moreover, the second UC dielectric waveguide 14B may be held by the second holding unit 16B.

Moreover, a low-refractive index cladding layer 15A may be provided between the first holding unit 16A and the first UC dielectric waveguide 14A. Moreover, a low-refractive index cladding layer 15B may be provided between the second holding unit 16B and the second UC dielectric waveguide 14B.

The first holding unit 16A and the second holding unit 16B may be connected to each other or may be separated from each other. The first holding unit 16A and the second holding unit 16B may constitute an integrated frame structure.

The dielectric substance THz circuit 17 may be connected between the first holding unit 16A and the second holding unit 16B. If a frame structure is provided in which the first holding unit 16A and the second holding unit 16B are integrated, the dielectric substance THz circuit 17 is disposed within the aforementioned frame structure. In contrast, if the first holding unit 16A and the second holding unit 16B are separated with each other, the dielectric substance THz circuit 17 may deviate outside the frame structure from a separated portion between the first holding unit 16A and the second holding unit 16B, as illustrated in FIG. 3C.

As illustrated in FIGS. 3D and 3E, the dielectric substance THz circuit 17 is disposed on substantially the same surface as the first UC dielectric waveguide 14A, the second UC dielectric waveguide 14B, the low-refractive index cladding layer 15A, the low-refractive index cladding layer 15B, the first holding unit 16A, and the second holding unit 16B.

In THz circuit 20 according to the embodiments, as illustrated in FIGS. 3C to 3E, the components except for the adiabatic mode conversion structural unit 10A and 10B are sealed in the package 14P. The THz circuit 20 includes the first UC dielectric waveguide 14A, the second UC dielectric waveguide 14B, the low-refractive index cladding layer 15A, the low-refractive index cladding layer 15B, the dielectric substance THz circuit 17, a first holding unit 16A, and the second holding unit 16B, and they are disposed on the package substrate 14S via the medium 14M, in the package 14P. Ceramics, glass, metal, epoxy resin, or the like can be used as a material of the package 14P. Glass, metal, epoxy resin, or the like can be used as a material of the package substrate 14S.

Alternatively, the first holding unit 16A and the second holding unit 16B may be mounted on the package substrate 14S, as illustrated in FIG. 3E. The first holding unit 16A and the second holding unit 16B may be screwed onto the package substrate 14S, or may be bonded respectively via bonding layers 18A and 18B on the package substrate 14S, as illustrated in FIG. 3E. The first UC dielectric waveguide 14A, the second UC dielectric waveguide 14B, and the dielectric substance THz circuit 17 are not in contact with the package substrate 14S. Moreover, the mechanical strength can be maintained by the first holding unit 16A and the second holding unit 16B.

The low-refractive index cladding layers 15A and 15B can be formed of a cladding layer composed of EM cladding. The low-refractive index cladding layer 15A suppresses leakage of the THz wave from the first UC dielectric waveguide 14A to the first holding unit 16A. Moreover, the low-refractive index cladding layer 15B suppresses leakage of the THz wave from the second UC dielectric waveguide 14B to the second holding unit 16B.

The first UC dielectric waveguide 14A and the second UC dielectric waveguide 14B are provided with a structure (dielectric core) in which the cladding layer of the dielectric substance wiring is removed, and the THz wave is confined within the dielectric core due to a total reflection phenomenon at the interface between the dielectric core and the air.

In the THz circuit 20 according to the embodiments, the first UC dielectric waveguide 14A, the second UC dielectric waveguide 14B, the dielectric substance THz circuit 17, the low-refractive index cladding layer 15A, the low-refractive index cladding layer 15B, the first holding unit 16A, and the second holding unit 16B can be formed by a single etching process from a single dielectric substrate. In this etching process, for example, Deep reactive-ion etching (DRIE) technology is used in order to form fine cylindrical lattice-point holes having a high aspect ratio.

The materials of the dielectric substrate can be any materials capable of guiding the THz waves. For example, semiconductor substrates such as silicon (Si), GaAs, InP, and GaN, can be used. Furthermore, any one of GaInAsP/InP based, GaInAs/GaAs based, GaAlAs/GaAs based or GaInNAs/GaAs based, GaAlInAs/InP based, AlGaInP/GaAs based, and GaInN/GaN based semiconductor substrate can be used therefor. As materials of the dielectric substrate, substrates such as plastic, glass, epoxy resin, and poly-tetrafluoroethylene, can be used.

THz Circuit; Modified Example

Figure 3F:
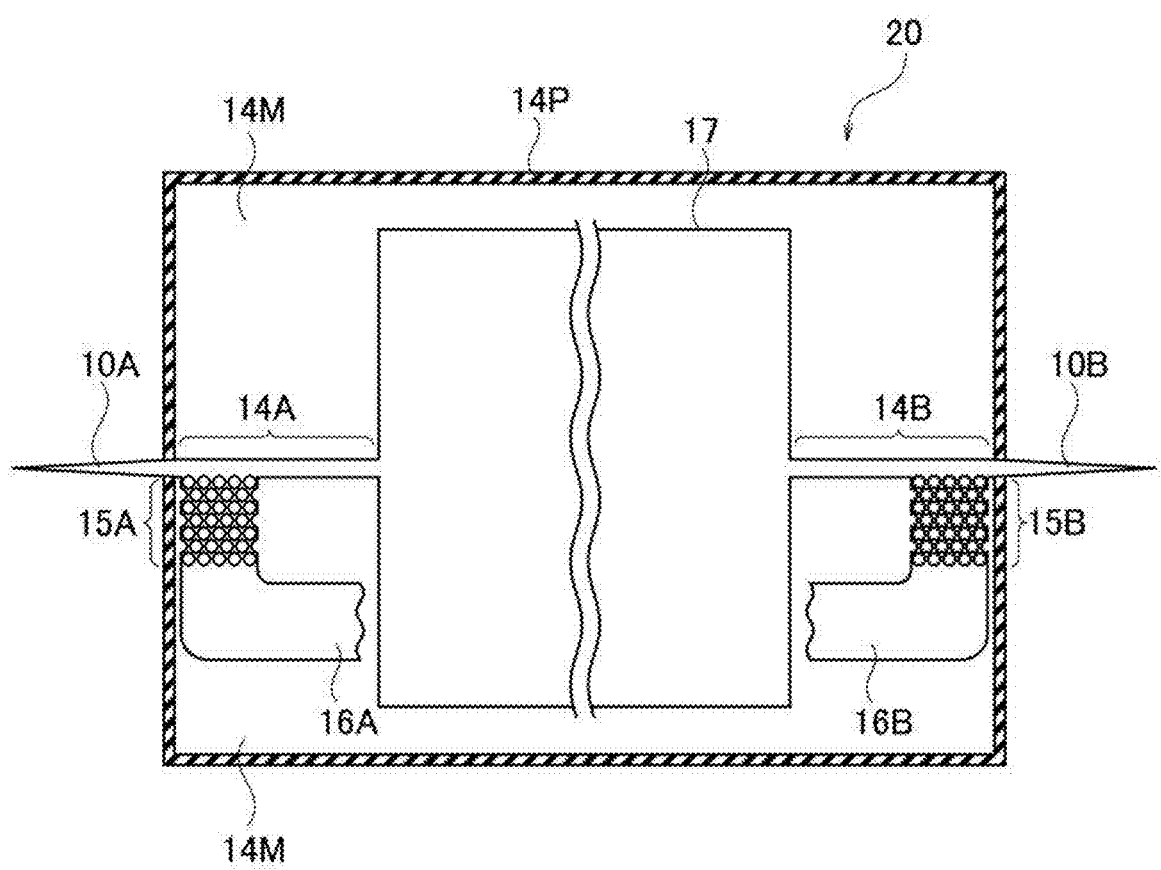
FIG. 3F is a schematic plain diagram illustrating a THz circuit according to a modified example of the embodiments.

FIG. 3F is a schematic plain diagram illustrating a THz circuit 20 according to a modified example of the embodiments.

As the holding mechanism (frame structure), it is sufficient if it can hold the dielectric substance wiring, Therefore, as the holding mechanism (frame structure), as illustrated in FIG. 3F, a one-sided holding mechanism is provided.

The THz circuit 20 according to the modified example of the embodiments includes a first UC dielectric waveguide 14A, a second UC dielectric waveguide 14B, and a dielectric substance THZ circuit 17 connected between the first UC dielectric waveguide 14A and the second UC dielectric waveguide 14B. The dielectric substance THz circuit 17 is the same as the THz circuit 20 according to the embodiments. Moreover, the first UC dielectric waveguide 14A is held by the first holding unit 16A, and the second UC dielectric waveguide 14B is held by the second holding unit 16B.

Furthermore, a low-refractive index cladding layer 15A is provided between the first holding unit 16A and the first UC dielectric waveguide 14A, and a low-refractive index cladding layer 15B is provided between the second holding unit 16B and the second UC dielectric waveguide 14B.

The first holding unit 16A and the second holding unit 16B may be connected to each other or may be separated from each other. The first holding unit 16A and the second holding unit 16B may constitute an integrated frame structure.

In THz circuit 20 according to the modified example of the embodiments, as illustrated in FIG. 3F, the components except for the adiabatic mode conversion structural unit 10A and 10B are sealed in the package 14P. The rest of configuration is the same as that of the THz circuit 20 according to the embodiments.

First Embodiment; Linear-Shaped UC Dielectric Waveguide

Figure 4A:
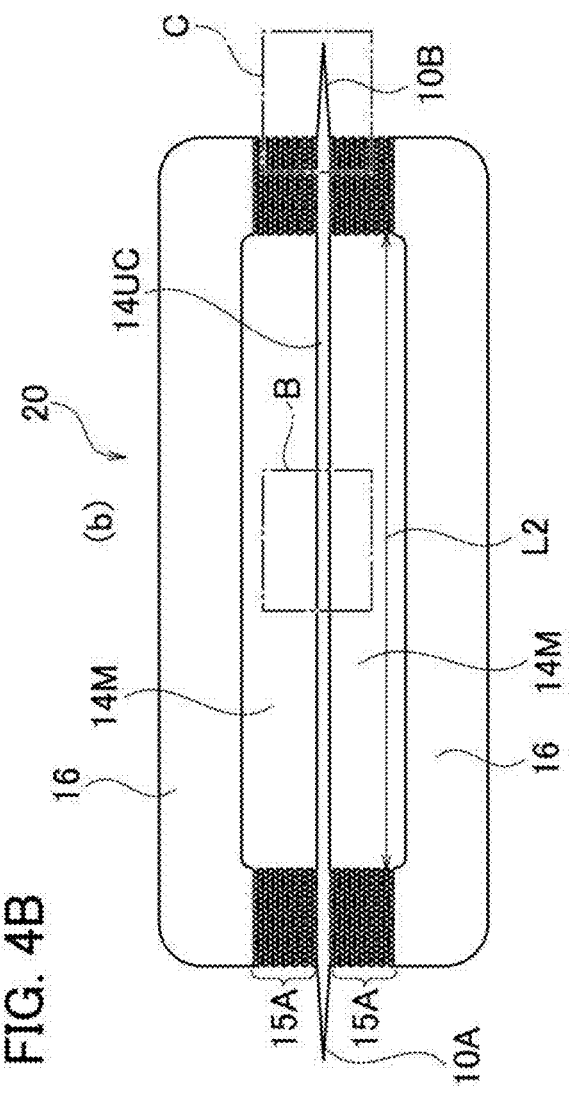
FIG. 4A is a top view diagram illustrating a THz circuit according to the first embodiment.
Figure 4B:
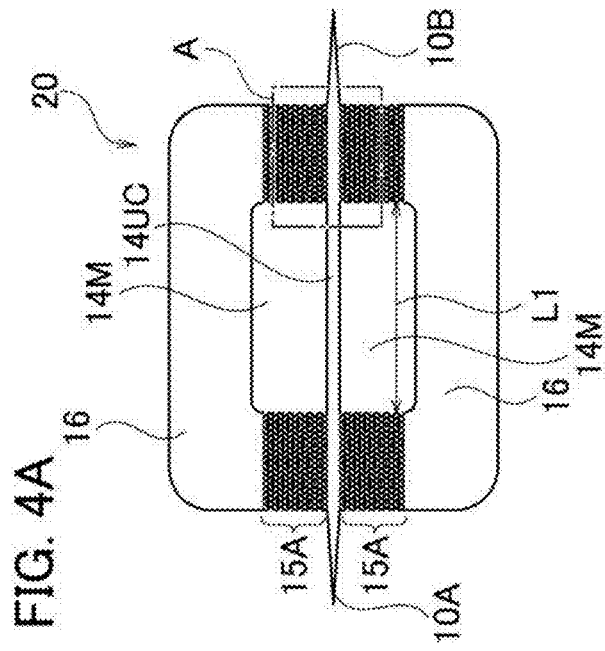
FIG. 4B is another top view diagram illustrating the THz circuit according to the first embodiment.
Figure 4E:
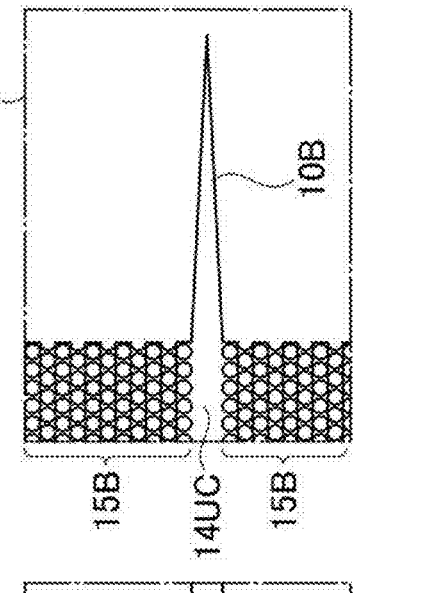
FIG. 4E is an enlarged view of illustrating the portion C of FIG. 4B.
Figure 4D:
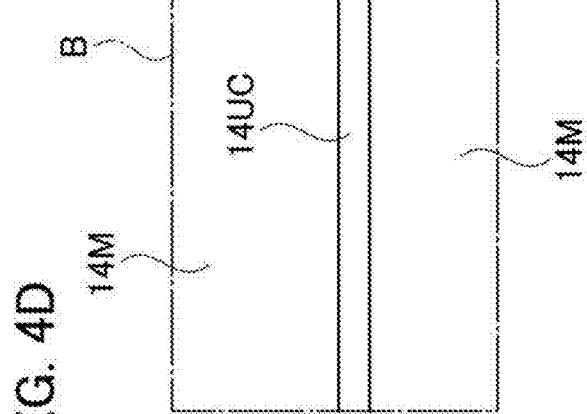
FIG. 4D is an enlarged view illustrating the portion B of FIG. 4B.
Figure 4C:
FIG. 4C is an enlarged view illustrating the portion A of FIG. 4A.

FIG. 4A is a top view diagram illustrating a THz circuit according to the first embodiment. FIG. 4B is another top view diagram illustrating the THz circuit according to the first embodiment, FIG. 4C is an enlarged view illustrating the portion A of FIG. 4A. FIG. 4D is an enlarged view illustrating the portion B of FIG. 4B. FIG. 4E is an enlarged view illustrating the portion C of FIG. 4B.

The THz circuit 20 according to the first embodiment includes a linear-shaped UC dielectric waveguide 14UC.

The most basic configuration of the THz circuit is the linear-shaped UC dielectric waveguide 14UC. Linear-shaped UC dielectric waveguides 14UC of different lengths have been fabricated. The linear-shaped UC dielectric waveguides 14UC of different lengths are respectively housed in special purpose holding units 16 (frames). The width of the holding unit 16 is, for example, approximately 2 mm and the distance between the holding unit 16 and the UC dielectric waveguide 14UC is, for example, approximately 2 mm.

THz circuit 20 according to the first embodiment is fabricated using the DRIE from a high-resistivity intrinsic silicon wafer having resistibility more than 10 k$\Omega$·Cm. The obtained devices are illustrated in FIGS. 4A to 4E.

In FIG. 4A, the length L1 of the unclad (UC) dielectric waveguide 14UC is 5 mm. In FIG. 4B, the length L2 of the UC dielectric waveguide 14UC is 15 mm.

The THz circuit 20 according to the first embodiment includes the linear-shaped UC dielectric waveguide 14UC as illustrated in FIGS. 4A and 4B.

The UC dielectric waveguide 14UC is held by the holding unit 16.

Moreover, a low-refractive index cladding layer 15A is provided between the holding unit 16 and the UC dielectric waveguide 14UC at an input portion of the UC dielectric waveguide 14UC, and a low-refractive index cladding layer 15B is provided between the holding unit 16 and the UC dielectric waveguide 14UC at an output unit of the UC dielectric waveguide 14UC. The low-refractive index cladding layers 15A and 15B are formed on a dielectric substrate (silicon slab) integrated with the holding unit 16. Cylindrical through holes in a triangular lattice having, for example, a pitch of 120 µm and a diameter of 110 µm are formed on the low-refractive index cladding layers 15A and 15B. The low-refractive index cladding layers 15A and 15B include EM cladding (EMC).

An adiabatic mode conversion structural unit 10A may be provided on one edge portion of the UC dielectric waveguide 14UC, and an adiabatic mode conversion structural unit 10B may be provided on the other edge portion thereof. The adiabatic mode conversion structural units 10A and 10B can reduce a coupling loss of THz wave in the input and output unit of the UC dielectric waveguide 14UC. The adiabatic mode conversion structural units 10A and 10B are configurations for connecting the waveguide to perform characteristics measurement, and are not essential components, THz wave impedance conversion elements such as THz active elements may be disposed instead of the adiabatic mode conversion structural units 10A and 10B.

Figure 5:
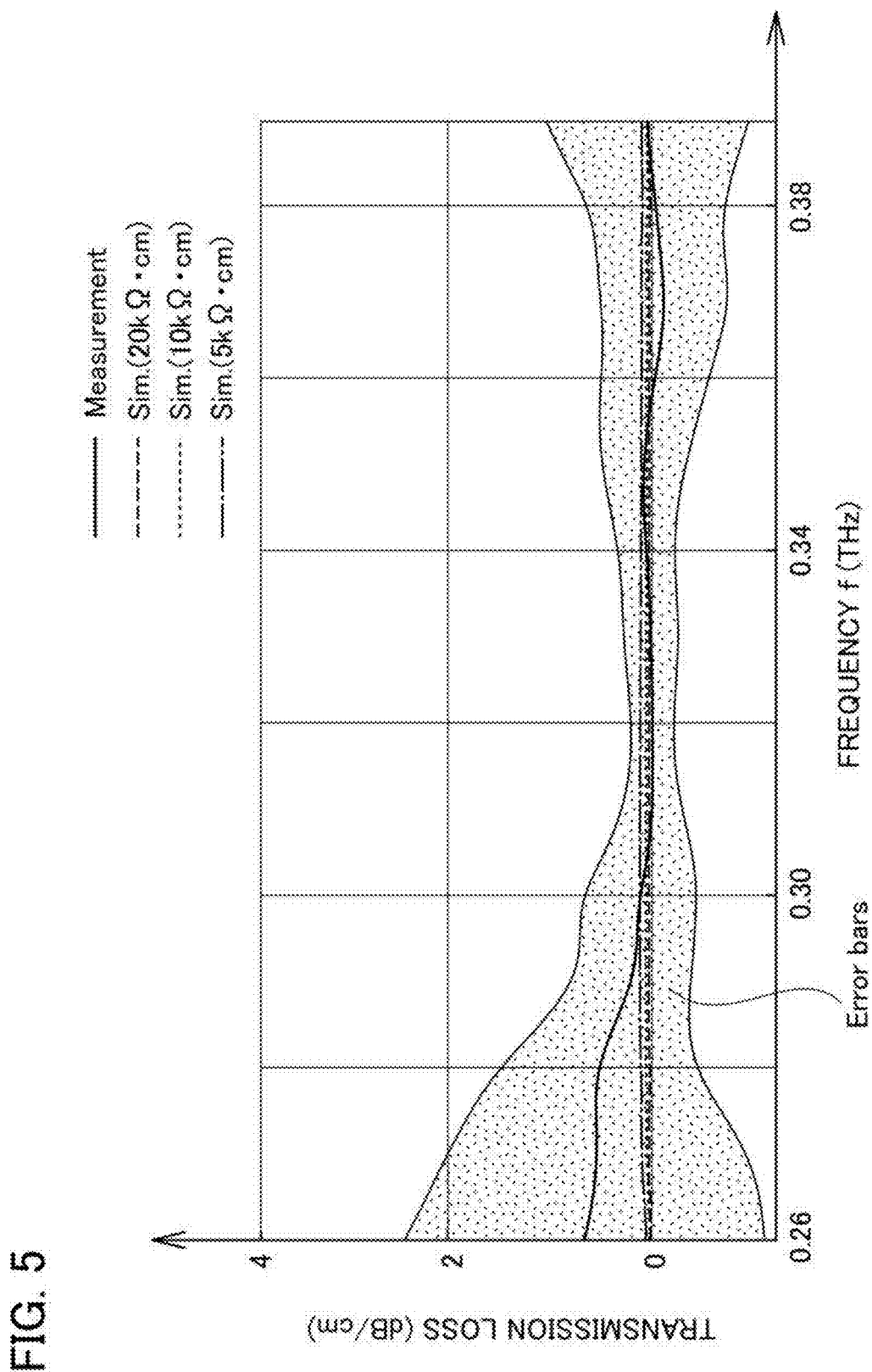
FIG. 5 illustrating an example of frequency characteristics of a propagation loss of the THz circuit according to the first embodiment.

In the THz circuit 20 according to the first embodiment, an example of the unclad (air-clad) dielectric substance wirings of the UC dielectric waveguides 14UC having different lengths of 5 mm and 15 mm is illustrated, but the operations of both are the same. A propagation loss per unit length is calculated using the fact that the longer the length, the greater the loss. The width of the UC dielectric waveguide 14UC is, for example, approximately 200 µm. The thickness of the UC dielectric waveguide 14UC is the same as that of the holding unit 16 the same, and is, for example, approximately 200 µm. As a result of verifying examples in which the width of the UC dielectric waveguide 14UC is changed to 10 µm, 25 µm, 50 µm, 100 µm, and 150 µm, holding strength is also obtained, FIG. 5 illustrates an example of frequency characteristics of a propagation loss of the THz circuit according to the first embodiment. Using the fact that the longer the length, the greater the loss, several waveguides of length 5 mm and 15 mm are probed and a difference in power transmission between the two is used, to estimate the propagation loss a of the linear-shaped waveguide. In order to calculate the average and standard deviation of the propagation losses, a large number of measurements are performed.

In order to compare the measured propagation losses with an expected value, a simulation describing a dielectric absorption and a material dispersion of intrinsic silicon is performed using Drude Model. Several different lengths of UC dielectric waveguides 14UC are simulated (the frame is omitted), and the expected propagation loss is extracted by comparing the magnitude of transmission.

Since a specific value of the specific resistance is not clearly known, the results of simulating the range thereof are illustrated in FIG. 5. According to the results, the propagation loss over the entire measurable bandwidth is less than 0.117 dB/cm at 5 kΩ·cm, less than 0.059 dB/cm at 10 kΩ·cm, and less than 0,032 dB/cm at 20 kΩ·cm. Accordingly, the simulated propagation losses are within the boundary of the smoothed error bar of the measured propagation losses with regard to all values of adopted resistibilities. Thus, the simulation and the experiment are substantially matched with each other.

Figure 6A:
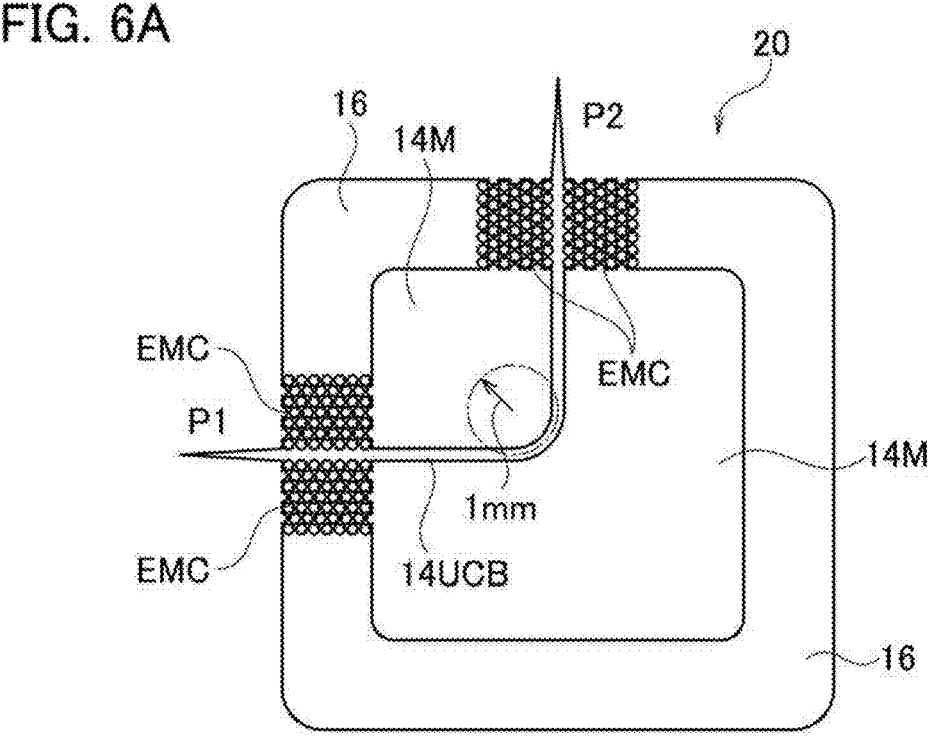
FIG. 6A is a top view diagram illustrating a THz circuit according to a second embodiment.
Figure 6B:
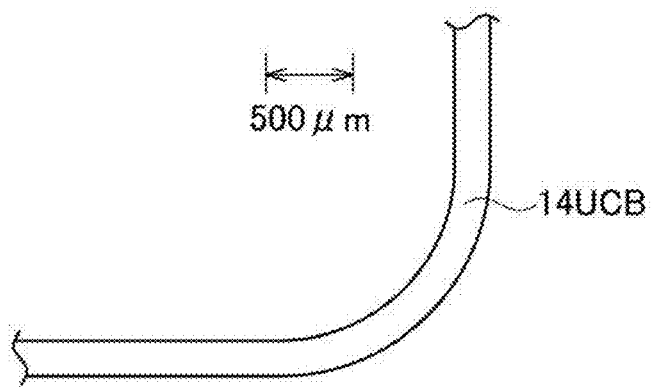
FIG. 6B is an enlarged view illustrating the bent portion of FIG. 6A.

The THz circuit 20 according to the first embodiment proves that the basic linear-shaped UC dielectric waveguide 14UC can be realized with low loss, Second Embodiment; Bent-Shaped UC Dielectric Waveguide FIG. 6A is a top view diagram illustrating a THz circuit 20 according to a second embodiment. FIG. 6B is an enlarged view illustrating the bent portion of FIG. 6A.

The THz circuit 20 according to the second embodiment includes a bent-shaped UC dielectric waveguide 14UCB having a simple 90-degree) (90° circular bend structure, as illustrated in FIGS. 6A and 6B. The curvature radius of the 90-degree circular bend structure is 1 mm.

The UC dielectric waveguide 14UCB is held by a holding unit 16. The holding unit 16 has a square structure, as illustrated in FIG. 6A. An input port P1 and an output port P2 are respectively disposed at two adjacent sides of the holding unit 16.

Effective-refractive-index confinement waveguides are disposed at the input and output portions of the UC dielectric waveguide 14UCB. A medium 14M around the UC dielectric waveguide 14UCB can be formed, for example, of air, or inert gas such as nitrogen, xenon, or helium. The UC dielectric waveguide 14UCB used herein does not have the EM-cladded (EMC) structure or PC-cladded (PCC) structure for confining THz waves. The medium 14M having a large refractive index difference with a dielectric material such as an air is provided around the UC dielectric waveguide 14UCB.

Moreover, an EM cladding (EMC) is provided between the holding unit 16 and the UC dielectric waveguide 14UCB at a port P1 at the input side of the UC dielectric waveguide 14UCB. Moreover, an EMC is provided between the holding unit 16 and the UC dielectric waveguide 14UCB at a port P2 at the output side of the UC dielectric waveguide 14UCB. The EMC is a low-refractive index cladding layer.

Adiabatic mode conversion structural units may be respectively provided at the port P1 at the input side of the UC dielectric waveguide 14UCB, and at the port P2 at the output side thereof. The adiabatic mode conversion structural units can reduce a coupling loss of THz wave in the input and output unit of the UC dielectric waveguide 14UCB.

(Experimental Results)

As illustrated in FIGS. 6A and 6B, the UC dielectric waveguide 14UCB having the simple 90-degree bend structure is created as the THZ circuit 20 according to the second embodiment. The width of the UC dielectric waveguide 14UCB is 200 µm, and the thickness of a dielectric substrate is 200 µm.

Figure 6C:
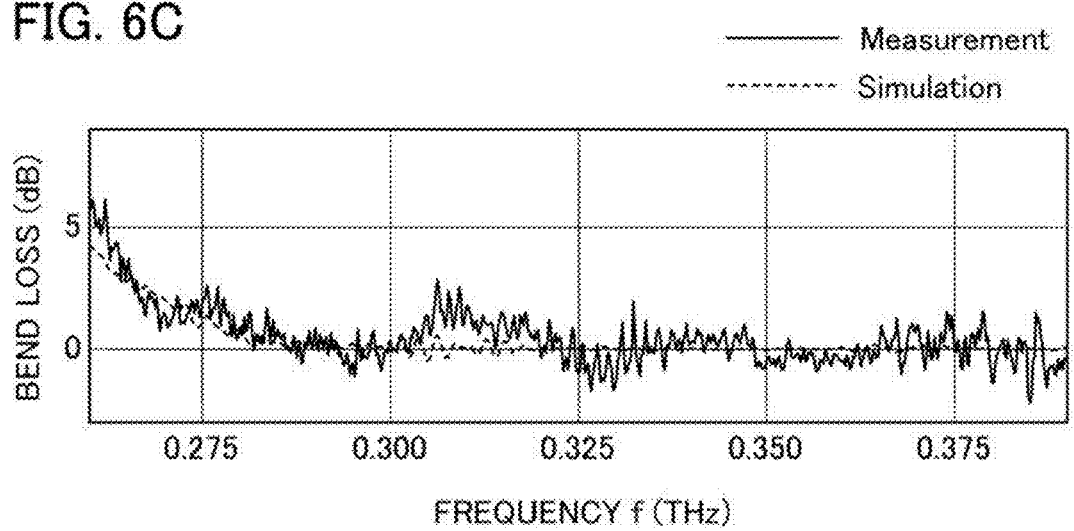
FIG. 6C shows an example of frequency characteristics of a bend loss of the THz circuit according to the second embodiment.

FIG. 6C illustrates an example of frequency characteristics of a bend loss of the THz circuit according to the second embodiment. The measured power is normalized with respect to the measured power of the same type of linear-shaped waveguide, in order to separate the bend response. The result is illustrated in FIG. 6C, and the simulation result and the experimental result are substantially matched with each other, Modified Example of Second Embodiment The THz circuit 20 according to the second embodiment includes the bent-shaped UC dielectric waveguide 14UCB having the simple 90-degree bend structure as illustrated in FIGS. 6A and 6B, but the bend angle thereof is not necessarily limited to 90 degrees.

Moreover, the structure of the holding unit 16 is not limited to such a square structure, The structure of the holding unit 16 may be a triangular structure, a quadrilateral structure, or even a polygonal structure with pentagons or The structure of the holding unit 16 may be a circular more. structure, an elliptical structure, or even an arbitrary closed loop structure.

In the THz circuit 20 according to the second embodiment, as illustrated in FIGS. 6A and 6B, the input port P1 and the output port P2 are respectively disposed at two adjacent sides of the holding unit 16, but the dispositions of the input port P1 and the output port P2 are not limited to two adjacent sides of the holding unit 16. If the holding unit 16 has a square structure or a rectangle structure, the input port P1 and the output port P2 may be respectively disposed at the opposite sides thereof. If the holding unit 16 has a polygonal structure, the input port P1 and the output port P2 may be respectively disposed at other sides except for the two adjacent sides. Moreover, it is sufficient if the holding unit 16 is disposed at a position capable of holding the input and output unit of the UC dielectric waveguide 14UCB, similar to the structures illustrated in FIGS. 3C to 3F.

Third Embodiment; Y-Coupled Branch Circuit

Figure 7A:
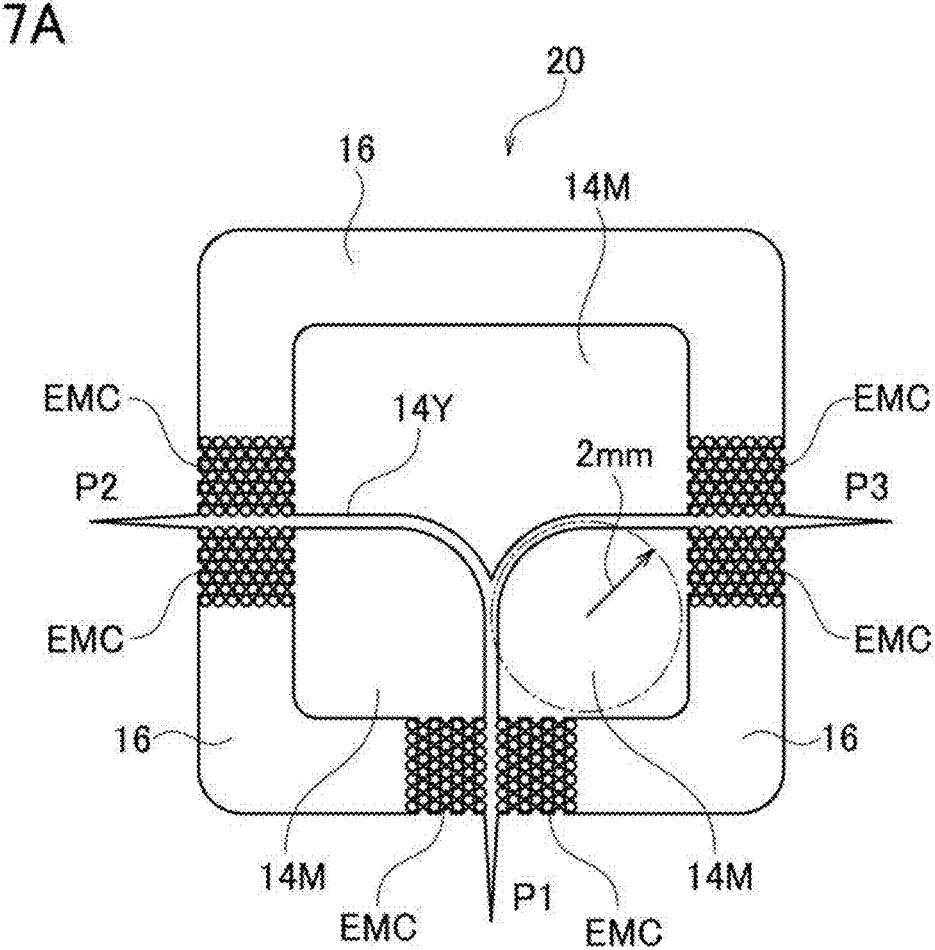
FIG. 7A is a top view diagram of a THz circuit (Y-coupled branch circuit) according to a third embodiment.
Figure 7B:
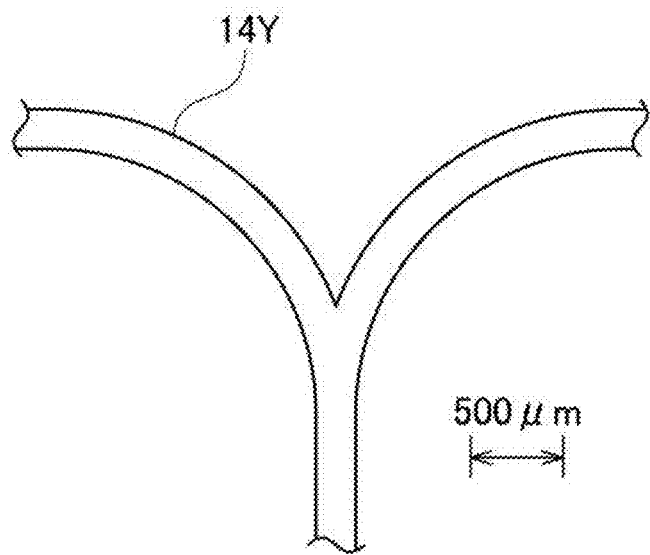
FIG. 7B is an enlarged view illustrating the Y-coupled portion of FIG. 7A.

FIG. 7A is a top view diagram illustrating a THz circuit 20 (Y-coupled branch circuit) according to a third embodiment. FIG. 7B is an enlarged view illustrating the Y-coupled portion of FIG. 7A.

The THz circuit 20 according to the third embodiment includes an UC dielectric waveguide 14Y, The UC dielectric waveguide 14Y constitutes a Y-coupled branch circuit. The Y-coupled branch circuit is a basic passive component of the THz circuit. The Y-coupled branch circuit functions as both a separator and a combiner of THz waves.

The UC dielectric waveguide 14Y is provided with a symmetrically arranged circular bend structure, as illustrated in FIG. 7A. The radius of the circular bend structure is 2 mm.

The UC dielectric waveguide 14Y is held by a holding unit 16. The holding unit 16 has a square structure, as illustrated in FIG. 7A. A first port P1 is disposed at one side of the square-structured holding unit 16, and a second port P2 and a third port P3 are respectively disposed at sides opposite to each other, each adjacent to the side at which the first port P1 is disposed.

The UC dielectric waveguide 14Y is contained in the holding unit 16, as illustrated in FIG. 7A. The UC dielectric waveguide 14Y is fabricated using the DRIE.

At the port P1, the port P2, and the port P3, an EM cladding (EMC) is provided between the holding unit 16 and the UC dielectric waveguide 14Y. The EMC is a low-refractive index cladding layer, A medium 14M around the UC dielectric waveguide 14Y can be formed, for example, of air, or inert gas such as nitrogen, xenon, or helium. The UC dielectric waveguide 14Y used herein does not have the EMC structure or PCC structure for confining THZ waves. The medium 14M having a large refractive index difference with a dielectric material such as an air is provided around the UC dielectric waveguide 14Y.

Moreover, an adiabatic mode conversion structural unit is provided at each of the port P1, the port P2, and the port P3. The adiabatic mode conversion structural units can reduce a coupling loss of THz wave in the input and output unit of the UC dielectric waveguide 14UCB.
(Experimental Results)

A terahertz (THz) source and a terahertz (THz) sensor are coupled between specific port pairs to measure power transmission between the port pairs. The specific ports are coupled to the THz source and the THz sensor by inserting the adiabatic mode conversion structural unit into a hollow metal waveguide.

In order to separate the UC dielectric waveguide 14Y itself from the coupling structure and the measurement system, a response of the linear-shaped UC dielectric waveguide is measured and then is corrected using this result, thereby normalizing the measured value of UC the dielectric waveguide 14Y.

Figure 8:
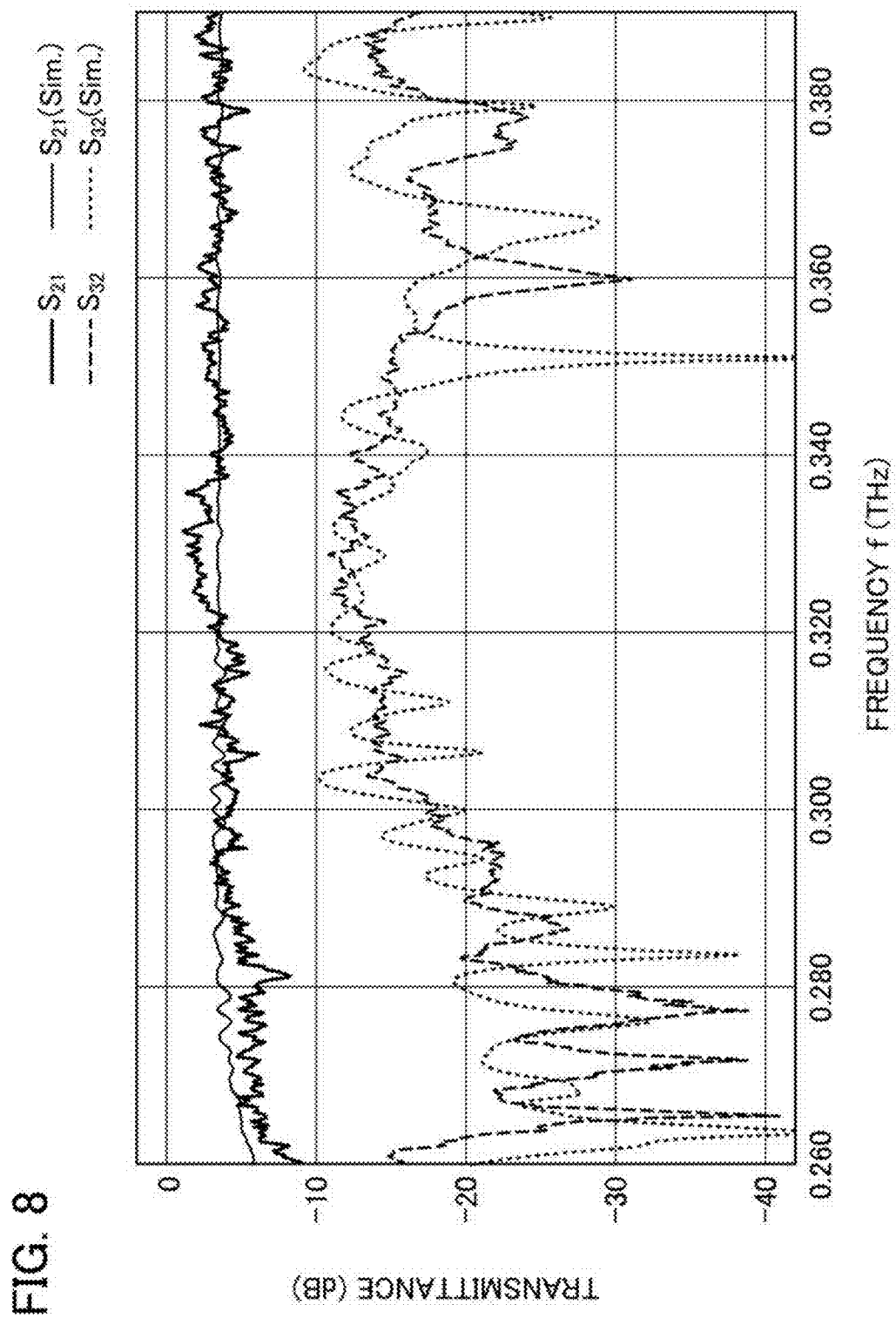
FIG. 8 illustrates an example of frequency characteristics of transmittance in the THz circuit according to the third embodiment.

FIG. 8 illustrates an example of frequency characteristics of f transmittance of the THZ circuit 20 according to the third embodiment. The results are substantially matched with the full wave simulation results, as illustrated in FIG. 8. $S_{21}$ denotes transmittance between the port P2 and the port P1. $S_{32}$ denotes transmittance between the port P3 and the port P2.

$S_{21}$ expressed by the solid line and $S_{32}$ expressed by the dashed line indicates experimental results. $S_{21}$ (Sim.) expressed by the solid line and $S_{32}$ (Sim.) expressed by the dashed line indicates simulation results.

In the case of $S_{21}=S_{31}$, the loss over the transmittance=−3 dB expected also from power separation is within a range of −0.5 dB at frequencies over 0.280 THz and corresponds to 90% efficiency, Since the absorption of intrinsic silicon is substantially negligible, the loss is mainly due to radiation at the center of the Y-coupled unit in the UC dielectric waveguide 14Y. Moreover, $S_{12}=S_{21}$ and $S_{13}=S_{31}$ are satisfied by the interrelationship. The value of transmittances $S_{32}$ and $S_{32}$ (Sim.) between the port P3 and the port P2 is greater than approximately-10 dB over the entire measurable bandwidth.
(THz Sensing)

Figure 9:
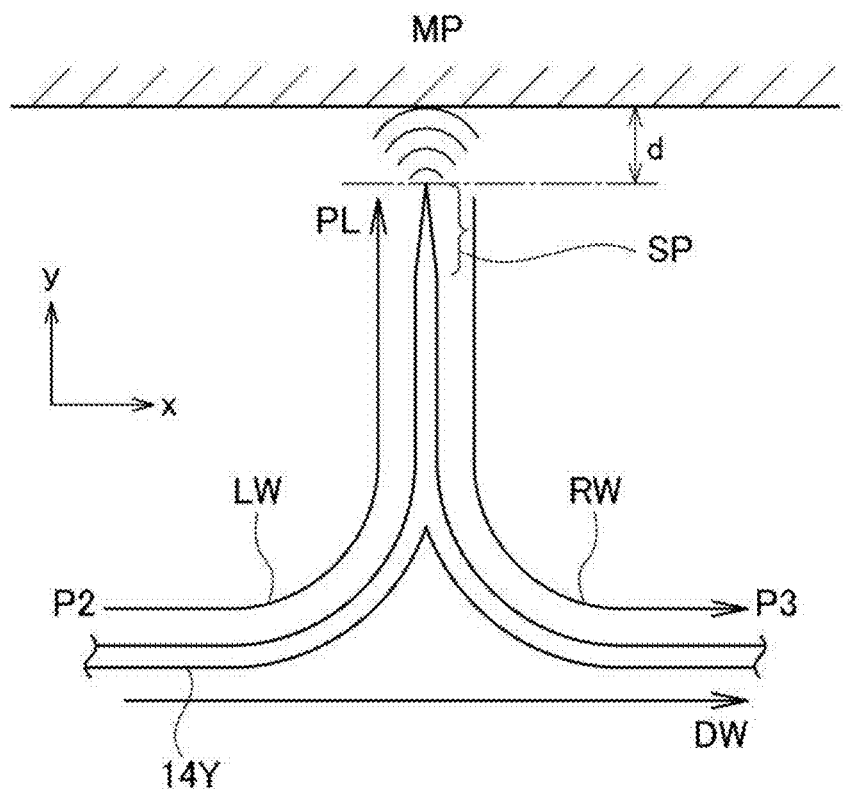
FIG. 9 illustrates an example of THz sensing using the THz circuit according to the third embodiment.

FIG. 9 illustrates an example of THz sensing using the UC dielectric waveguide 14Y of the THz circuit 20 according to the third embodiment (Y-coupled branch circuit). In FIG. 9, with respect to an input THz wave IW propagating to the port P1 from the port P2 of the UC dielectric waveguide 14Y, a THz wave RW reflected from a metal surface MP of a sensing target is obtained. The THz wave RW is propagated from the port P1 to the port P3 of the UC dielectric waveguide 14Y. Moreover, a direct wave DW is also propagated from the port P2 to the port P3 of the UC dielectric waveguide 14Y. A state of interference between the direct wave DW and the reflected wave RW from the sensing target changes in accordance with the distance d between a sensing probe SP of the port P1 and the sensing target. However, in a case of the distance d being equal to or less than ½ wavelength (in this case approximately 0.4 mm), it will act as a near-field probe from which a near field exudes.
(Demonstration of THz near field sensing)

Near field sensing is an application example of the THz wave. This is because the THz wavelength is shorter than the wavelength of the millimeter wave or microwave, making it easier to specify the sensing region. The THz waves can penetrate various optically opaque materials to proper physical depths, non-damagingly and non-ionizing. Furthermore, many targeted substances exhibit spectral characteristics identifiable in the THz region. For these reasons, the THz technology has potential applications in industrial inspection, medical image sensors, and pharmaceutical quality control.

Since there are three ports in the Y-coupled branch circuit, it is suitable for sensing applicability. The THz wave light source and the THz-wave detector are respectively connected to the port P2 and the port P3, and the port P1 can be used for the sensing region or the probe.
(Experimental Results)

Interference sensing has been experimented by a THz sensing configuration illustrated in FIG. 9. The THz wave light source and the THz-wave detector are respectively connected to the port P2 and the port P3 of the UC dielectric waveguide 14Y, and the port P1 of the UC dielectric waveguide 14Y is used as a probe.

A portion of energy coupled to the port P2 from the THz light source is transmitted to the port P1 through the UC dielectric waveguide 14Y, and is radiated from the sensing probe SP operating as a dielectric rod antenna.

Then, a portion of backscattered energy from the metal surface MP is received by the sensing probe SP at the port P1 of the UC dielectric waveguide 14Y, and is transmitted to the port P3 of the UC dielectric waveguide 14Y. The aforementioned energy interferes with the direct wave DW propagating between the ports P2 and P3. Although a signal component of the direct wave DW is small, it is equivalent to a signal component of the reflected wave RW. Accordingly, an influence of the interference can be clearly recognized. In order to simplify the experiment, the metal surface MP is chosen. The object of the experiment is to determine whether or not the presence of the metal surface MP has an identifiable influence on the measured transmittance $S_{32}$. In order to separate this influence therefrom, the transmittance $S_{32}$ measured in a state where the metal surface MP is disposed is normalized by being compared with the transmittance measured without the metal (i.e., corresponding to FIG. 7A).

Figure 10:
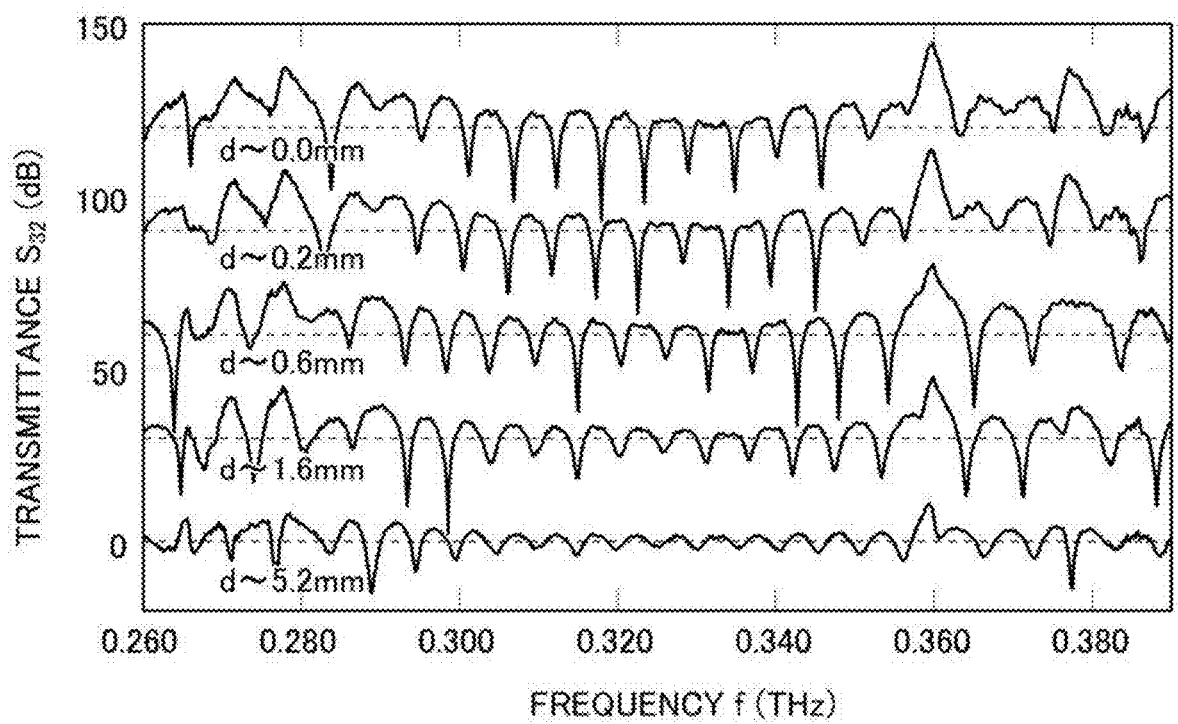
FIG. 10 illustrates an example of frequency characteristics of transmittance $S_{32}$ between a port P2 and a port P3 due to an influence of a metal surface, with the distance d a parameter, in FIG. 9.

FIG. 10 illustrates the measured result of frequency characteristics of the transmittance $S_{32}$ (dB) between the port P2 and the port P3 due to the influence of the metal surface MP, using the distance d between the metal surface MP the port P1 of the UC dielectric waveguide 14Y as a parameter, in FIG. 9. When the distance d from the metal surface MP is changed from 0.0 mm, 0.2 mm, 0.6 mm, 1.6 mm, and 5.2 mm, interference fringes can be clearly seen in all cases. The spacing and the depth of the interference fringes are different in accordance with the values of specific distance d.

(Relationship between Free Spectrum Region and Distance d)

Figure 11:
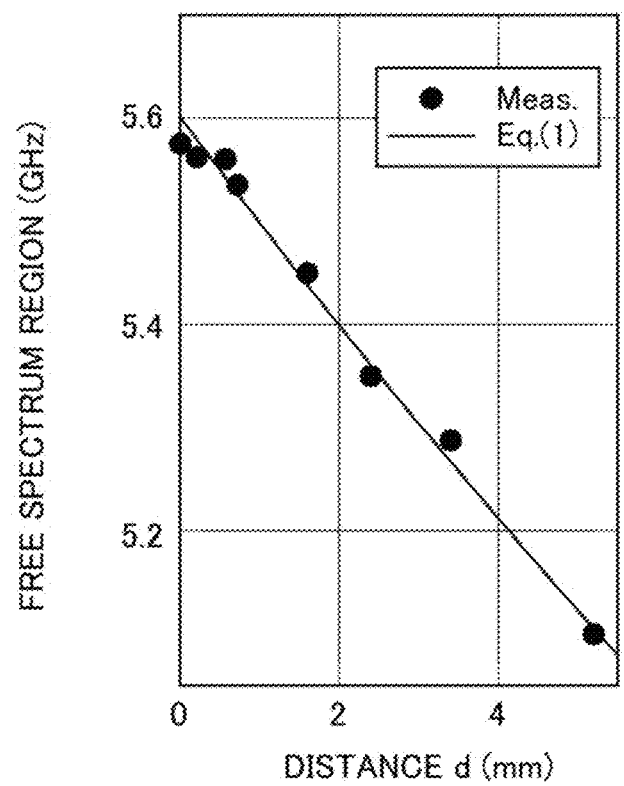
FIG. 11 illustrates a relationship between a free spectrum region and the distance d.

FIG. 11 illustrates a relationship between a free spectrum region and the distance d. In FIG. 11, the free spectrum region (i.e., frequency separation between interference fringes) is extracted in the frequency domain ranging from 0,297 THz to 0.346 THz, and plotted as a function of the distance d. These results indicate monotonous dependency of the free spectrum region with respect to the distance d, and can be modeled by the following equation (1), Free spectrum region=$c/(\Delta L_0+d)$  (1)

Equation (1) allows the calculation of the change of the frequency required for increasing the path length difference by one wavelength. Consequently, the interference state returns to the original state.

In equation (1), c is light velocity and the constant $\Delta L_0$ corresponds to optical path length difference obtained in the case of d=0, i.e., inside of the THz circuit 20 (Y-coupled branch circuit) itself. In this case, average value of $\Delta L_0$=53.6 mm is calculated from all measured results. In this manner, the THz circuit 20 (Y-coupled branch circuit) can be used as a non-contact shape measuring device, using equation (1).

The dynamic range of sensor can be presumed as the peak deviation of the measured result of transmittance $S_{32}$ due to the influence of the metal surface MP. This occurs at 0.318 THz for d~0, with a measured deviation of −27 dB. Since lateral resolution is also important, simulated field distribution is used in order to sense a position of a field near the sensing area.

Figure 12:
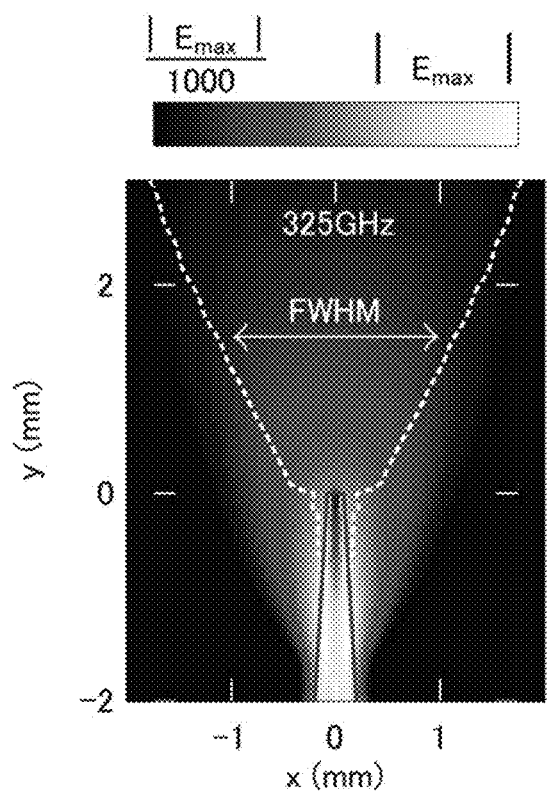
FIG. 12 illustrates an example of a Full-Width at Half-Maximum (FWHM) near-field pattern and an electric field distribution of a dielectric rod that constitutes a sensing probe.

FIG. 12 illustrates an example of a Full-Width at Half-Maximum (FWHM) near-field pattern and electric field distribution of a dielectric rod that constitute the sensing probe SP. FIG. 12 illustrates electric field distribution when there is no sample at 0.325 THz. This frequency is chosen in particular since it is at the center of the measurable bandwidth. The full width extracted by the FWHM is less than half the free-space wavelength of 420 μm at a surface of the probe. The FWHM increases as the field diverges due to diffraction, but remains less than 1 mm at distances less than 230 μm.

The demonstrated sensing technology is closely related to terahertz optical coherence tomography, and can be used for 3D object transmission imaging. Such systems typically adopt bulky free-space optical systems, such as dielectric lenses, parabolic reflector plates, and planar beam splitters, in order to separate the terahertz beam into two paths. One of the paths affects a sample under test, and the other affects a reference such as a planar mirror. Both paths are recombined and come to interfere before detection.

In contrast, the Y-shaped junction of the UC dielectric waveguide 14Y in the THz circuit 20 according to the third embodiment (Y-coupled branch circuit) monolithically integrates an interferometer, and a coupling structure of the light source and the sensor, and an installation area of the device is integrated as a near field sensing region of 14×16 mm². Therefore, the UC dielectric waveguide 14Y can realize the optical coherence tomography system for the THz region in a compact configuration.

Fourth Embodiment

Figure 13A:
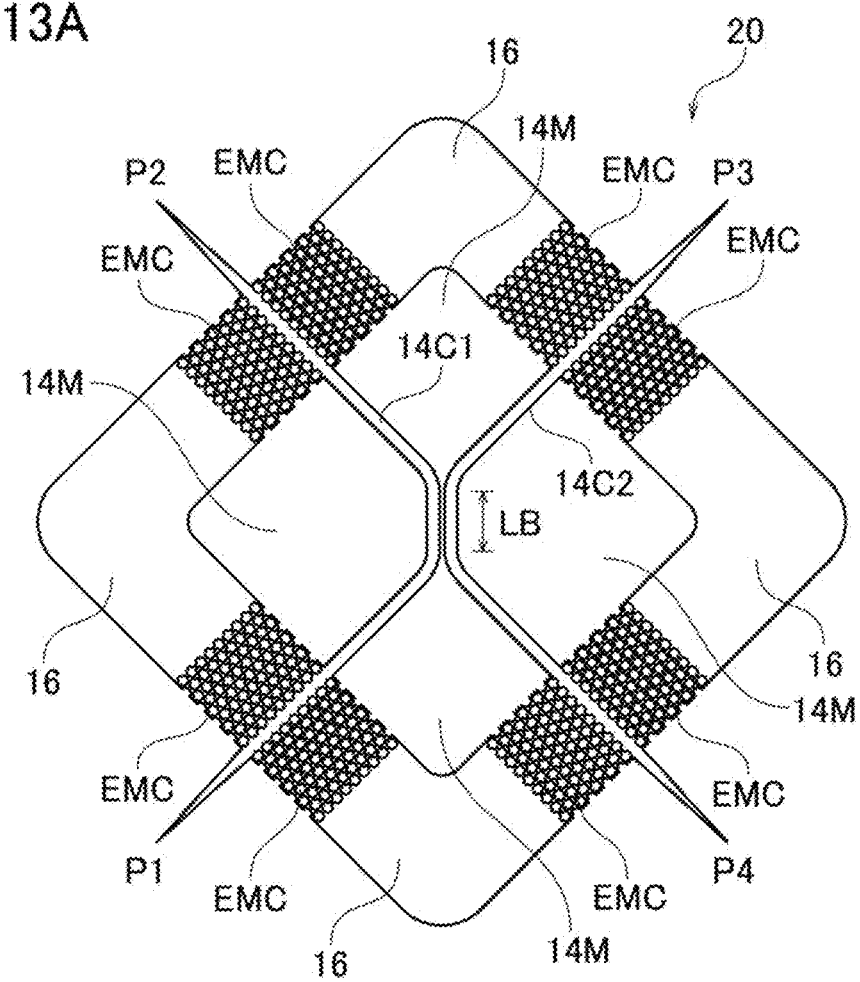
FIG. 13A is a top view diagram illustrating a THz circuit (multiplexing/demultiplexing circuit) according to a fourth embodiment.
Figure 13B:
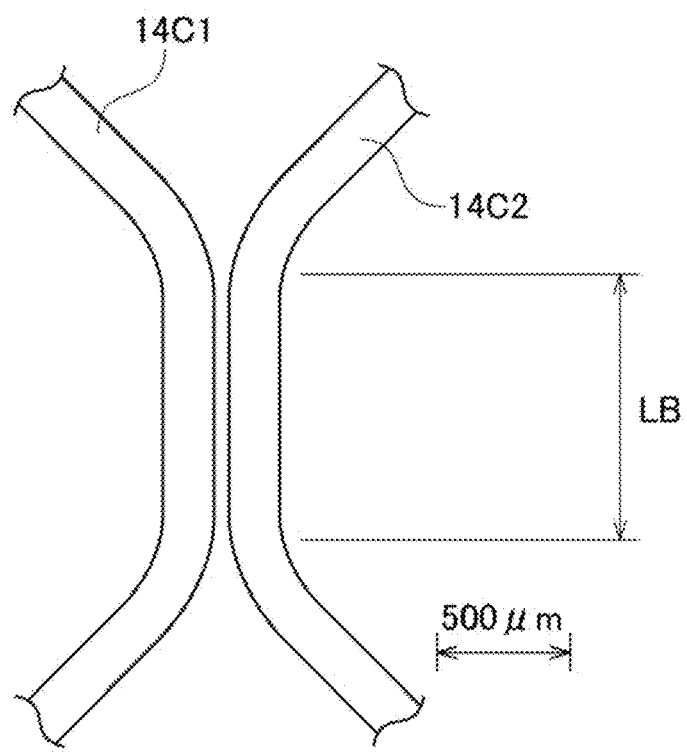
FIG. 13B is an enlarged view illustrating the center portion of FIG. 13A.

FIG. 13A is a top view diagram illustrating a THz circuit (multiplexing/demultiplexing circuit) according to a fourth embodiment. FIG. 13B is an enlarged view illustrating the center portion of FIG. 13A, According to the fourth embodiment, the THz circuit 20 includes a first UC dielectric waveguide 14C1 and a second UC dielectric waveguide 14C2, each having a bend structure, as illustrated in FIGS. 13A and 13B, The THz circuit 20 according to the fourth embodiment includes a 2×2 evanescent coupler. The 2×2 evanescent coupler is a THz wave multiplexing/demultiplexing circuit. The first UC dielectric waveguide 14C1 and the second UC dielectric waveguide 14C2 are close to each other back to back at a THz wave coupling portion. The first UC dielectric waveguide 14C1 and the second UC dielectric waveguide 14C2 are close to each other but are not connected to each other, at the THz wave coupling portion, At the THz wave coupling portion, the first and second UC dielectric waveguides are close to each other so that the energy of the THz wave can be exchanged via the evanescent field. Accordingly, the THz circuit 20 according the fourth embodiment (multiplexing/demultiplexing to circuit) is configured to include the first UC dielectric waveguide 14C1 and the second UC dielectric waveguide 14C2 close to each other so that the energy can be exchanged via the evanescent field.

The first UC dielectric waveguide 14C1 is provided with two 45-degree circular bend structures having radius of 1 mm and includes a port P1 and a port P2. The second UC dielectric waveguide 14C2 is also provided with two 45-degree circular bend structures having radius of 1 mm and also includes a port P3 and a port P4.

The first UC dielectric waveguide 14C1 and the second UC dielectric waveguide 14C2 are held by a holding unit 16. The holding unit 16 has a square structure, as illustrated in FIG. 13A, The port P1 and the port P2 are respectively disposed at two adjacent sides of the holding unit 16. The port P3 and the port P4 are respectively disposed at two adjacent sides of the holding unit 16. The port P1 and the port P3 are respectively disposed at two opposite sides of the holding unit 16. The port P2 and the port P4 are respectively disposed at two opposite sides of the holding unit 16.

EMC is disposed at the port P1 and port P2 portions in contact with the holding unit 16 of the first UC dielectric waveguide 14C1. EMC is disposed at the port P3 and port P4 portions in contact with the holding unit 16 of the second UC dielectric waveguide 14C2. The EMC is a low-refractive index cladding layer, A medium 14M around the first UC dielectric waveguide 14C1 and the second UC dielectric waveguide 14C2 can be formed, for example, of air, or inert gas such as nitrogen, xenon, or helium. The first UC dielectric waveguide 14C1 and the second UC dielectric waveguide 14C2 used herein does not have the EMC structure or PCC structure for confining THz waves. The medium 14M having a large refractive index difference with a dielectric material such as an air is provided around the first UC dielectric waveguide 14C1 and the second UC dielectric waveguide 14C2.

Adiabatic mode conversion structural units may be respectively provided at the port P1 and the port P2 of the first UC dielectric waveguide 14C1. Adiabatic mode conversion structural units may be respectively provided at the port P3 and the port P4 of the second UC dielectric waveguide 14C2. A coupling loss of THE wave can be reduced by the adiabatic mode conversion structural units.

(Experimental Results)

The 2×2 evanescent coupler is configured to include two waveguides close to each other so that the energy can be exchanged via the evanescent field. The 2×2 evanescent coupler can both separate and combine the THz waves, similar to the Y-coupling and separating circuit. For a given waveguide width, THz wave confinement is generally weaker at lower frequencies. Therefore, the proportion of the evanescent field is increased in terms of operation. Accordingly, an effect of the near field coupling between adjacent waveguides is stronger at lower frequencies, so that all energy can be propagated from one waveguide to another waveguide over a shorter distance.

The 2×2 evanescent coupler includes the first UC dielectric waveguide 14C1 and the second UC dielectric waveguide 14C2. The waveguide pair including the first UC dielectric waveguide 14Cl and the second UC dielectric waveguide 1402 is parallel to the coupling length LB of 600 μm and is separated from each other by 50 μm. The values of the coupling length LB of 600 μm and the separation width of 50 μm are smaller than the free-space f wavelength. TWO waveguides are close to each other by four 45-degree circular shape bends having radius of 1 mm.

The evanescent coupler including the first UC dielectric waveguide 14C1 and the second UC dielectric waveguide 14C2 is housed in the holding unit 16.

The evanescent coupler including the first UC dielectric waveguide 14C1 and the second UC dielectric waveguide 14C2 is fabricated using the DRIE. The resulting structure is illustrated in FIGS. 13A and 13B.

The evanescent coupler including the first UC dielectric waveguide 14C1 and the second UC dielectric waveguide 14C2 is capable of measurement by connecting hollow metal waveguides at the ports P1, P2, P3, and P4. The power of the evanescent coupler including the first UC dielectric waveguide 14C1 and the second UC dielectric waveguide 14C2 is normalized by performing measurement, comparison, and calibration of the power of the linear-shaped waveguide, in order to remove the effect of not only the measurement system but also the input coupling structure in the connecting point to the holding unit 16.

Figure 14:
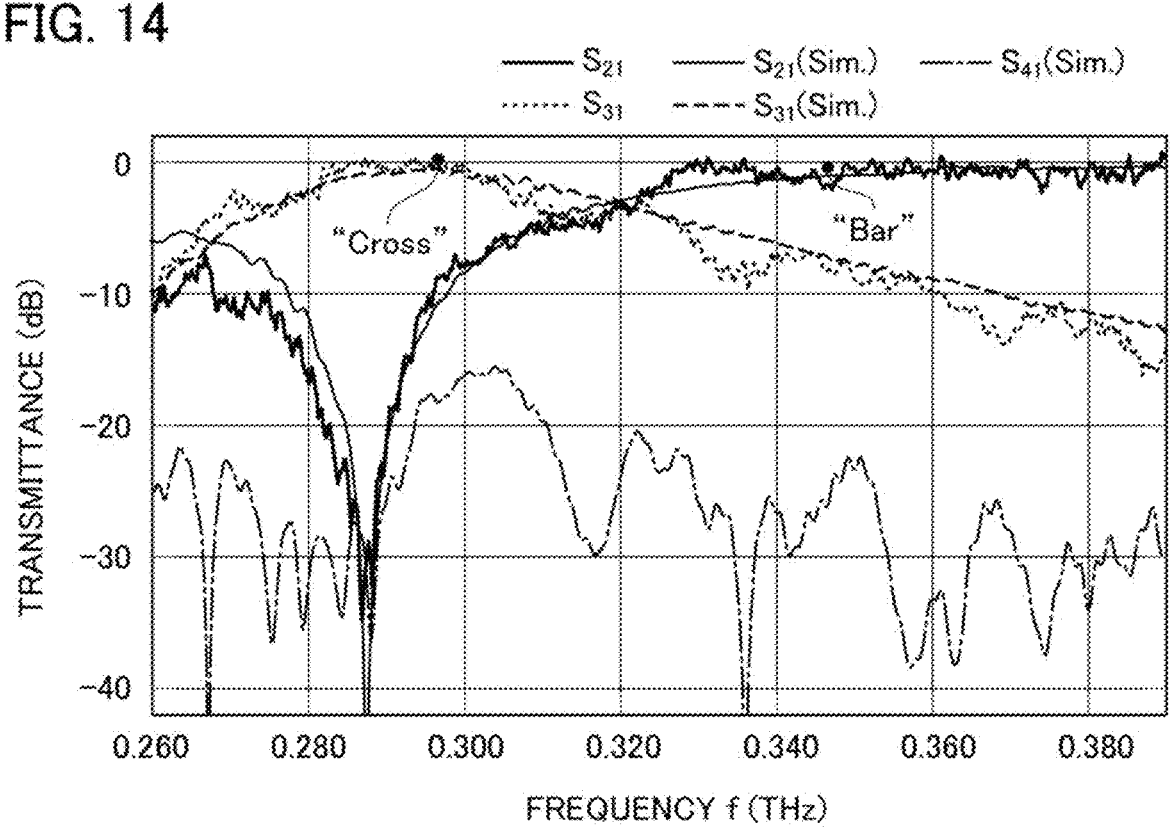
FIG. 14 illustrates an example of frequency characteristics of transmittance in the THZ circuit (multiplexing/demultiplexing circuit) according to the fourth embodiment.

FIG. 14 illustrates an example of frequency characteristics of transmittance in the THE circuit (2×2 evanescent coupler) according to the fourth embodiment.

In FIG. 14, the transmittance $S_{21}$ between the port P2 and the port P1 is expressed by the solid line. The transmittance $S_{21}$ is considerably matched with the transmittance $S_{zt}$ (Sim.) of simulation.

In FIG. 14, the transmittance Sai between the port P3 and the port P1 is expressed by the dashed line. The transmittance $S_{31}$ is considerably matched with the transmittance Sai (Sim.) of simulation.

It has been verified from the response characteristics of the 2×2 evanescent coupler that the frequency separation is actually possible. The low frequency component is easily propagated the coupling portion, and a transmittance peak is near the frequency f=approximately 0.290 THZ, and the propagated power gradually decreases as the frequency f increases. The crossover point between two operation modes, a bar operation mode between the port P2 and the port P1 and a cross operation mode between the port P3 and the port P1, is at a frequency f=approximately 0.320 THZ. It can also be seen that at a frequency below f=approximately 0.290 THz, the energy is gradually propagated to the original waveguide after being coupled through the coupling portion, and as the transmittance $S_{21}$ recovers, the transmittance Sai begins to decrease, The port P4 is not intended to transfer useful THz power. An unnecessary signal transmitted to the port P4 through reflection or the parasitic evanescent coupling from the port P1 can be sensed. Accordingly, it is configured so that a coupling spike is attached to the port P4 and thereby this unnecessary power can radiate into free space. Therefore, it is not necessary to experimentally sense the transmittance $S_{41}$. The simulation result illustrated in FIG. 14 indicates that the transmittance $S_{41}$ is less than 15 dB over the entire measurable bandwidth.

As illustrated in FIG. 14, the cross operation mode between the port P3 and the port P1 exhibits filter characteristics in that high transmittance is obtained in the low frequency band (0.270 THz to 0.320 THz) and no transmission is obtained at other frequencies. In contrast, the bar operation mode between the port P2 and the port P1 exhibits filter characteristics in that high transmittance is obtained in the high frequency band (0.320 THE or more) and no transmission is obtained at other frequencies. More specifically, into the port P1, when a signal with a frequency from 0.270 THz to 0.320 THz is entered, an output from the port P3 is obtained, and when a signal with a frequency of 0.320 THz or more is entered, an output from the port P2 is obtained. In contrast, when a signal with a frequency of 0.320 THz or more is entered into the port P2 and a signal with a frequency from 0.270 THz to 0.320 THz is entered into the port P3, a multiplexed result is sent from the port P1.

The above-mentioned results prove that the input/output to the port P1 can be multiplexed/demultiplexed to the port P2 and the port P3 by different frequencies.

(Multiplexing of THz Communications)

The THz range is a portion of electromagnetic spectra with available untapped spectrum bandwidth which is not currently occupied by wireless services. Accordingly, the THz waves have potential for large-capacity wireless communication applications.

In the THZ circuit (multiplexing/demultiplexing circuit) according to the fourth embodiment, signals having different carrier frequencies are generated at different locations (port P3 and port P1, port P2 and port P1) in the THz circuit (multiplexing/demultiplexing circuit), Therefore, multiplexing of THz communications can be realized by multiplexing in the frequency domain at the physical level. This means that independent THz sources can be dedicated to each channel, Therefore, the overall transmission power of a specific port-to-port coupling increases, and the range thereof widens. Moreover, complexity required for an intermediate frequency circuit and a baseband circuit can be reduced by reducing the data rate that each circuit processes.

The frequency separation characteristic illustrated in FIG. 14 is an simple form of frequency multiplexing in the THz frequency domain. Accordingly, the evanescent coupler can operate as a frequency diplexer. Specifically, the port P2 and the port P3 respectively provide paths for high and low frequency signals in order to establish an interface with the port P1. Thus, two channels are formed, the higher frequency channel is interfaced to the port P2 and is in the bar operation mode. The lower frequency channel at the port P3 side is in the cross operation mode. It has been demonstrated that, by both channels, digitally modulated THz signals can be transmitted.

In this experiment, the bar channel uses a carrier frequency of 0.348 THz, and the cross channel uses a carrier frequency of 0.298 THZ. These frequencies are chosen in consideration of usable untapped spectrum bandwidth in each channel and the maximum output power around 0.320 THz to 0.330 THz. For both channels, the bit error rate is measured as a function of data rate.

Figure 15:
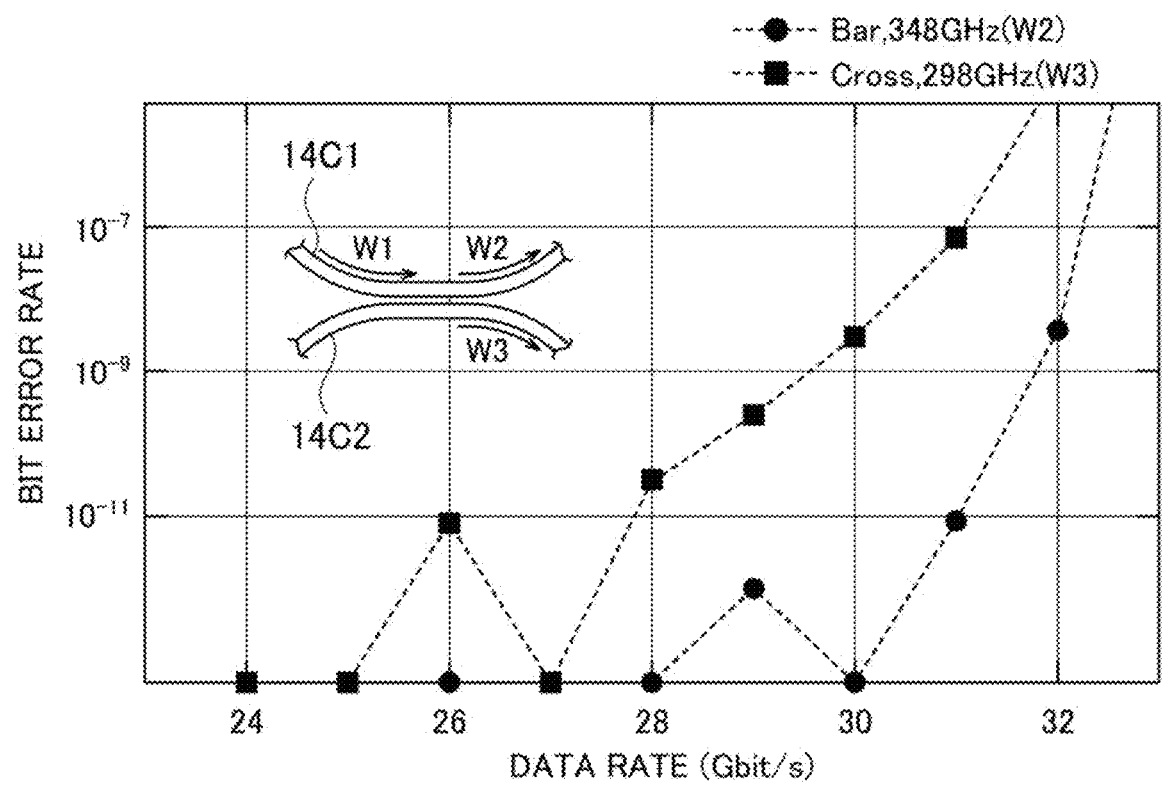
FIG. 15 illustrates a measured result of a bit error rate and a data rate, in a two-channel THz communication executed by using the THz circuit (multiplexing/demultiplexing circuit) according to the fourth embodiment.

FIG. 15 illustrates a measured result of a bit error rate and a data rate, in a two-channel THz communication executed by using the THz circuit (multiplexing/demultiplexing circuit) according to the fourth embodiment. In FIGS. 15, W1 and W2 denote THz waves propagating through the first UC dielectric waveguide 14C1. the THZ W3 denotes wave propagating through the second UC dielectric waveguide 14C2. The THz wave W1 entered from the port P1 propagates as the THz wave W2 through the first UC dielectric waveguide 14C1 to the port P2, in the bar operation mode. On the other hand, the THz wave W1 entered from the port P1 propagates as the THz wave W3 through the second UC dielectric waveguide 1402 to the port P3, in the cross operation mode. The result illustrated in FIG. 15 proves that the THZ circuit (multiplexing/demultiplexing circuit) according to the fourth embodiment can transmit data rate of several tens of Gbit/s through the both channels. This result indicates that all of the dielectric waveguide, the bend structure, and the evanescent coupler have low dispersion.

Figure 16A:
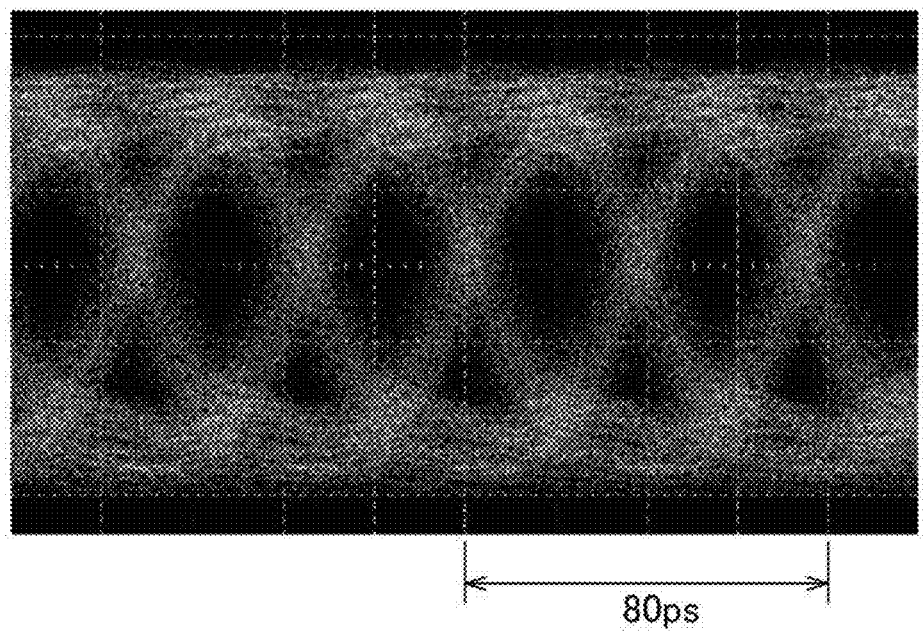
FIG. 16A illustrates an example of a lower-frequency side eye pattern, in the two-channel THZ communication executed by using the THz circuit (multiplexing/demultiplexing circuit) according to the fourth embodiment.
Figure 16B:
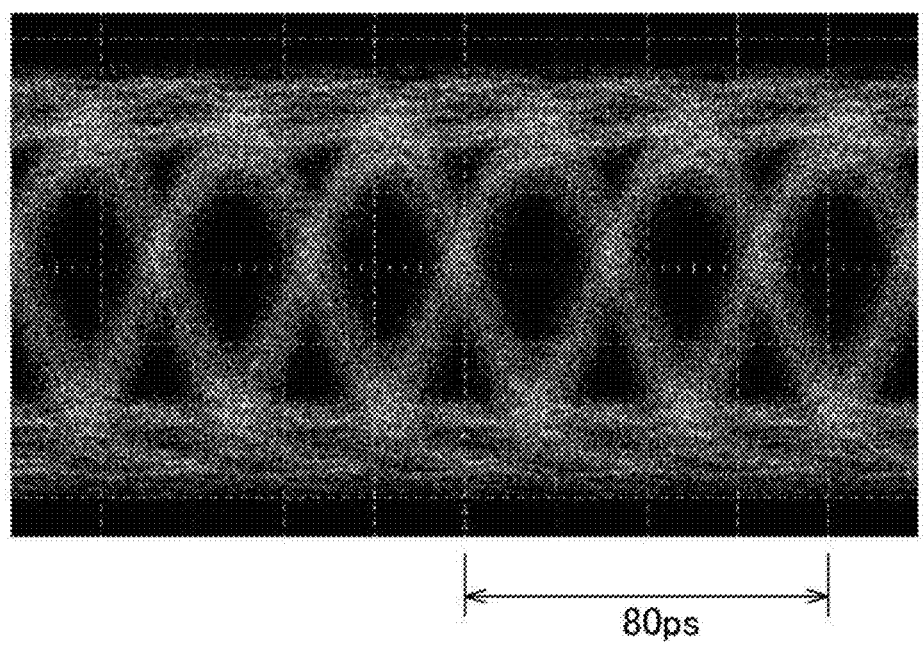
FIG. 16B illustrates an example of a higher-frequency side eye pattern, in the two-channel THZ communication executed by using the THz circuit (multiplexing/demultiplexing circuit) according to the fourth embodiment.

FIG. 16A illustrates an example of a lower-frequency side eye pattern in the two-channel THz communication. FIG. 16B illustrates an example of a higher-frequency side eye pattern in the two-channel THz communication. FIGS. 16A and 16B show that the eyes are clearly open. FIG. 16A corresponds to the cross operation mode between the port P3 and the port P1, resulting in a data rate of 27 Gbit/s at a frequency f=0.298 THz. On the other hand, FIG. 16B corresponds to the bar operation mode between the port P2 and the port P1, resulting in a data rate of 30 Gbit/s at a frequency f=0.348 THZ. That is, two-channel communication of 27 Gbit/s and 30 Gbit/s can be realized. The THZ circuit (multiplexing/demultiplexing circuit) according to the fourth embodiment can be applied to the frequency multiplex communications.

Figure 17A:
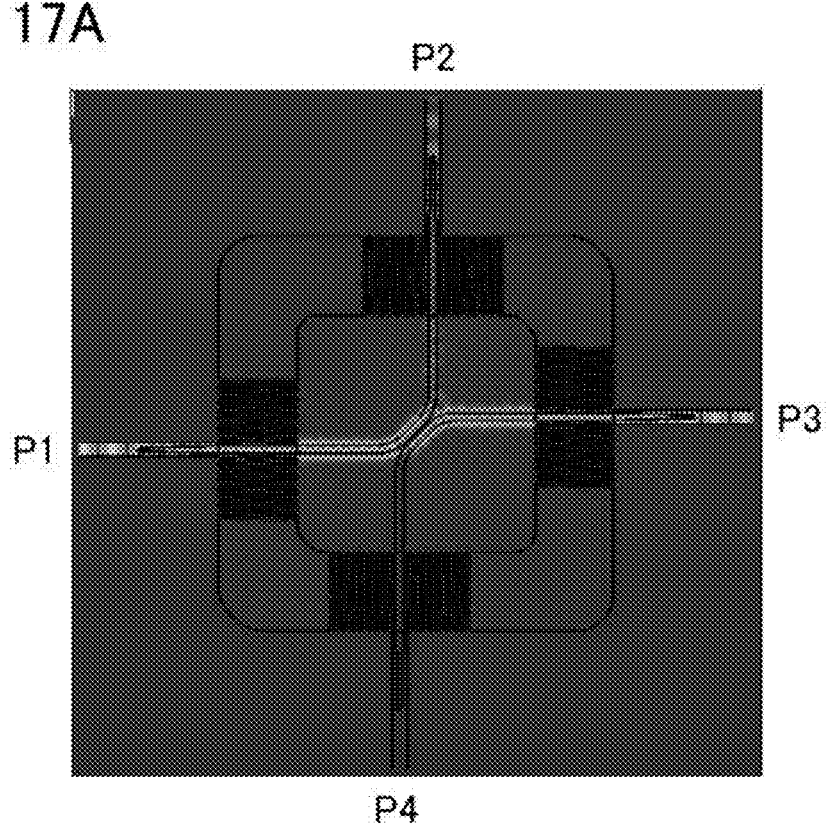
FIG. 17A illustrates an electromagnetic field simulation result (cross characteristics) in the THz circuit (multiplexing/demultiplexing circuit) according to the fourth embodiment.
Figure 17B:
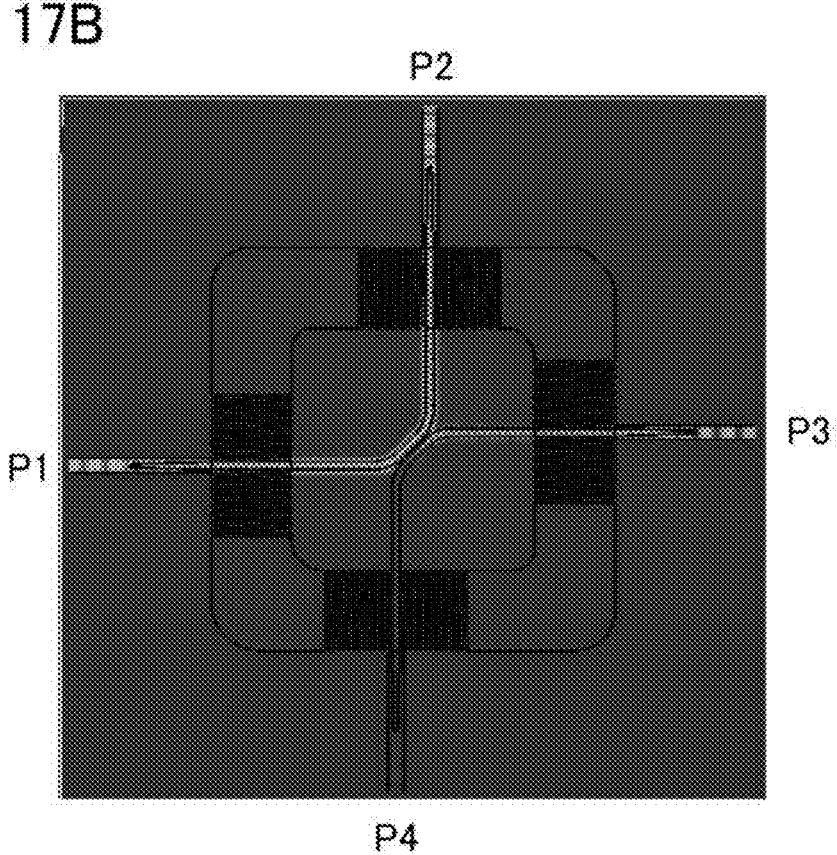
FIG. 17B illustrates an electromagnetic field simulation result (bar characteristics) in the THZ circuit (multiplexing/demultiplexing circuit) according to the fourth embodiment.

FIG. 17A illustrates an electromagnetic field simulation result (cross characteristics) in the THZ circuit (multiplexing/demultiplexing circuit) according to the fourth embodiment. FIG. 17B illustrates an electromagnetic field simulation result (bar characteristics) in the THz circuit (multiplexing/demultiplexing circuit) according to the fourth embodiment. FIG. 17A corresponds to the cross operation mode between the port P3 and the port P1, with frequency f=0.295 THz. FIG. 17B corresponds to the bar operation mode between the port P2 and the port P1, with frequency f=0.350 THZ.

The above-mentioned experimental result indicates that the THz circuit 20 (2×2 evanescent coupler) according to the fourth embodiment can operate as the frequency diplexer.

Furthermore, it is also possible to remove out-of-band components in each channel by directly integrating a silicon photonic filter or the like with the evanescent coupler and housing them in the same supporting unit.

Fifth Embodiment

Figure 18:
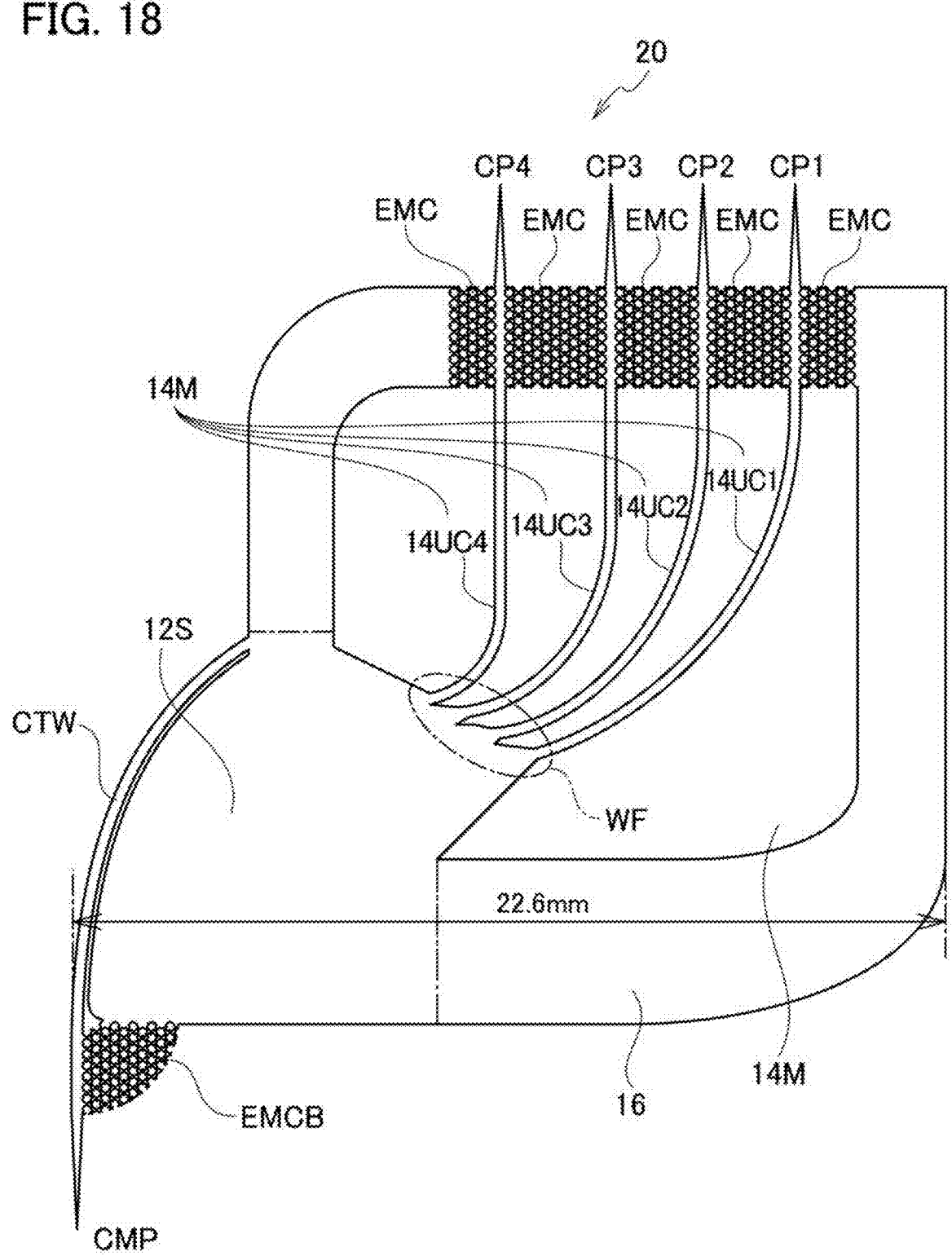
FIG. 18 is a schematic plain diagram illustrating a THz circuit (multi-channel multiplexing/demultiplexing circuit) according to a fifth embodiment.

FIG. 18 is a schematic plain diagram illustrating a THz circuit 20 (multi-channel multiplexing/demultiplexing circuit) according to a fifth embodiment.

A coupling port CMP at an input side is connected to a holding unit 16 through a supporting unit EMCB composed of the EMC. A slab region 12S is formed at an input side of the holding unit 16.

The input-side coupling port CMP coupled to a curved tunneling waveguide CTW. UC dielectric waveguides 14UC1, 14UC2, 14UC3, and 14UC4 are coupled respectively between the slab region 12S and the output-side coupling port CP1, CP2, CP3, and CP4. The slab region 12S and the UC dielectric waveguide 14UC1, 14UC2, 14UC3, and 14UC4 are coupled to each other at a waveguide flare WF portion. The EMC is disposed between the UC dielectric waveguide 14UC1, 14UC2, 14UC3, and 14UC4, and the holding unit 16.

Figure 19A:
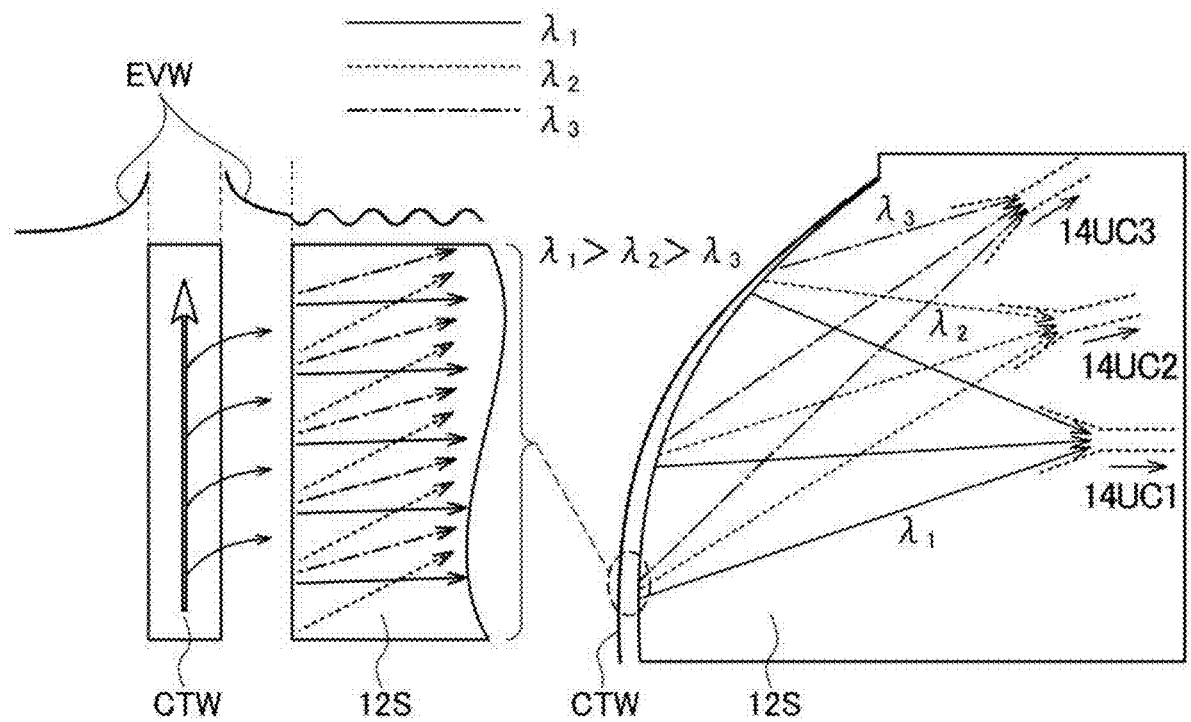
FIG. 19A is an operation explanatory diagram of the THz circuit (multi-channel multiplexing/demultiplexing circuit) according to the fifth embodiment.

FIG. 19A is an operation explanatory diagram of the THz circuit according to the fifth embodiment.

Figure 19B:
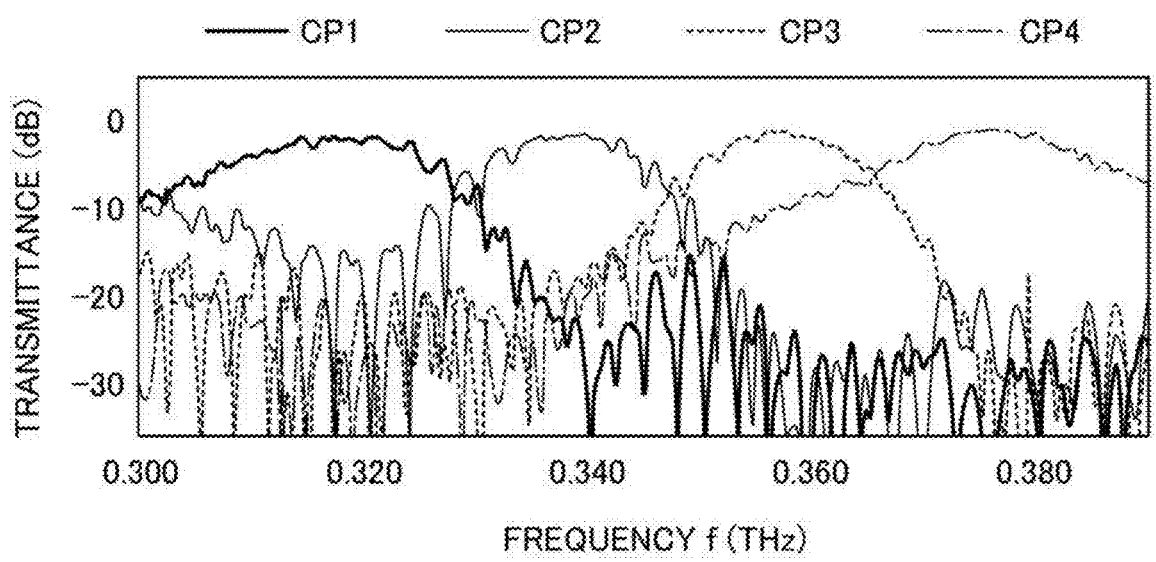
FIG. 19B illustrates an example of frequency characteristics of transmittance in each channel of the THz circuit (multi-channel multiplexing/demultiplexing circuit) according to the fifth embodiment.

In FIG. 19A, the EVW denotes an exudative component called an evanescent wave from a core of the tunneling waveguide CTW. The left-hand EVW represents an aspect of normal exponential decay. The right-hand EVW represents an aspect that an evanescent component is coupled to the slab region 12S. The slab region 12S is a dielectric film or dielectric slab, typically formed of silicon. The process of coupling the evanescent component to the slab region 12S from the core of the tunneling waveguide CTW is called an Optical Tunneling Process (OTP), and the state of propagation through the slab region 12S is called a slab mode. The strength of the coupling is stronger the longer the wavelength and the closer the distance between the core of the tunneling waveguide CTW and the slab region 12S. Using this property, a longer-wavelength component ($\lambda_1$) first transfers from the core of the waveguide to the slab at a location where the distance between the core of the tunneling waveguide CTW and the slab region 12S are separated from each other. As the distance between the tunneling waveguide CTW and the slab region 12S decreases, the shorter-wavelength components ($\lambda_2$, $\lambda_3$) respectively transfer to the slab region 12S at different positions. Consequently, the components of different wavelengths $\lambda_1$, $\lambda_2$, and $\lambda_3$ can be spatially separated one another. Since the product of wavelength and frequency is constant, light velocity, the components of different frequencies $f_1$, $f_2$, and $f_3$ can be spatially separated to one another. The different wavelengths $\lambda_1$, $\lambda_2$, and $\lambda_3$ have a relationship of $\lambda_1 > \lambda_2 > \lambda_3$. In this way, the components transferred to different positions propagate through the slab region 12S, are coupled to the UC dielectric waveguides 14UC1, 14UC2, and 14UC3, and are output. Coupling to the UC dielectric waveguide 14UC4 is performed in the same way, although the illustration is omitted, FIG. 19B illustrates an example of frequency characteristics of transmittance in each channel of the THz circuit according to the fifth embodiment. A waveguide is utilized for the input/output, the THz source is coupled to the input-side coupling port CMP, the THz sensor is coupled to the output-side coupling ports CP1, CP2, CP3, CP4, to measure the frequency characteristics example of transmittance in each channel. At the output-side coupling ports CP1, CP2, CP3, and CP4, transmittance peak is sensed respectively at a frequencies f=0.318 THz, 0.338 THz, 0.358 THz, and 0.368 THZ, and wavelength (frequency) multiplexing is realized.

In the THz circuit (multi-channel multiplexing/demultiplexing circuit) according to the fifth embodiment, the wavelength (frequency) multiplexing/demultiplexing circuit is realized by utilizing the difference in coupling due to the wavelength from the waveguide to the slab region.

(THZ Integrated Circuit; Integration of Multiplexing/Demultiplexing Circuit and THz Active Device)

Figure 20:
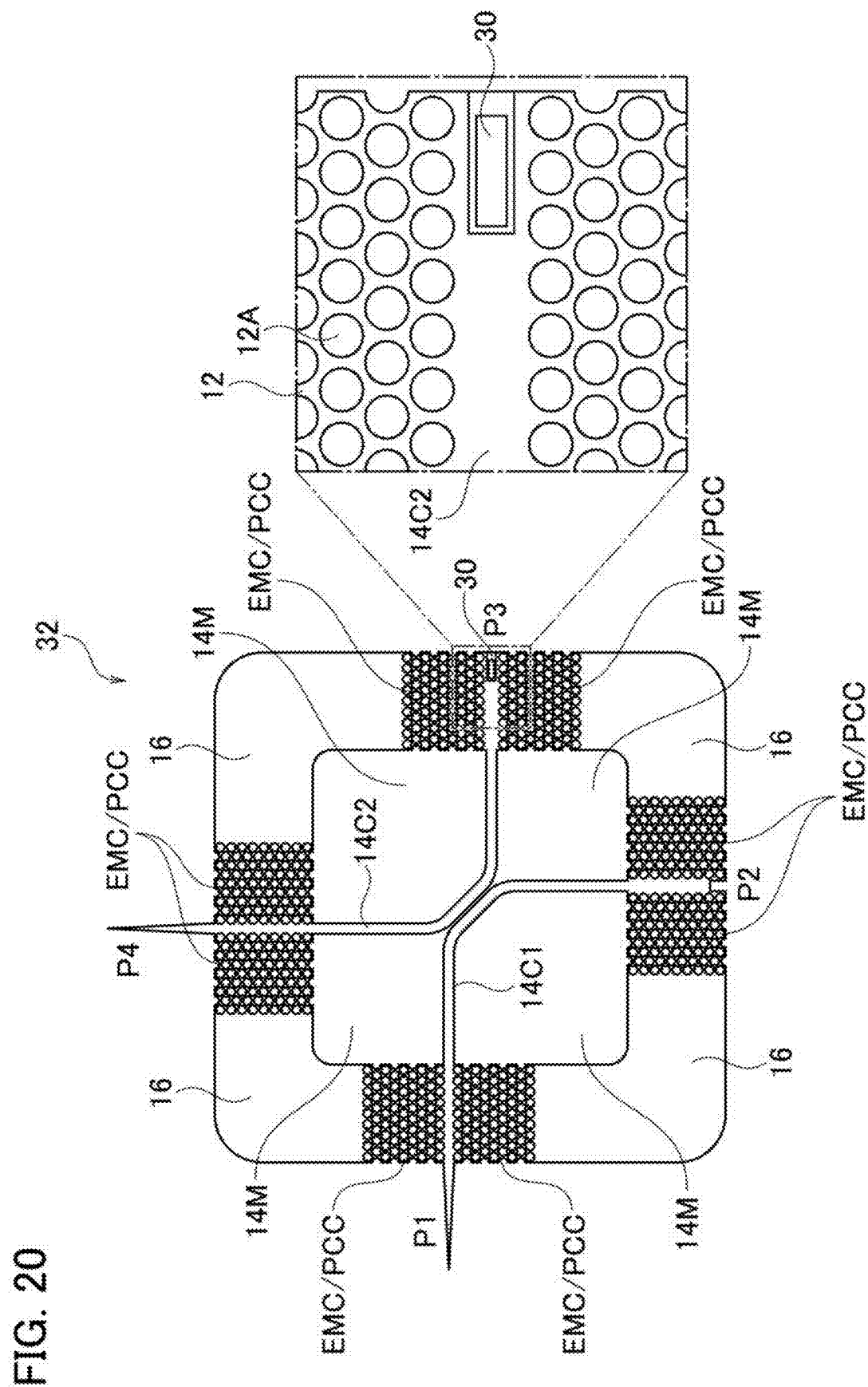
FIG. 20 is a top view diagram illustrating a THz integrated circuit obtained by integrating the THz circuit (multiplexing/demultiplexing circuit) according to the fourth embodiment and a THz active device.

FIG. 20 is a top view diagram illustrating a THz integrated circuit obtained by integrating the THz circuit (multiplexing/demultiplexing circuit) according to the fourth embodiment and a THz active device.

In FIG. 20, the first UC dielectric waveguide 14C1 is disposed between the port P1 and the port P2, and the second UC dielectric waveguide 14C2 is disposed between the port P3 and the port P4. The 2×2 evanescent coupler is constituted including the first UC dielectric waveguide 14C1 and the second UC dielectric waveguide 14C2. The evanescent coupler including the first UC dielectric waveguide 14O1 and the second UC dielectric waveguide 14C2 is housed in the holding unit 16. The EM cladding (EMC) or PC cladding (PCC) is disposed between the first UC dielectric waveguide 14C1 and the holding unit 16. Also between the second UC dielectric waveguide 14O2 and the holding unit 16, the EMC or PCC is disposed.

The period of the PCC is larger than that of the EMC, and electromagnetic waves are affected by periodic structure and act as photonic crystals. That is, the photonic band gap effect that acts as a mirror is exhibited, and a portion filled the holes of photonic crystal acts as a waveguide.

Moreover, as illustrated in FIG. 20, a THz active device 30 is integrated near the port P3 of the second UC dielectric waveguide 14C2. The THE active device 30 also includes an electronic device that can operate in the terahertz (THz) wave region, a photoelectric conversion device such as photodiodes, and a photonic device such as quantum cascade lasers.

As devices for oscillating high frequency electromagnetic waves of the THz frequency band, there have been known devices having a structure in which a Resonant Tunneling Diode (RTD) and a minute slot antenna is integrated. As an example, if the THz active device 30 is used as the RID, when the photonic crystal is utilized, coupling efficiency between the active device and the waveguide can be increased. However, the THz active device 30 is not limited to the RTD. Even if not the PCC but the EMC is disposed between the holding unit 16 and the second UC dielectric waveguide 14C2, coupling between the second UC dielectric waveguide 14C2 and the THz active device 30 is possible.

The evanescent coupler including the first UC dielectric waveguide 14C1 and the second UC dielectric waveguide 14C2 is fabricated using the DRIE. The resulting structure is illustrated in FIG. 20.

The evanescent coupler including the first UC dielectric waveguide 14C1 and the second UC dielectric waveguide 14C2 can be measured by connecting a hollow metal waveguide to a coupling metal spike at the port P1 and the port P4, but such an input and output structure is substantially unnecessary.

The evanescent coupler including the first UC dielectric waveguide 14C1 and the second UC dielectric waveguide 14C2 may have the THz active device 30 or the antenna integrated at each of the port P1, the port P2, and the port P4.

The RTD is typical as the THz active device 30, but the THz active device 30 can be composed also from diodes or transistors except for the RTD, As other active devices, for example, a Tunnel Transit Time (TUNNETT) diode, an Impact Ionization Avalanche Transit Time (IMPATT) diode, a GaAs based Field Effect Transistor (FET), a GaN based FET, High Electron Mobility Transistor (HEMT), a Heterojunction Bipolar Transistor (HBT), a complementary Metal-Oxide-Semiconductor (CMOS) FET, or the like are also applicable thereto.

Antennas in which planar integration is available, e.g. a bow tie antenna, a dipole antenna, a slot antenna, a patch antenna, and a Yagi-Uda antenna, are applicable thereto.

According to the embodiments, there can be provided the THz integrated circuit capable of highly efficient matching between the THz active device and the antenna due to the impedance conversion effect of the UC dielectric waveguide. It is also possible to incorporate required elements such as a THz source, a sensor, and a mixer.

(THz Circuit; High-Pass Filter)

Figure 21:
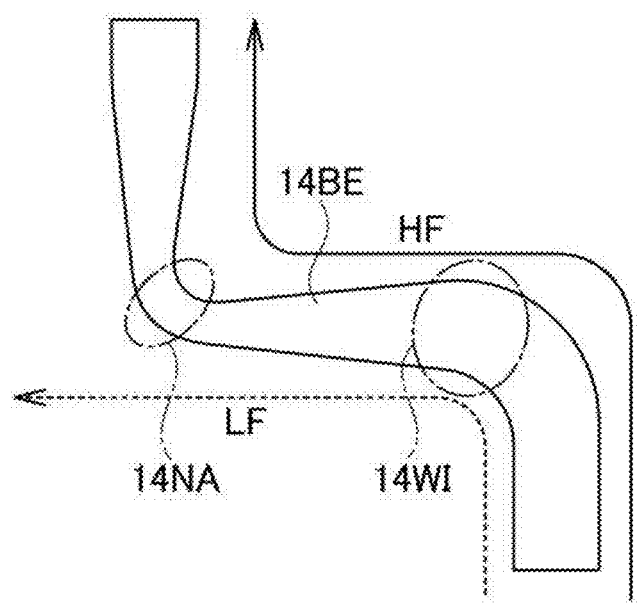
FIG. 21 is a schematic plain diagram illustrating a dielectric waveguide in the THz circuit (high-pass filter) according to the sixth embodiment.

FIG. 21 is a schematic plain diagram illustrating an UC dielectric waveguide 14BE in the THz circuit (high-pass filter) according to the sixth embodiment. The UC dielectric waveguide 14BE is a UC dielectric waveguide having a bend structure.

As illustrated in FIG. 21, the UC dielectric waveguide 14BE of the THz circuit (high-pass filter) according to the sixth embodiment includes a UC dielectric waveguide having a first wiring width at a first bent portion, and a second wiring width wider than the first wiring width at a second portion different from the first bent portion. More specifically, the first bent portion has a narrow wiring width of the UC dielectric waveguide 14NA. The second bent portion different from the first bent portion has a normal wiring width 14WI. The normal wiring width 14WI used herein is a width of the dielectric waveguide capable of propagating the THz wave of a predetermined frequency. The narrow wiring width of the UC dielectric waveguide 14NA used herein means that the wiring width is narrower than the normal wiring width 14WI.

Figure 22:
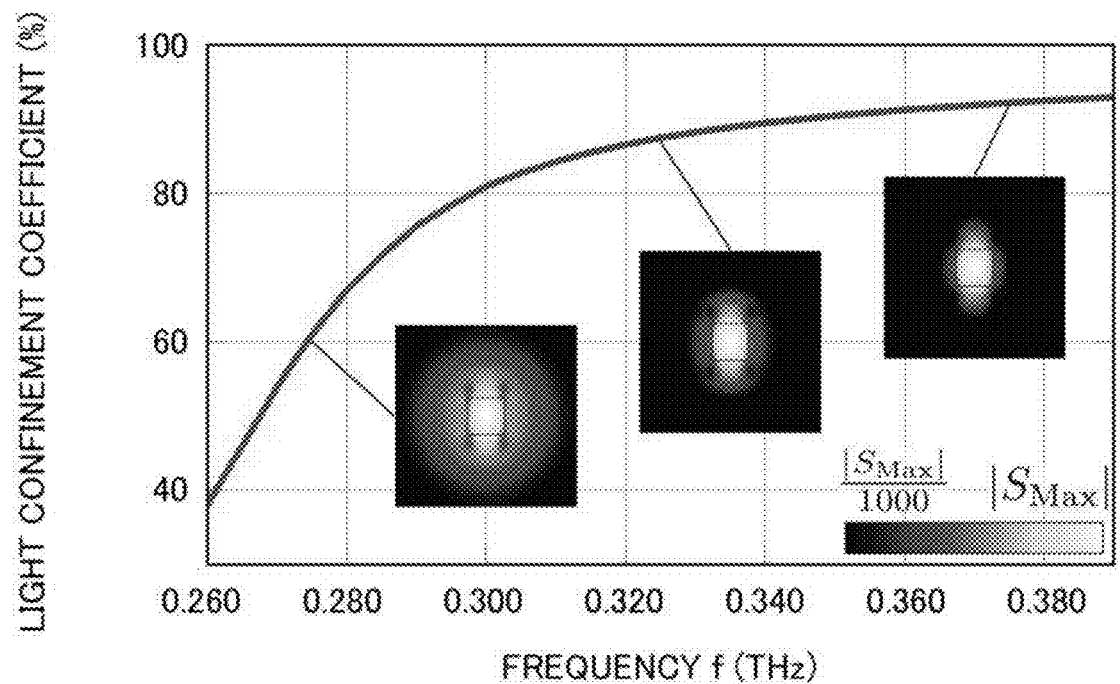
FIG. 22 illustrates an electromagnetic field simulation result of a relationship between a light confinement coefficient (%) and a frequency f of the dielectric waveguide.

FIG. 22 illustrates an electromagnetic field simulation result of a relationship between a light confinement coefficient (%) and a frequency f of the dielectric waveguide. The light confinement coefficient is defined as electromagnetic field energy/total electromagnetic field energy confined within the dielectric waveguide, and is normalized at the maximum value $S_{max}$ of magnitude of the power strength S. Three photographs in FIG. 22 show a cross-sectional structure of the dielectric waveguide. The photographs show states of confinement of electromagnetic fields and effusion to a peripheral portion, in the cross-sectional structure of the dielectric waveguide of approximately 200 μm×200 μm. As illustrated in FIG. 22, light confinement coefficients are approximately 60%, approximately 85%, and approximately 90% respectively at frequencies f=approximately 0.275 THz, f=approximately 0.325 THz, and f=approximately 0,375 THz, The confinement of the electromagnetic field in the dielectric waveguide becomes stronger as the frequency becomes higher, and becomes weaker as the frequency becomes lower. A higher frequency corresponds to a shorter wavelength, and a lower frequency corresponds to a longer wavelength. On the other hand, if the wiring width is constant, the shorter the wavelength, the stronger the confinement, and the longer the wavelength, the weaker the confinement.

As illustrated in FIG. 21, by appropriately bending the dielectric waveguide, the low frequency component LF (Low Frequency) of the THz wave is radiated without being confined. In contrast, the high frequency component HF (High Frequency) of the THz wave propagates while being confined within the dielectric waveguide, More specifically, the dielectric waveguide of the THz circuit (high-pass filter) according to the sixth embodiment can have frequency dependency (filtering function). It can operate as a High Pass Filter (HPF) that transmits the high frequency component HF and radiates the low frequency component LF. In particular, by narrowing the width of the dielectric waveguide at the bent portion, the radiation of low frequency component can be promoted. Thus, it is possible to suppress unnecessary components and to improve crosstalk by the filtering function.

Figure 23A:
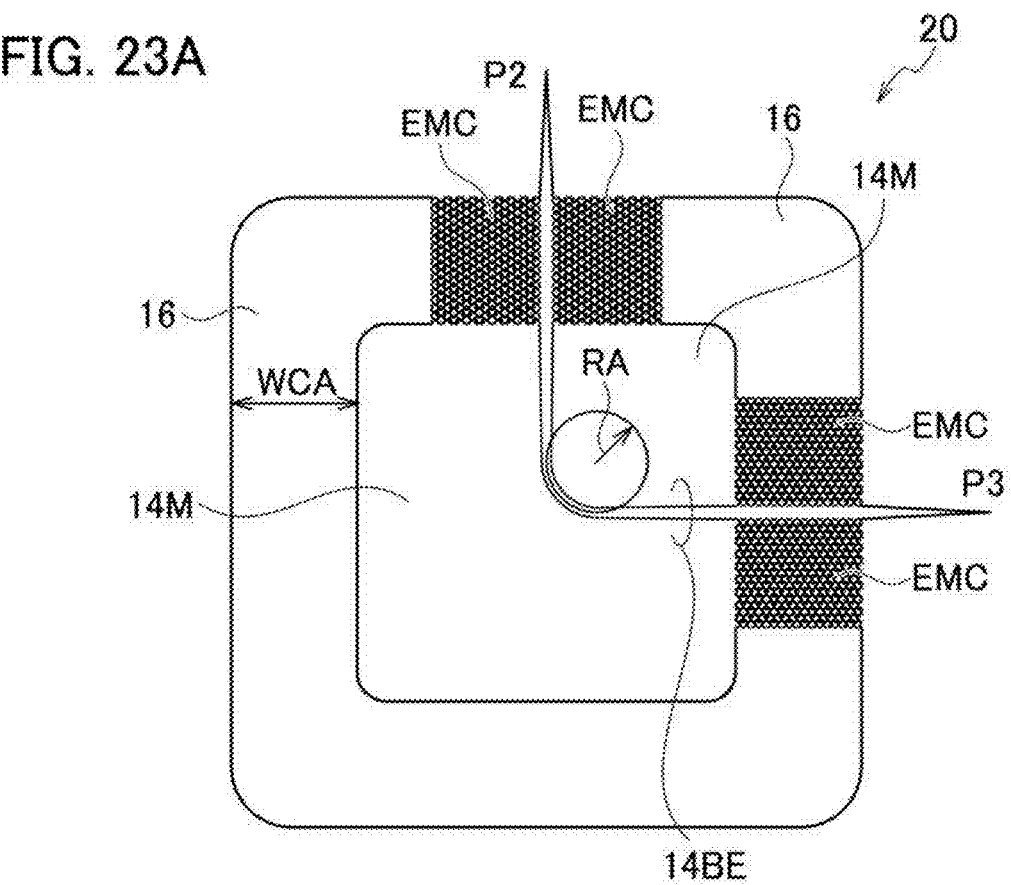
FIG. 23A is a top view diagram illustrating the THz circuit (high-pass filter) according to the sixth embodiment.
Figure 23B:
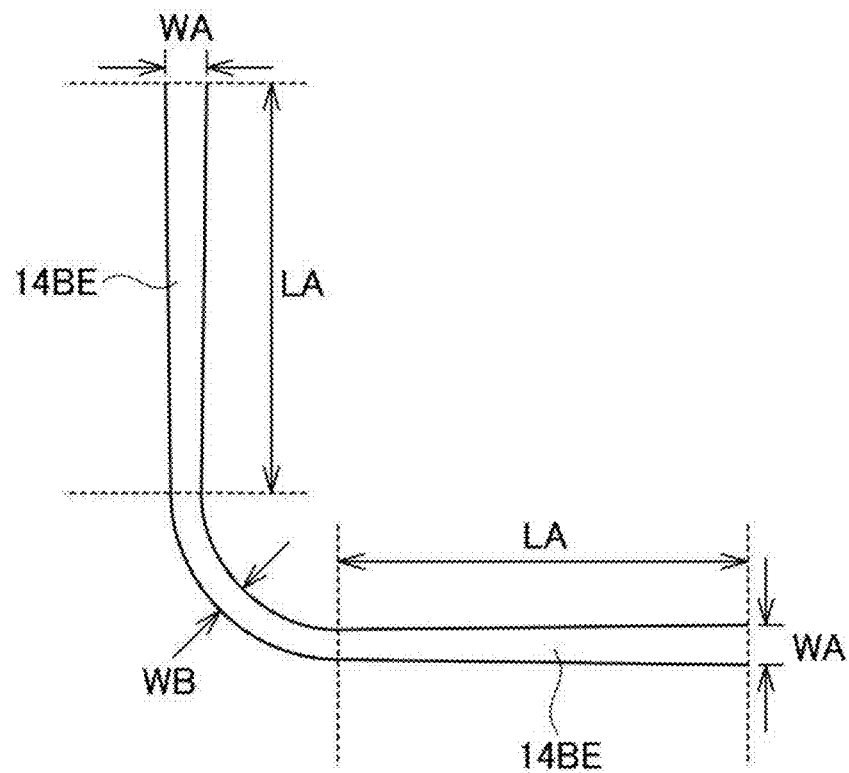
FIG. 23B is an enlarged plan view illustrating the dielectric waveguide portion of FIG. 23A.

FIG. 23A is a top view diagram illustrating the THz circuit (high-pass filter) according to the sixth embodiment. FIG. 23B is an enlarged plan view illustrating the dielectric waveguide portion of FIG. 23A.

The THz circuit 20 according to the sixth embodiment includes a bent-shaped UC dielectric waveguide 14BE having a simple 90-degree circular bend structure, as illustrated in FIGS. 23A and 23B. The curvature radius RA of the 90-degree circular bend structure is approximately 800 μm. The width WB of the bent portion is, for example, approximately 152 μm and the length LA of the straight line portion is approximately 2.2 mm, in the UC dielectric waveguide 14BE. Moreover, the basic waveguide width WA in a portion in contact with the holding unit 16 is, for example, approximately 200 μm.

The UC dielectric waveguide 14BE is held by a holding unit 16. The holding unit 16 has a square structure, as illustrated in FIG. 6A. An input port P2 and an output port P3 are respectively disposed at two adjacent sides of the holding unit 16. The width WC of the holding unit 16 is, for example, approximately 2 mm.

Effective-refractive-index confinement waveguides are respectively disposed at the input and output portions of the UC dielectric waveguide 14BE. A medium 14M around the UC dielectric waveguide 14BE can be formed, for example, of air, or inert gas such as nitrogen, xenon, or helium. The UC dielectric waveguide 14BE used herein does not have the EMC structure or PCC structure for confining THz waves. The medium 14M having a large refractive index difference with a dielectric material such as an air is provided around the UC dielectric waveguide 14BE.

Moreover, the EMC is provided between the holding unit 16 and the UC dielectric waveguide 14BE at the port P2 at the input side of the UC dielectric waveguide 14BE. Moreover, the EMC is provided between the holding unit 16 and the UC dielectric waveguide 14BE at the port P3 at the output side of the UC dielectric waveguide 14BE. The EMC is a low-refractive index cladding layer.

Adiabatic mode conversion structural units may be respectively provided at the port P2 at the input side of the UC dielectric waveguide 14BE, and at the port P3 at the output side thereof. The adiabatic mode conversion structural units can reduce a coupling loss of THz wave in the input and output unit of the UC dielectric waveguide 14BE.

The THz circuit (high-pass filter) according to the sixth embodiment can have frequency dependency (filtering function) by gradually reducing the waveguide width from the basic waveguide width WA at the portion in contact with the holding unit 16 to the waveguide WB of the bent portion. It can operate as the HPF that transmits the high frequency component HF and radiates the low frequency component LF. In particular, by narrowing the width of the dielectric waveguide at the bent portion, the radiation of low frequency component can be promoted. Thus, it is possible to suppress unnecessary components and to improve crosstalk by the filtering function.

For example, as a design example for a low cut off frequency of 0.33 THz (wavelength of 0.91 mm), the radiation of low frequency component LF can be increased by setting the radius of curvature 800 μm approximately the wavelength and the waveguide width WB of the bent portion ⅙ or less of the wavelength. It is possible to increase the radiation of the low frequency component LF if the wavelength is less than half of the wavelength (e.g., approximately 300 μm, assuming an effective refractive index of approximately 3) in consideration of the refractive index.

(THz Circuit; Low-Pass Filter)

Figure 24:
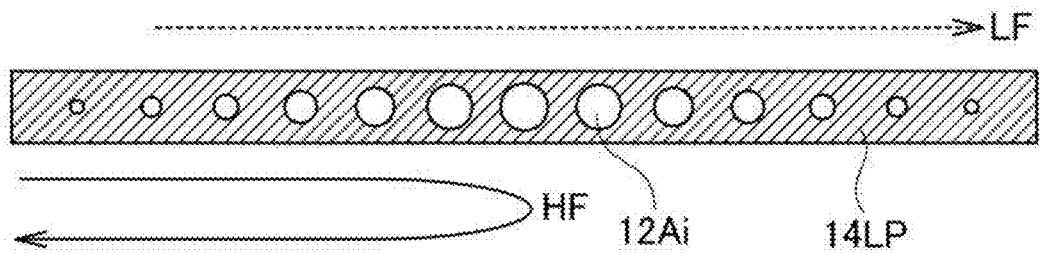
FIG. 24 is a schematic plain diagram illustrating a dielectric waveguide in a THz circuit (low-pass filter) according to a seventh embodiment.
Figure 25:
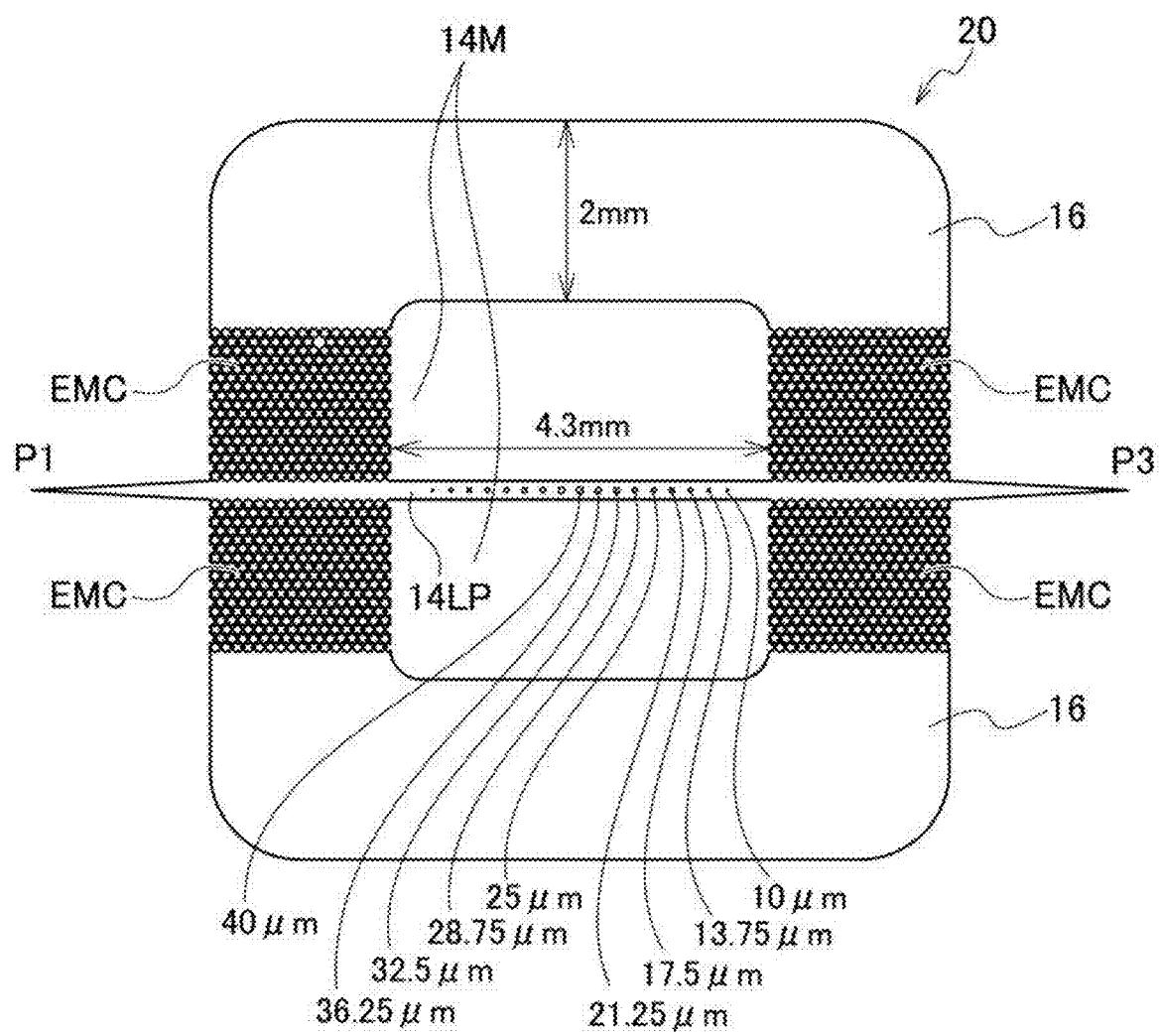
FIG. 25 is a top view diagram illustrating the THz circuit (low-pass filter) according to the seventh embodiment.

FIG. 24 is a schematic plain diagram illustrating an UC dielectric waveguide 14LP in a THz circuit (low-pass filter) according to a seventh embodiment. FIG. 25 is a top view diagram illustrating the THz circuit (low-pass filter) 20 according to the seventh embodiment.

The UC dielectric waveguide 14LP in the THz circuit (low-pass filter) according to the seventh embodiment includes periodic lattice points (holes) 12Ai, as illustrated in FIG. 24. The period ai and the hole diameter of the lattice points 12Ai are designed so that an target frequency (high frequency component HF) can be reflected. The size and/or the period ai of the lattice point 12Ai are gradually enlarged for impedance matching (reflection suppression) and wideband operation with respect to the low frequency component LF. A so-called distributed Bragg reflector mirror is formed. The period ai is designed to be approximately one-half wavelength, taking into account the refractive index. The period ai used herein is the distance between the center of lattice point 12Ai and the center of the adjacent lattice point 12Ai+1, and is defined as a lattice constant. The radius of lattice point 12Ai is defined as a radius of the circular hole of the lattice point 12Ai, There is now described the reason for gradually increasing the size and/or the period ai of the holes 12Ai for impedance matching (reflection suppression) and wide-band operation with respect to the low frequency component LF. Since reflection occurs when there is a refractive index difference, the size of the lattice point 12Ai is gradually changed so that the effective refractive index difference is as small as possible. On the other hand, if the lattice point 12Ai is simply made larger, the refractive index becomes smaller and the operational band deviates to the higher-frequency side. Therefore, by increasing the period ai, the operational band is adjusted to be on the longer-wavelength side, i.e., the lower-frequency side to maintain the characteristics.

There is now described the design for reflection frequency of 0.35 THz (wavelength of 0.86 mm) of the high frequency component HF.

As illustrated in FIG. 25, from the right, the period ai is set to 180 μm, 187.12 μm, 194.25 μm, 201.38 μm, 208.50 μm, 215.62 μm, 222.75 μm, 229.88 μm, 222.75 μm, 215.62 μm, 208.50 μm, 201.38 μm, 194.25 μm, 187.12 μm, and 180 μm, Moreover, as illustrated in FIG. 25, the lattice points 12Ai are arranged with the radius symmetrically changed from 10 μm to 40 μm.

For example, in a design with the reflection frequency of 0.35 THz (wavelength of 0.86 mm) of the high frequency component HF, the example of setting the period ai as such numerical values, and arranging the lattice points 12Ai with the radius symmetrically changed from 10 μm to 40 μm is the result of verifying in simulation.

The UC dielectric waveguide 14LP is held by a holding unit 16. The holding unit 16 has a square structure, as illustrated in FIG. 25. An input port P1 and an output port P3 are respectively disposed at two opposite sides of the holding unit 16.

Effective-refractive-index confinement waveguides are respectively disposed at the input and output portions of the UC dielectric waveguide 14LP. A medium 14M around the UC dielectric waveguide 14LP can be formed, for example, of air, or inert gas such as nitrogen, xenon, or helium. The UC dielectric waveguide 14LP used herein does not have the EMC structure or PCC structure for confining THz waves. The medium 14M having a large refractive index difference with a dielectric material such as an air is provided around the UC dielectric waveguide 14LP.

Moreover, the EMC is provided between the holding unit 16 and the UC dielectric waveguide 14LP at the port P1 at the input side of the UC dielectric waveguide 14LP. Moreover, the EMC is provided between the holding unit 16 and the UC dielectric waveguide 14LP at the port P3 at the output side of the UC dielectric waveguide 14LP. The EMC is a low-refractive index cladding layer.

Adiabatic mode conversion structural units may be respectively provided at the port P1 at the input side of the UC dielectric waveguide 14LP, and at the port P3 at the output side thereof. The adiabatic mode conversion structural units can reduce a coupling loss of THE wave in the input and output unit of the UC dielectric waveguide 14LP, The THz circuit (low-pass filter) 20 according to the seventh embodiment can have frequency dependency (filtering function). It can operate as a Low Pass Filter (LPF) that transmits the low frequency component LF and radiates the high frequency component HF. Thus, it is possible to suppress unnecessary components and to improve crosstalk by the filtering function.

For example, in a design with the reflection frequency of 0.35 THz (wavelength of 0.86 mm) of the high frequency component HF, by setting the period as such numerical values, and arranging the holes with the radius symmetrically changed from 10 μm to 40 μm, the reflection of the high frequency component HF can be increased.

Figure 26:
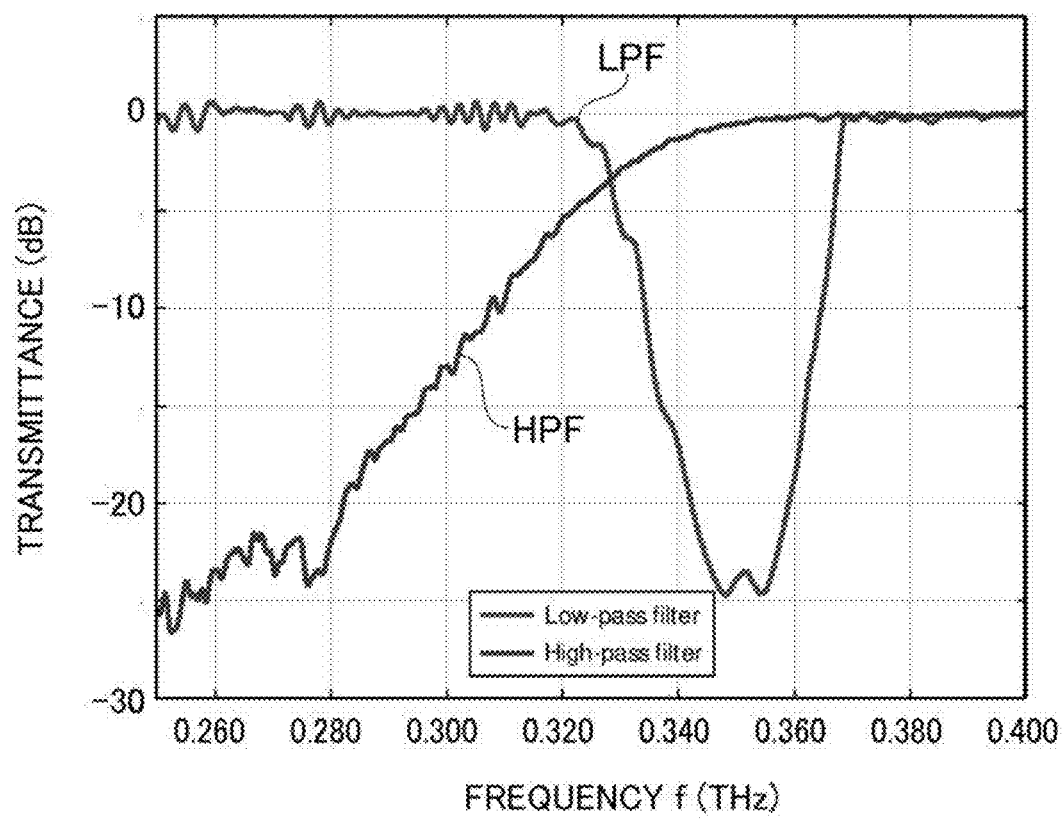
FIG. 26 illustrates a simulation result of frequency characteristics of transmittance (dB) in the THz circuit (low-pass filter) according to the seventh embodiment and the THz circuit (high-pass filter) according to the sixth embodiment.

FIG. 26 illustrates a simulation result of frequency characteristics of transmittance (dB) in the THz circuit (low-pass filter) according to the seventh embodiment and the THz circuit (high-pass filter) according to the sixth embodiment, In FIG. 26, at a frequency f=approximately 0.330 THz, the characteristics of the high-pass filter HPF is that the transmittance (dB) decreased to −3 dB. On the other hand, the characteristics of the low-pass filter LPF show that the transmittance (dB) decreases to −25 dB at a frequency f=approximately 0.350 THz and the high frequency component HF is sufficiently reflected.

(THz Integrated Circuit; Integration of Multiplexing/Demultiplexing Circuit, High-Pass Filter, and Low-Pass Filter)

Figure 27A:
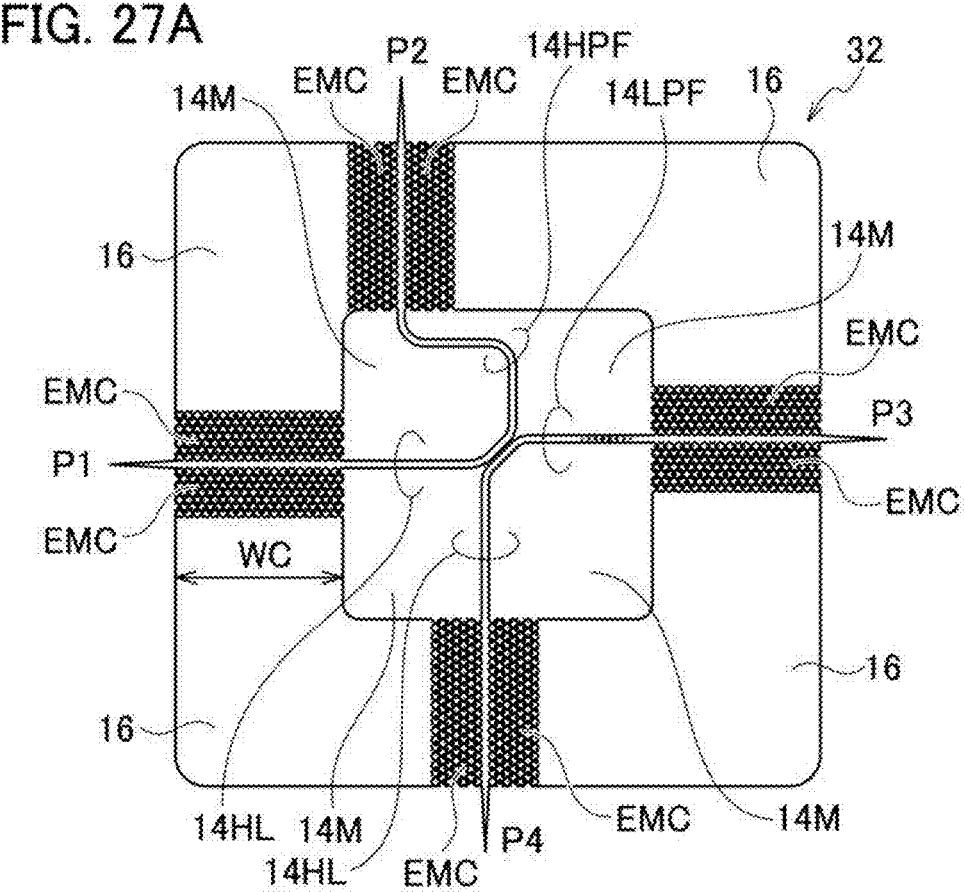
FIG. 27A is a top view diagram illustrating a THz integrated circuit obtained by integrating a multiplexing/demultiplexing circuit, a high-pass filter, and a low-pass filter, as a THz integrated circuit according to an eighth embodiment.

FIG. 27A is a top view diagram illustrating a THz integrated circuit 32 obtained by integrating a THz circuit (multiplexing/demultiplexing circuit), a high-pass filter HPF, and a low-pass filter LPF, as the THz integrated circuit 32 according to an eighth embodiment.

In FIG. 27A, an UC dielectric waveguide 14HL of the THz circuit (multiplexing/demultiplexing circuit) and an UC dielectric waveguide 14HPF of the THz circuit (high-pass filter) are disposed between a port P1 and a port P2. In the UC dielectric waveguide 14HPF of the THz circuit (high-pass filter), the high-pass filter HPF is configured by setting the waveguide width WB of the bent portion narrower than the basic waveguide width WA, in the same manner as that in the sixth embodiment.

An UC dielectric waveguide 14HL of the THz circuit (multiplexing/demultiplexing circuit) and an UC dielectric waveguide 14LPF of the THz circuit (Low-pass filter) are disposed between a port P4 and a port P3. In the UC dielectric waveguide 14LPF of the THz circuit (low-pass filter), the low-pass filter LPF is configured by gradually increasing the hole size and the period in the same manner as that in the seventh embodiment, for impedance matching (reflection suppression) and wide-band operation with respect to the low frequency component LF.

A 2×2 evanescent coupler is configured by the UC dielectric waveguide 14HL between the port P1 and the port P2 and the UC dielectric waveguide 14HL between the port P4, and the port P3.

The 2×2 evanescent coupler is a THZ wave multiplexing/demultiplexing circuit. The UC dielectric waveguides 14HL and 14HPF and the UC dielectric waveguides 14HL and 14 LPF are close to each other back to back at a THz wave coupling portion. They are close to each other but not connected to each other, at the THz wave coupling portion. At the THz wave coupling portion, the first and second UC dielectric waveguides are close to each other so that the energy of the THz wave can be exchanged via the evanescent field. The evanescent coupler is housed in a holding unit 16. The holding unit 16 has a square structure, as illustrated in FIG. 27A.

The port P1 and the port P2 are respectively disposed at two adjacent sides of the holding unit 16. The port P3 and the port P4 are respectively disposed at two adjacent sides of the holding unit 16. The port P1 and the port P3 are respectively disposed at two opposite sides of the holding unit 16. The port P2 and the port P4 are respectively disposed at two opposite sides of the holding unit 16.

The EMC is disposed between the UC dielectric waveguide 14HL and the holding unit 16 near the port P1 and the port P4. The EMC is disposed also between the UC dielectric waveguide 14HPF and the holding unit 16 near the port P2. The EMC is disposed also between the UC dielectric waveguide 14LPF and the holding unit 16 near the port P3. The EMC is a low-refractive index cladding layer.

The medium 14M around the UC dielectric waveguides 14HL, 14HPE, and 14LPF can be formed, for example, of air, or inert gas such as nitrogen, xenon, or helium. The UC dielectric waveguides 14HL, 14HPF, and 14LPF used herein do not have the EMC structure or PCC structure for confining THz waves. The medium 14M having a large refractive index difference with a dielectric material such as an air is provided around the UC dielectric waveguides 14HL, 14HPF, and 14LPF.

A adiabatic mode conversion structural units is provided at each of the port P1 and the port P2. A adiabatic mode conversion structural units is provided at each of the port P3 and the port P4. A coupling loss of THz wave can be reduced by the adiabatic mode conversion structural units.

(Frequency Characteristics of Transmittance)

Figure 27B:
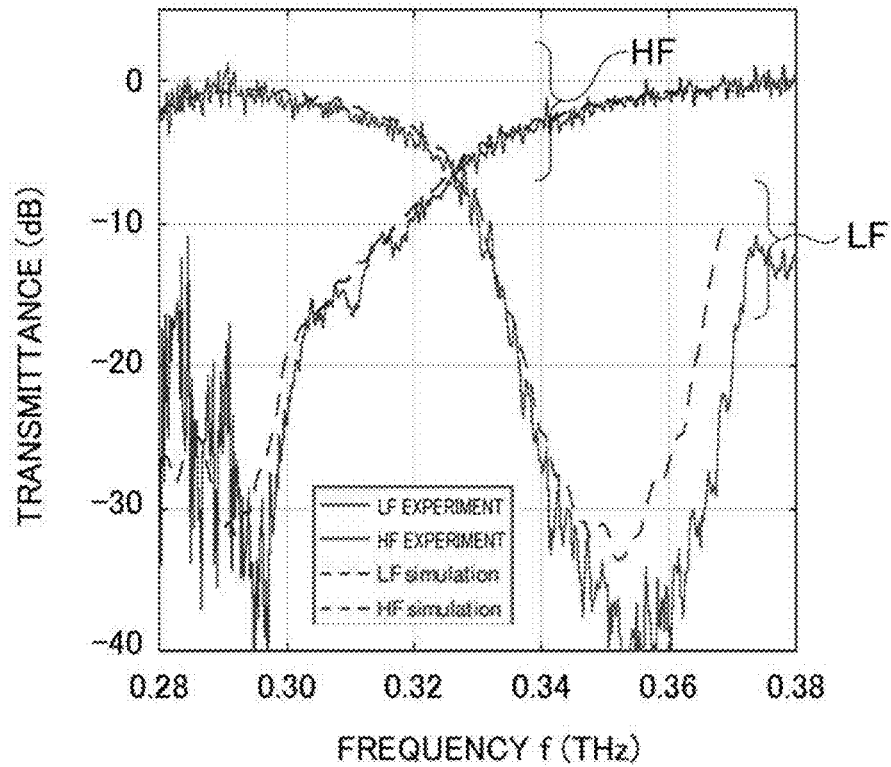
FIG. 27B illustrates frequency characteristics of transmittance (dB) in the THz integrated circuit illustrated in FIG. 27A.

FIG. 27B illustrates frequency characteristics of transmittance (dB) in the THZ integrated circuit 32 illustrated in FIG. 27A. The solid line indicates an experimental result and the dashed line indicates a simulation result.

In FIG. 27B, the experimental result of the transmittance between the port P2 and the port P1 is expressed by the solid line of the high frequency component HF. The simulation result is expressed by the dashed line of the high frequency component HF. The experimental result of the transmittance between the port P2 and the port P1 is considerably matched with the simulation result.

In FIG. 27B, the experimental result of the transmittance between the port P3 and the port P1 is expressed by the solid line of the low frequency component LF. The simulation result is expressed by the dashed line of the low frequency component LF. The experimental result of the transmittance between the port P3 and the port P1 is considerably matched with the simulation result.

As illustrated in FIG. 27B, the cross operation mode between the port P3 and the port P1 exhibits low frequency component LF characteristics in that high transmittance is obtained in the low frequency band (0.280 THz to 0.320 THz) and no transmission is obtained at other frequencies. In contrast, the bar operation mode between the port P2 and the port P1 exhibits high frequency component HF characteristics in that high transmittance is obtained in the high frequency band (0.320 THz or more) and no transmission is obtained at other frequencies. More specifically, in the port P1, when a signal with a frequency from 0.280 THz to 0.320 THz is entered, a low-pass filter LPF output is obtained from the port P3, and when a signal with a frequency of 0.320 THz or more is entered, a high-pass filter HPF output is obtained from the port P2. In contrast, when a signal with a frequency of 0.320 THz or more is entered into the port P2 and a signal with a frequency from 0.270 THz to 0.320 THz is entered into the port P3, a multiplexed result is sent from the port P1.

From the above-mentioned result, it is actually verified that it is possible to suppress crosstalk by the multiplexing/demultiplexing operation and filter by frequency separation due to the response characteristics of the THz integrated circuit 32 in which the THZ circuit (multiplexing/demultiplexing circuit: 2×2 evanescent coupler), and the high-pass filter HPF and the low-pass filter LPF are integrated.

The port P4 is not intended to transfer useful THz power. An unnecessary signal transmitted to the port P4 through reflection or the parasitic evanescent coupling from the port P1 can be sensed. Accordingly, it is configured so that a coupling spike is attached to the port P4 and thereby this unnecessary power can radiate into free space.

Figure 28A:
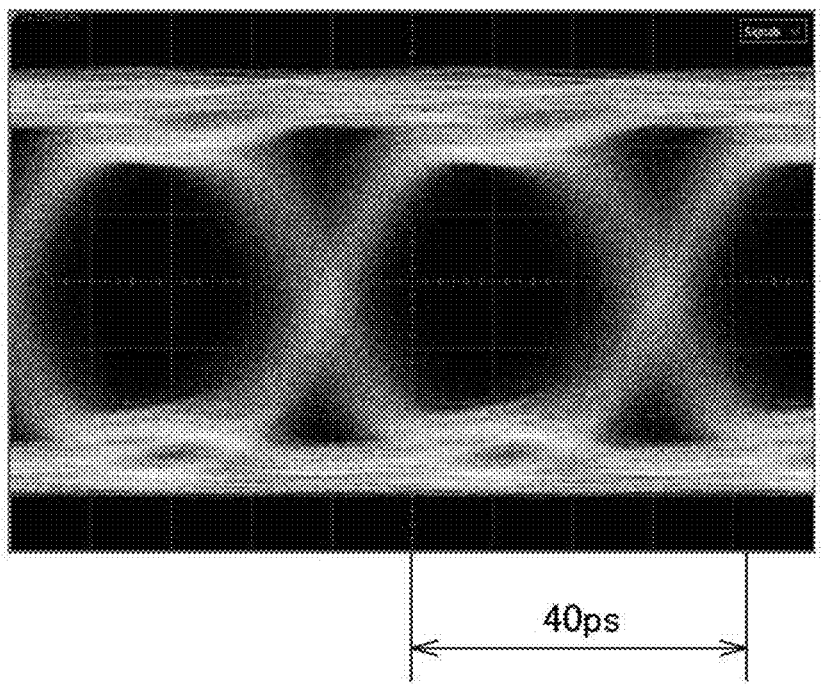
FIG. 28A illustrates an example of a lower-frequency side eye pattern, in a two-channel THz communication executed by THz integrated circuit using the (multiplexing/demultiplexing circuit, high-pass filter, and low-pass filter) according to the eighth embodiment.
Figure 28B:
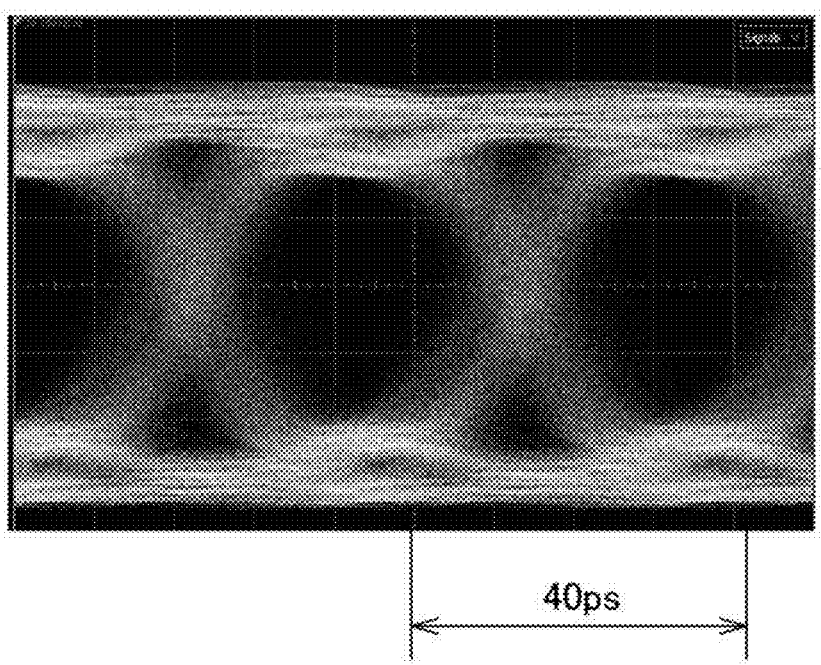
FIG. 28B illustrates an example of a higher-frequency side eye pattern, in a two-channel THz communication executed by using the THZ integrated circuit (multiplexing/demultiplexing circuit, high-pass filter, and low-pass filter) according to the eighth embodiment.

FIG. 28A illustrates an example of a lower-frequency side eye pattern, in a two-channel THz communication executed by using the THZ integrated circuit (multiplexing/demultiplexing circuit, high-pass filter, and low-pass filter) according to the eighth embodiment. FIG. 28B illustrates an example of a higher-frequency side eye pattern, in a two-channel THz communication executed by using the THz integrated circuit (multiplexing/demultiplexing circuit, high-pass filter, and low-pass filter) according to the eighth embodiment. FIGS. 28A and 28B show that the eyes are clearly open, FIG. 28A corresponds to the cross operation mode between the port P3 and the port P1, resulting in a data rate of 24 Gbit/s at a frequency f=0.295 THz. On the other hand, FIG. 28B corresponds to the bar operation mode between the port P2 and the port P1, resulting in a data rate of 24 Gbit/s at a frequency f=0.350 THz. In other words, it is possible to realize two-channel communication at 24 Gbit/s for both the low frequency component LF and the high frequency component HF.

(THz Integrated Circuit; Integration of Multiplexing Circuit and Demultiplexing Circuit of High-Pass Filter and Low-Pass Filter)

Figure 29:
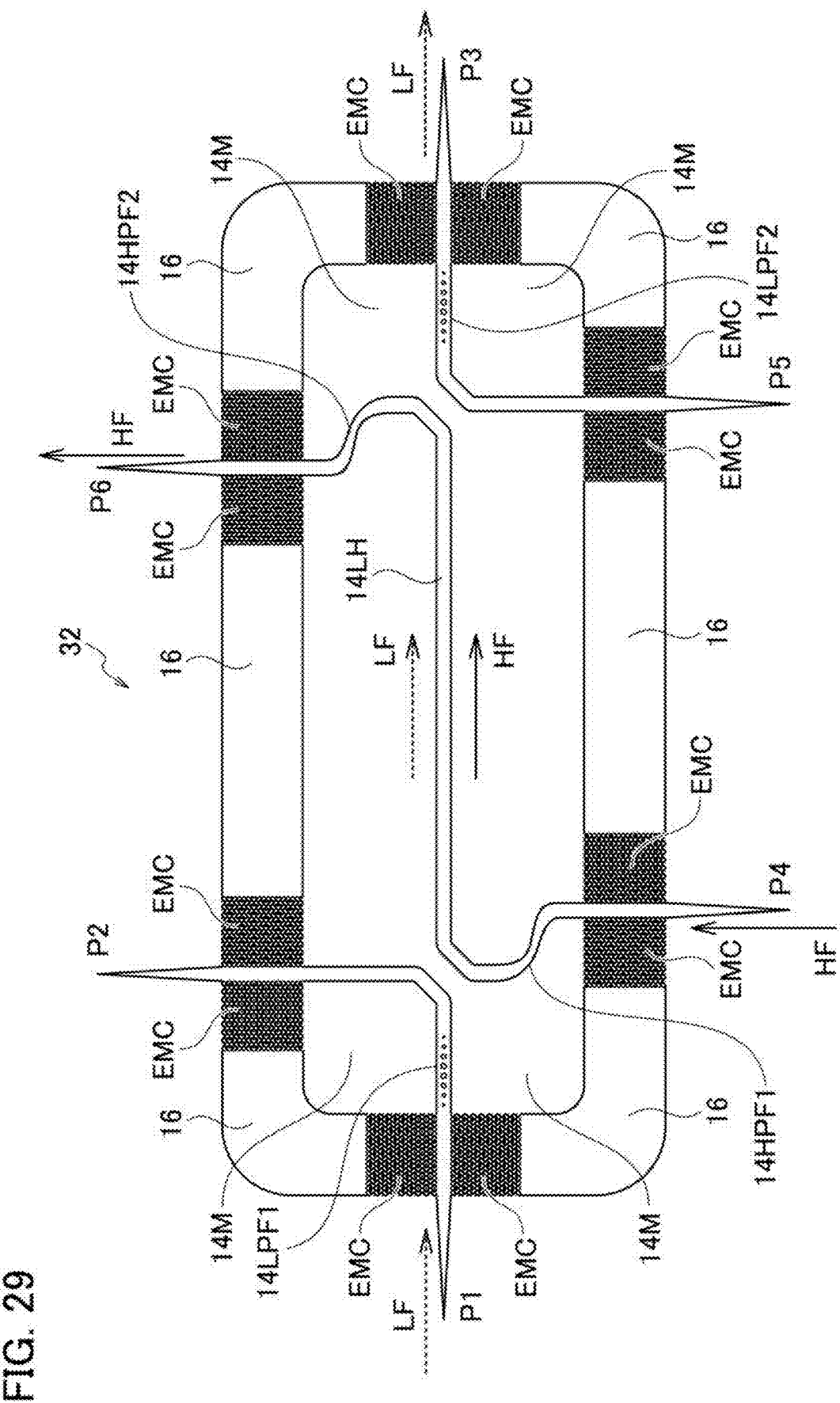
FIG. 29 is a top view diagram illustrating a THZ integrated circuit obtained by integrating a multiplexing circuit and a demultiplexing circuit, each composed of a high-pass filter and a low-pass filter, as a THz integrated circuit according to the ninth embodiment.

FIG. 29 is a top view diagram illustrating a THz integrated circuit 32 obtained by integrating a multiplexing circuit and a demultiplexing circuit, each composed of a high-pass filter HPF and a low-pass filter LPF, as a THz integrated circuit according to the ninth embodiment.

In FIG. 29, a first UC dielectric waveguide 14DPF1 is disposed between a port P1 and a port P2. Moreover, a first UC dielectric waveguide 14HPF1, an UC dielectric waveguide 14LH, and d second UC dielectric waveguide 14HPF2 are disposed between a port P4 and a port P6. Furthermore, a second UC dielectric waveguide 14LPF2 is disposed between a port P3 and a port P5.

In the UC dielectric waveguide 14HPF of the THz circuit (high-pass filter), the high-pass filter HPF is configured by setting the waveguide width WB of the bent portion narrower than the basic waveguide width WA, in the same manner as that in the sixth embodiment. In the UC dielectric waveguide 14LPF of the THz circuit (low-pass filter), the low-pass filter LPF is configured by gradually increasing the hole size and the period in the same manner as that in the seventh embodiment, for impedance matching (reflection suppression) and wide-band operation with respect to the low frequency component LF.

A first 2×2 evanescent coupler is configured including the first UC dielectric waveguide 14LPF1 connected to the port P1 and the first UC dielectric waveguide 14HPF1 connected to the port P4. The second 2×2 evanescent coupler is configured including the second UC dielectric waveguide 14HPF2 connected to the port P6 and the second UC dielectric waveguide 14LPF2 connected to the port P3. The first and second evanescent couplers are housed in a holding unit 16. The holding unit 16 has a rectangular structure, as illustrated in FIG. 29.

The EMC is disposed between the UC dielectric waveguide and the holding unit 16 near each of the ports P1 to P6. The EMC is a low-refractive index cladding layer.

The low frequency component LF entered from the port P1 propagates to the UC dielectric waveguide 14LH through the first UC dielectric waveguide 14LPF1, and the high frequency component HF entered from the port P4 propagates to the UC dielectric waveguide 14LH through the first UC dielectric waveguide 14HPF1. More specifically, by the first 2×2 evanescent coupler (multiplexing circuit) including the first UC dielectric waveguide 14LPF1 connected to the port P1 and the first UC dielectric waveguide 14HPF1 connected to the port P4, the low frequency component LF entered from the port P1 is combined with the high frequency component HF entered from the port P4 to propagate through the UC dielectric waveguide 14LH.

The high frequency component HF and the low frequency component LF propagating through the UC dielectric waveguide 14LH is separated by the second 2×2 evanescent coupler (demultiplexing circuit) including the second UC dielectric waveguide 14LPF2 connected to the port P3 and the second UC dielectric waveguide 14HPF2 connected to the port P6. More specifically, the low frequency component LF propagating through the UC dielectric waveguide 14LH is sent to the port P3 by the second 2×2 evanescent coupler (demultiplexing circuit) through the second UC dielectric waveguide 14LPF2. The high frequency component HF propagating through the UC dielectric waveguide 14LH is sent to the port P6 by the second 2×2 evanescent coupler (demultiplexing circuit) through the second UC dielectric waveguide 14HPF2.

(Frequency Characteristics of Transmittance)

Figure 30:
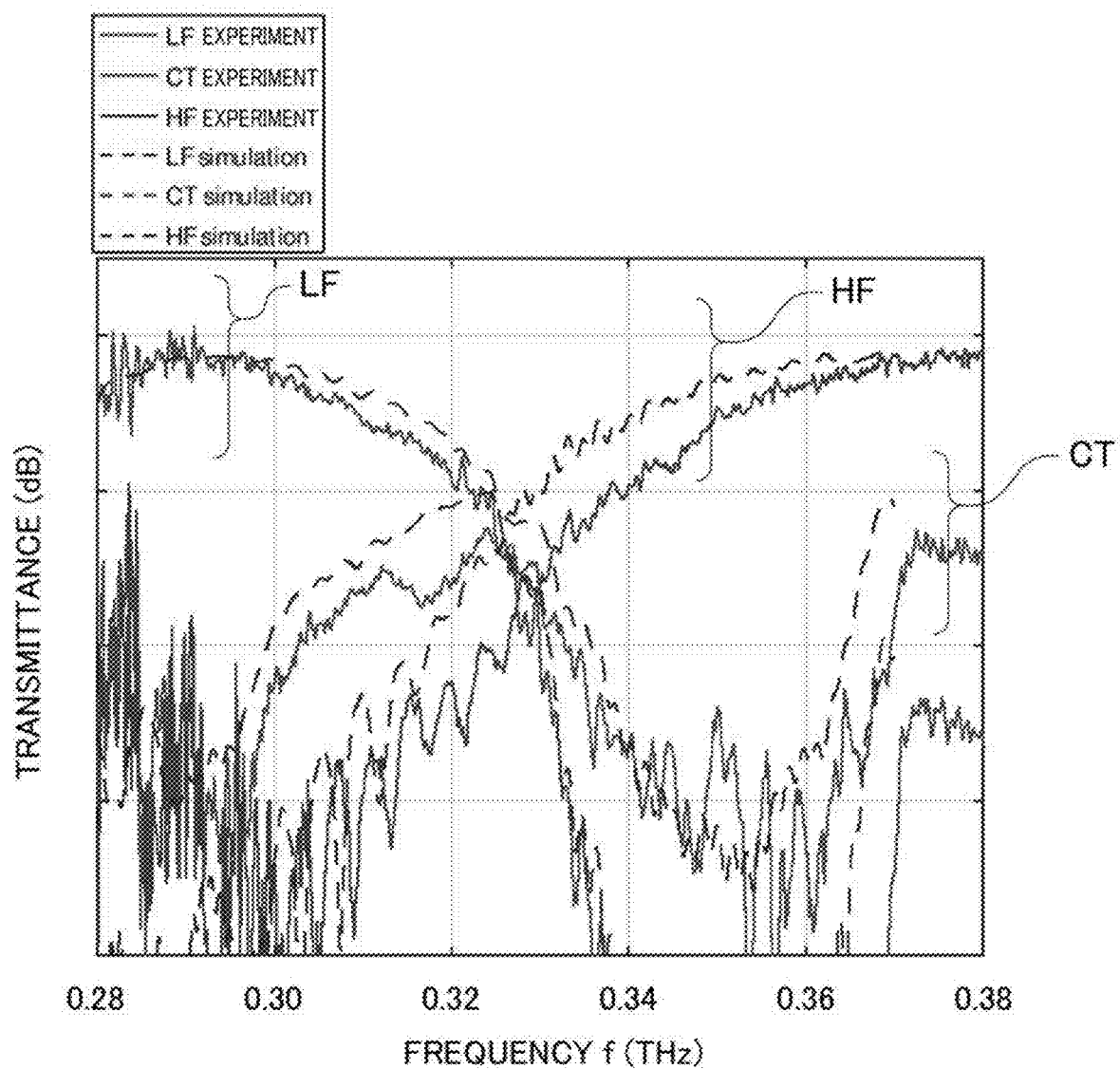
FIG. 30 illustrates frequency characteristics of transmittance (dB) in the THz integrated circuit according to the ninth embodiment.

FIG. 30 illustrates frequency characteristics of transmittance (dB) in the THZ integrated circuit 32 illustrated in FIG. 29. The solid line indicates an experimental result and the dashed line indicates a simulation result, In FIG. 30, the experimental result of the transmittance between the port P1 and the port P3 is expressed by the solid line of the low frequency component LF. The simulation result is expressed by the dashed line of the low frequency component LF. The experimental result of the transmittance between the port P4 and the port P6 is expressed by the solid line of the high frequency component HF. The simulation result is expressed by the dashed line of the high frequency component HF. Each of the experimental results are considerably matched with the simulation results. In FIG. 30, the experimental result of the crosstalk CT is expressed by the solid line of CT. The simulation result is expressed by the dashed line of CT. The experimental result are considerably matched with the simulation result. The crosstalk CT corresponds to the transmittance of the low frequency component LF between the port P1 and the port P6 or the transmittance of the high frequency component HF between the port P4 and the port P3.

As illustrated in FIG. 30, the cross operation mode between the port P3 and the port P1 exhibits low frequency component LF characteristics in that high transmittance is obtained in the low frequency band (0.280 THz to 0.320 THz) In and no transmission is obtained at other frequencies. contrast, the bar operation mode between the port P6 and the port P4 exhibits high frequency component HF characteristics in that high transmittance is obtained in the high frequency band (0.320 THz or more) and no transmission is obtained at other frequencies. Moreover, the crosstalk characteristic is realized to be −20 dB within a range of operational frequency band (0.280 THz to 0.36 THz). More specifically, in the port P1, when a signal with a frequency from 0.280 THz to 0.320 THz is entered, a low frequency component LF output is obtained from the port P3; and in the port P4, when a signal with a frequency of 0.320 THz or more is entered, a high frequency component HF output is obtained from the port P6.

From the above-mentioned result, it is actually verified that it is possible to suppress crosstalk by the multiplexing/demultiplexing operation and filter by frequency separation due to the response characteristics of the THz integrated circuit 32 in which the THz circuit (multiplexing/demultiplexing circuit: 2×2 evanescent coupler), and the high-pass filter HPF and the low-pass filter LPF are integrated.

The port P5 is not intended to transfer useful THz power. An unnecessary signal transmitted to the port P5 through reflection or the parasitic evanescent coupling from the port P1 can be sensed. Accordingly, it is configured so that a coupling spike is attached to the port P5 and thereby this unnecessary power can radiate into free space.

Figure 31A:
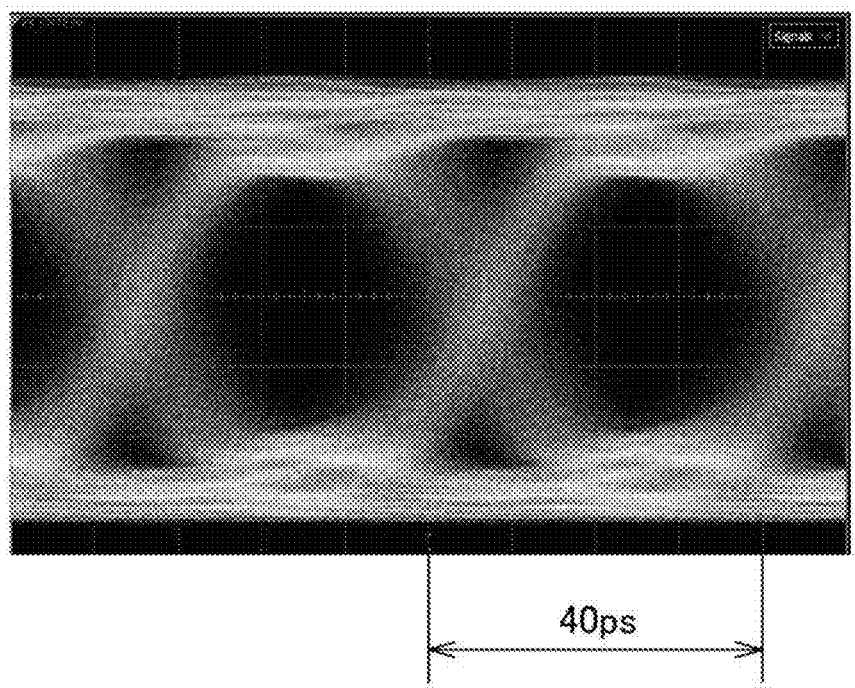
FIG. 31A illustrates an example of a lower-frequency side eye pattern, in a two-channel THz communication executed by using the THz integrated circuit according to the ninth embodiment.
Figure 31B:
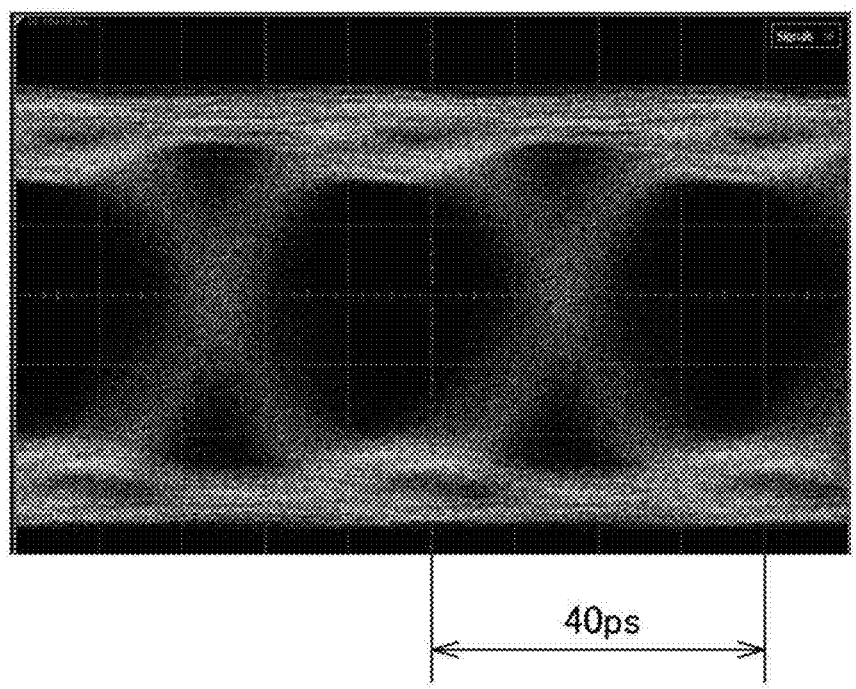
FIG. 31B illustrates an example of a higher-frequency side eye pattern, in a two-channel THz communication executed by using the THz integrated circuit according to the ninth embodiment.

FIG. 31A illustrates an example of a lower-frequency side eye pattern, in a two-channel THz communication executed by using the THz integrated circuit according to the ninth embodiment. FIG. 31B illustrates an example of a higher-frequency side eye pattern, in a two-channel THz communication executed by using the THz integrated circuit according to the ninth embodiment. FIG. 31A and FIG. 31B show that eyes are clearly open. FIG. 31A corresponds to the cross operation mode between the port P3 and the port P1, resulting in a data rate of 24 Gbit/s at a frequency f=0.295 THz. On the other hand, FIG. 31B corresponds to the bar operation mode between the port P4 and the port P6, resulting in a data rate of 24 Gbit/s at a frequency £=0.350 THz. In other words, it is possible to realize two-channel communication at 24 Gbit/s for both the low frequency component LF and the high frequency component HF.

Other Embodiments

As described above, the THz circuit and the THz integrated circuit according to the embodiments have been described, as a disclosure including associated description and drawings to be construed as illustrative, not restrictive. This disclosure makes clear a variety of alternative embodiments, working examples, and operational techniques for those skilled in the art.

Such being the case, the embodiments described herein cover a variety of embodiments, whether described or not.

In addition, the following configurations or aspects may also be adopted for the embodiments.

[Configuration 101]

A dielectric waveguide comprising:
  a dielectric substance wiring propagating a terahertz wave;
  a medium disposed around the dielectric substance wiring, the medium having a large refractive index difference with respect to the dielectric substance wiring;
  a package substrate; and
  a package disposed on the package substrate, the package configured to seal the dielectric substance wiring, wherein
  the dielectric substance wiring is disposed above the package substrate via the medium, and the medium is interposed between the dielectric substance wiring and the package substrate, wherein
  the terahertz wave can be confined within the dielectric substance wiring. [Configuration 102]

The dielectric waveguide according to configuration 101, wherein
  the medium comprises one selected from the group consisting of air, nitrogen, xenon, and helium,

[Configuration 103]

The dielectric waveguide according to configuration 101 or 102, wherein
  the dielectric substance wiring comprises
  a first unclad dielectric waveguide disposed at one end portion, and
  a second unclad dielectric waveguide disposed at the other end portion.

[Configuration 104]

The dielectric waveguide according to configuration 103, wherein
  a dielectric substance terahertz circuit disposed between the first unclad dielectric waveguide and the second unclad dielectric waveguide.

[Configuration 105]

The dielectric waveguide according to configuration 104, wherein
  the dielectric substance terahertz circuit comprises a circuit composed of a dielectric.

[Configuration 106]

The dielectric waveguide according to configuration 104, wherein
  the dielectric substance terahertz circuit comprises a circuit including an unclad dielectric waveguide.

[Configuration 107]

The dielectric waveguide according to configuration 104, wherein
  the dielectric substance terahertz circuit comprises a circuit obtained by combining a circuit including an unclad dielectric waveguide and a circuit including an effective-medium-cladded dielectric waveguide.

[Configuration 108] The dielectric waveguide according to configuration 104, wherein
  the dielectric substance terahertz circuit comprises a circuit obtained by combining a circuit including an unclad dielectric waveguide and a circuit including a photonic crystal waveguide.

[Configuration 109]
The dielectric waveguide according to configuration 104, wherein
the dielectric substance terahertz circuit comprises a circuit obtained by combining a circuit including an unclad dielectric waveguide, a circuit including an effective-medium-cladded dielectric waveguide, and a circuit including a photonic crystal waveguide,

[Configuration 110]
The dielectric waveguide according to any one of configuration 104-109, wherein
the medium is interposed between the dielectric substance terahertz circuit and the package substrate.

[Configuration 111]
The dielectric waveguide according to any one of configuration 101-110, wherein
the dielectric substance wiring comprises any one of materials selected from the group consisting of silicon (Si), GaAs, InP, GaN, GaInAsP/InP, GaInAs/GaAs, GaAlAs/GaAs, GaInNAs/GaAs, GaAlInAs/InP, AlGaInP/GaAs, GaInN/GaN, plastic, glass, epoxy resin, and poly-tetrafluoroethylene,

[Configuration 112]
A terahertz circuit comprising:
a first unclad dielectric waveguide;
a second unclad dielectric waveguide;
a dielectric substance terahertz circuit connected between the first unclad dielectric waveguide and the second unclad dielectric waveguide;
a package substrate;
a first holding unit configured to hold the first unclad dielectric waveguide; and
a second holding unit configured to hold the second unclad dielectric waveguide, wherein
the first unclad dielectric waveguide, the second unclad dielectric waveguide, and the dielectric substance terahertz circuit are disposed above the package substrate so as to not in contact with the package substrate.

[Configuration 113]
The terahertz circuit according to configuration 112, wherein
the dielectric substance terahertz circuit comprises a circuit including a linear-shaped unclad dielectric waveguide.

[Configuration 114]
The terahertz circuit according to configuration 112, wherein
the dielectric substance terahertz circuit comprising a circuit including a bent-shaped unclad dielectric waveguide.

[Configuration 115]
The terahertz circuit according to configuration 112, wherein
the dielectric substance terahertz circuit comprises a circuit including a Y-coupled branch circuit.

[Configuration 116]
The terahertz circuit according to configuration 115, wherein
the Y-coupled branch circuit comprises a circuit including unclad dielectric waveguides having a symmetrically arranged circular bend structure.

[Configuration 117]
A terahertz circuit comprising:
a first unclad dielectric waveguide having two 45-degree circular bend structures;
a second unclad dielectric waveguide having two 45-degree circular bend structures capable of evanescent coupling to the first unclad dielectric waveguide;
a package substrate;
a first holding unit configured to hold the first unclad dielectric waveguide; and
a second holding unit configured to hold the second unclad dielectric waveguide, wherein
the first unclad dielectric waveguide and the second unclad dielectric waveguide are disposed above the package substrate so as to not in contact with the package substrate,

[Configuration 118]
The terahertz circuit according to configuration 117, wherein
the terahertz circuit comprises a 2×2 evanescent coupler.

[Configuration 119]
The terahertz circuit according to any one of configuration 112-118, wherein
a package disposed on the package substrate and configured to seal at least the first unclad dielectric waveguide and the second unclad dielectric waveguide.

[Configuration 120]
The terahertz circuit according to configuration 119, further comprising:
a first low-refractive index cladding layer disposed between the first holding unit and the first unclad dielectric waveguide; and
a second low-refractive index cladding layer disposed between the second holding unit and the second unclad dielectric waveguide.

[Configuration 121]
A THz integrated circuit comprising:
a first unclad dielectric waveguide;
a second unclad dielectric waveguide capable of evanescent coupling to the first unclad dielectric waveguide;
a holding unit configured to hold the first unclad dielectric waveguide and the second unclad dielectric waveguide;
a terahertz active device disposed on the second unclad dielectric waveguide coupled to the holding unit; and
a package substrate, wherein
the first unclad dielectric waveguide and the second unclad dielectric waveguide are disposed above the package substrate so as to not in contact with the package substrate.

[Configuration 122]
The THz integrated circuit according to configuration 121, wherein
the terahertz active device includes any one of an electronic device capable of operating in a terahertz wave region, a photoelectric conversion device, and a photonic device.

[Configuration 123]
The THz integrated circuit according to configuration 122, wherein
the terahertz active device comprising an antenna.

[Configuration 124]
The THz integrated circuit according to configuration 121, wherein
the terahertz active device comprises one selected from the group consisting of a resonant tunneling diode, a TUNNETT diode, an IMPATT diode, a GaAs based field-effect transistor, a GaN based FET, a high electron mobility transistor, a heterojunction bipolar transistor, and CMOSFET.

[Configuration 125]
The THE integrated circuit according to configuration 123, wherein
the antenna is an antenna in which planar integration is available, and the antenna comprises one selected from the group consisting of a bow tie antenna, a dipole antenna, a slot antenna, a patch antenna, a ring antenna, and a Yagi-Uda antenna.

[Configuration 126]
The terahertz circuit according to configuration 112, wherein
the dielectric substance terahertz circuit comprises an unclad dielectric waveguide having a first wiring width at a first bent portion, and a second wiring width wider than the first wiring width at a second portion different from the first bent portion.

[Configuration 127]
The terahertz circuit according to configuration 112, wherein
the dielectric substance terahertz circuit comprises an unclad dielectric waveguide comprising periodic lattice points in which a size and a period of holes are gradually increased.

[Configuration 128]
A terahertz integrated circuit comprising:
a first unclad dielectric waveguide;
a second unclad dielectric waveguide capable of evanescent coupling to the first unclad dielectric waveguide;
a holding unit configured to hold the first unclad dielectric waveguide and the second unclad dielectric waveguide; and
a package substrate, wherein
the first unclad dielectric waveguide and the second unclad dielectric waveguide are disposed above the package substrate so as to not in contact with the package substrate, wherein
the first unclad dielectric waveguide has a first wiring width at a first bent portion, and a second wiring width wider than the first wiring width at a portion different from the first bent portion, wherein
the second unclad dielectric waveguide comprises periodic lattice points in which a size and a period of holes are gradually increased.

[Configuration 129]
A terahertz integrated circuit comprising:
a first unclad dielectric waveguide;
a second unclad dielectric waveguide capable of evanescent coupling to the first unclad dielectric waveguide;
third unclad dielectric waveguide capable of evanescent coupling to the second unclad dielectric waveguide;
a holding unit configured to hold the first unclad dielectric waveguide, the second unclad dielectric waveguide, and the third unclad dielectric waveguide; and
a package substrate, wherein
the first unclad dielectric waveguide, the second unclad dielectric waveguide, and the third unclad dielectric waveguide are disposed above the package substrate so as to not in contact with the package substrate, wherein
the first unclad dielectric waveguide and the third unclad dielectric waveguide comprise periodic lattice points in which a size and a period of holes are gradually increased, wherein
the second unclad dielectric waveguide has a first wiring width at a first bent portion, and a second wiring width wider than the first wiring width at a portion different from the first bent portion.

INDUSTRIAL APPLICABILITY

The THz circuit and THZ integrated circuit of the embodiments can be applied to THz oscillators, THz detectors, high-frequency resonant circuits, signal amplifiers, and the like; and can be applied to wide fields, such as measurement in various fields, e.g., a physical property, an astronomy, a biology, etc. and a security field, other than large-capacity communications and information processing of THz wave imaging devices, sensing devices, high-speed wireless communications devices, and the like.

What is claimed is:
1. A dielectric waveguide comprising:
a dielectric substance wiring configured to propagate a terahertz wave;
a medium disposed around the dielectric substance wiring, the medium having a large refractive index difference with respect to the dielectric substance wiring;
a holding unit configured to hold the dielectric substance wiring; and
a low-refractive index cladding layer disposed between the holding unit and the dielectric substance wiring, wherein
the terahertz wave is confined within the dielectric substance wiring.
2. The dielectric waveguide according to claim 1, wherein the medium comprises one selected from the group consisting of air, nitrogen, xenon, and helium.
3. The dielectric waveguide according to claim 1, wherein the dielectric substance wiring comprises
a first unclad dielectric waveguide disposed at one end portion, and
a second unclad dielectric waveguide disposed at the other end portion.
4. The dielectric waveguide according to claim 3, further comprising
a dielectric substance terahertz circuit disposed between the first unclad dielectric waveguide and the second unclad dielectric waveguide.
5. The dielectric waveguide according to claim 4, wherein the dielectric substance terahertz circuit comprises a circuit composed of a dielectric.
6. The dielectric waveguide according to claim 4, wherein the dielectric substance terahertz circuit comprises a circuit including an unclad dielectric waveguide.
7. The dielectric waveguide according to claim 4, wherein the dielectric substance terahertz circuit comprises a circuit obtained by combining a circuit including an unclad dielectric waveguide and a circuit including an effective-medium-cladded dielectric waveguide.
8. The dielectric waveguide according to claim 4, wherein the dielectric substance terahertz circuit comprises a circuit obtained by combining a circuit including an unclad dielectric waveguide and a circuit including a photonic crystal waveguide.
9. The dielectric waveguide according to claim 4, wherein the dielectric substance terahertz circuit comprises a circuit obtained by combining a circuit including an unclad dielectric waveguide, a circuit including an effective-medium-cladded dielectric waveguide, and a circuit including a photonic crystal waveguide.
10. The dielectric waveguide according to claim 1, further comprising:
a package substrate; and
a package disposed on the package substrate, the package configured to seal the dielectric substance wiring, wherein the dielectric substance wiring is disposed above the package substrate via the medium.

11. The dielectric waveguide according to claim 1, wherein
the dielectric substance wiring comprises any one of materials selected from the group consisting of silicon (Si), GaAs, InP, GaN, GaInAsP/InP, GaInAs/GaAs, GaAlAs/GaAs, GaIlnNAs/GaAs, GaAllnAs/InP, AlGaInP/GaAs, GaInN/GaN, plastic, glass, epoxy resin, and poly-tetrafluoroethylene.

12. A terahertz circuit comprising:
a first unclad dielectric waveguide;
a second unclad dielectric waveguide;
a dielectric substance terahertz circuit connected between the first unclad dielectric waveguide and the second unclad dielectric waveguide;
a first holding unit configured to hold the first unclad dielectric waveguide;
a second holding unit configured to hold the second unclad dielectric waveguide;
a first low-refractive index cladding layer disposed between the first holding unit and the first unclad dielectric waveguide; and
a second low-refractive index cladding layer disposed between the second holding unit and the second unclad dielectric waveguide.

13. The terahertz circuit according to claim 12, wherein the dielectric substance terahertz circuit comprises a circuit including a linear-shaped unclad dielectric waveguide.

14. The terahertz circuit according to claim 12, wherein the dielectric substance terahertz circuit comprising a circuit including a bent-shaped unclad dielectric waveguide.

15. The terahertz circuit according to claim 12, wherein the dielectric substance terahertz circuit comprises a circuit including a Y-coupled branch circuit.

16. The terahertz circuit according to claim 15, wherein the Y-coupled branch circuit comprises a circuit including unclad dielectric waveguides having a symmetrically arranged circular bend structure.

17. The terahertz circuit according to claim 12, wherein the dielectric substance terahertz circuit comprises an unclad dielectric waveguide having a first wiring width at a first bent portion, and a second wiring width wider than the first wiring width at a second portion different from the first bent portion.

18. A terahertz integrated circuit comprising:
a first unclad dielectric waveguide;
a second unclad dielectric waveguide capable of evanescent coupling to the first unclad dielectric waveguide; and
a holding unit configured to hold the first unclad dielectric waveguide and the second unclad dielectric waveguide, wherein
the first unclad dielectric waveguide has a first wiring width at a first bent portion, and a second wiring width wider than the first wiring width at a portion different from the first bent portion, wherein
the second unclad dielectric waveguide comprises periodic lattice points in which a size and a period of holes are gradually increased.

* * * * *